US008004588B2

(12) United States Patent
Lukac

(10) Patent No.: US 8,004,588 B2
(45) Date of Patent: Aug. 23, 2011

(54) IMAGE PROCESSING PROCEDURE FOR RECEIVING MOSAIC IMAGE DATA AND CALCULATING VERTICAL AND HORIZONTAL-DIRECTION COLOR DIFFERENCE COMPONENTS FOR EACH PIXEL

(75) Inventor: Rastislav Lukac, North York (CA)

(73) Assignee: Seiko Epson Corporation, Tokyo (JP)

( * ) Notice: Subject to any disclaimer, the term of this patent is extended or adjusted under 35 U.S.C. 154(b) by 484 days.

(21) Appl. No.: 12/199,610

(22) Filed: Aug. 27, 2008

(65) Prior Publication Data

US 2010/0053351 A1 Mar. 4, 2010

(51) Int. Cl.
*H04N 5/208* (2006.01)
(52) U.S. Cl. .................... 348/252; 382/167; 348/273
(58) Field of Classification Search ............ 348/222.1, 348/272, 273, 277–280; 382/162, 254, 266, 382/269
See application file for complete search history.

(56) References Cited

U.S. PATENT DOCUMENTS

| 6,823,090 | B2 | 11/2004 | Matsuura |
| 6,933,970 | B2 | 8/2005 | Koshiba et al. |
| 7,110,602 | B2 | 9/2006 | Krause |
| 7,126,643 | B2 | 10/2006 | Song et al. |
| 2001/0005429 | A1* | 6/2001 | Ishiga et al. .................. 382/167 |
| 2002/0071600 | A1 | 6/2002 | Yamada |
| 2003/0206667 | A1 | 11/2003 | Wang et al. |
| 2005/0008248 | A1 | 1/2005 | Wang |
| 2006/0250655 | A1 | 11/2006 | Wu |
| 2007/0025617 | A1 | 2/2007 | Dai et al. |
| 2007/0052845 | A1 | 3/2007 | Adams |
| 2009/0096899 | A1* | 4/2009 | Quan ............................ 348/273 |

FOREIGN PATENT DOCUMENTS

| EP | 1387315 A1 | 2/2004 |
| JP | 07184084 | 7/1995 |
| JP | 11041565 | 2/1999 |

OTHER PUBLICATIONS

A New Approach to Edge-Preserving Smoothing for Edge Extraction and Image Segmentation, Carsten Garnica, Frank Boochs, Marek Twardochlib, i3mainz, Institute for Spatial Information and Surveying Technology, University of Applied Sciences, Mainz, Germany, IAPRS, vol. XXXIII, Amsterdam, Jan. 2000, (pp. 1-6).

* cited by examiner

*Primary Examiner* — Nelson D. Hernández Hernández
(74) *Attorney, Agent, or Firm* — Mark P. Watson

(57) ABSTRACT

An image processing procedure receives mosaic image data and calculates vertical and horizontal-direction color difference components for each pixel. The image processing procedure subsequently selects an R pixel or a B pixel from the mosaic image data, and compares a variation of the vertical-direction color difference component with a variation of the horizontal-direction color difference component with regard to each of at least the selected pixels to detect edge directions of the at least selected pixels. The edge directions thus obtained are collected in an edge direction map, and then the edge directions are compared with the surrounding edge directions to remove edge noise in advance. The image processing procedure refers to the detected edge directions, and interpolates a missing color component in each pixel of the mosaic image data with the settings of one color component in each pixel in the mosaic image data.

6 Claims, 27 Drawing Sheets

G-Component Pixel $$CDv(r,s) = \boxed{z(r,s)} - \boxed{(z(r-1,s) + z(r+1,s))/2}$$

G Component — z(r,s)
R Component or B Component — (z(r-1,s) + z(r+1,s))/2

Non-G-Component Pixel $$CDv(r,s) = \boxed{(z(r-1,s) + z(r+1,s))/2} - \boxed{z(r,s)}$$

G Component — (z(r-1,s) + z(r+1,s))/2
R Component or B Component — z(r,s)

*FIG. 5A*

G-Component Pixel $$CDh(r,s) = \boxed{z(r,s)} - \boxed{(z(r,s-1) + z(r,s+1))/2}$$

G Component — z(r,s)
R Component or B Component — (z(r,s-1) + z(r,s+1))/2

Non-G-Component Pixel $$CDh(r,s) = \boxed{(z(r,s-1) + z(r,s+1))/2} - \boxed{z(r,s)}$$

G Component — (z(r,s-1) + z(r,s+1))/2
R Component or B Component — z(r,s)

*FIG. 5B*

$$\begin{cases} CDv(r,s) = (\ CDv(r-2,s) + CDv(r-1,s) \\ \qquad\qquad + 4 \cdot CDv(r,s) + CDv(r+1,s) + CDv(r+2,s)\ )\ /\ 8 \\ \\ CDh(r,s) = (\ CDh(r,s-2) + CDh(r,s-1) \\ \qquad\qquad + 4 \cdot CDh(r,s) + CDh(r,s+1) + CDh(r,s+2)\ )\ /\ 8 \end{cases}$$

$$V_v = (CDv(r+1,s) - CDv(r,s))^2 + (CDv(r,s) - CDv(r-1,s))^2$$
$$+ (CDv(r+1,s+1) - CDv(r,s+1))^2 + (CDv(r,s+1) - CDv(r-1,s+1))^2$$
$$+ (CDv(r+1,s-1) - CDv(r,s-1))^2 + (CDv(r,s-1) - CDv(r-1,s-1))^2$$
*FIG. 8A*
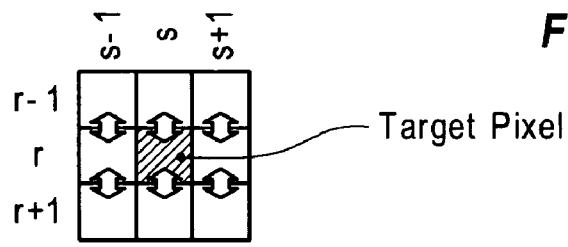
*FIG. 8B*
$$V_h = (CDh(r,s+1) - CDh(r,s))^2 + (CDh(r,s) - CDh(r,s-1))^2$$
$$+ (CDh(r+1,s+1) - CDh(r+1,s))^2 + (CDh(r+1,s) - CDv(r+1,s-1))^2$$
$$+ (CDh(r-1,s+1) - CDh(r-1,s))^2 + (CDh(r-1,s) - CDh(r-1,s-1))^2$$
*FIG. 9A*
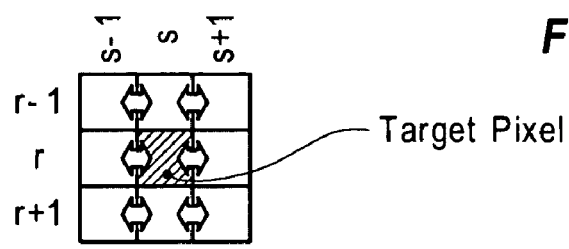
*FIG. 9B*
| B | G | B |
|---|---|---|
| G | R | G |
| B | G | B |
*FIG. 10A*
| R | G | R |
|---|---|---|
| G | B | G |
| R | G | R |
*FIG. 10B*
| G | B | G |
|---|---|---|
| R | G | R |
| G | B | G |
*FIG. 10C*
| G | R | G |
|---|---|---|
| B | G | B |
| G | R | G |
*FIG. 10D*

$$Vv = 2 \cdot (CDv(r+1,s) - CDv(r,s))^2 + 2 \cdot (CDv(r,s) - CDv(r-1,s))^2$$
$$+ (CDv(r+1,s+1) - CDv(r,s+1))^2 + (CDv(r,s+1) - CDv(r-1,s+1))^2$$
$$+ (CDv(r+1,s-1) - CDv(r,s-1))^2 + (CDv(r,s-1) - CDv(r-1,s-1))^2$$

FIG. 11A

$$Vh = 2 \cdot (CDh(r,s+1) - CDh(r,s))^2 + 2 \cdot (CDh(r,s) - CDh(r,s-1))^2$$
$$+ (CDh(r+1,s+1) - CDh(r+1,s))^2 + (CDh(r+1,s) - CDv(r+1,s-1))^2$$
$$+ (CDh(r-1,s+1) - CDh(r-1,s))^2 + (CDh(r-1,s) - CDh(r-1,s-1))^2$$

FIG. 11B

$$Vh = (CDh(r,s+2) - CDh(r,s))^2 + (CDh(r,s) - CDh(r,s-2))^2$$
$$+ (CDh(r,s+2) - CDh(r,s-2))^2$$
$$+ (CDh(r+1,s+2) - CDh(r+1,s))^2 + (CDh(r+1,s) - CDv(r+1,s-2))^2$$
$$+ (CDh(r+1,s+2) - CDh(r+1,s-2))^2$$
$$+ (CDh(r-1,s+2) - CDh(r-1,s))^2 + (CDh(r-1,s) - CDh(r-1,s-2))^2$$
$$+ (CDh(r-1,s+2) - CDh(r-1,s-2))^2$$

FIG. 12A

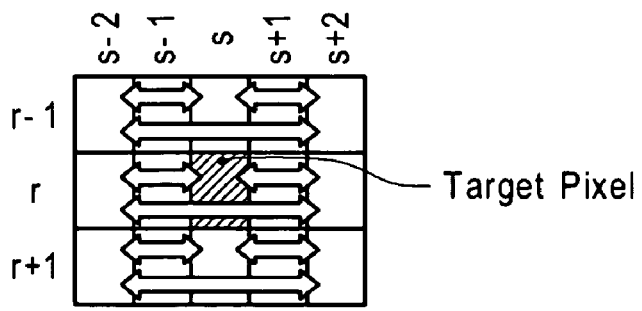

FIG. 12B

| G | B | G |
|---|---|---|
| R | G | R |
| G | B | G |

FIG. 23A

| G | R | G |
|---|---|---|
| B | G | B |
| G | R | G |

FIG. 23B

|   | 1 |   |
|---|---|---|
| 3 |   | 1 |
|   | 1 |   |

FIG. 23C

|   | 3 |   |
|---|---|---|
| 3 |   | 3 |
|   | 1 |   |

FIG. 23D

$$\begin{cases} (z(r,s) - (z(r,s-2)+z(r,s+2))/2)^2 > T \\ \text{or} \\ (z(r,s) - (z(r-2,s)+z(r+2,s))/2)^2 > T \end{cases}$$
← Target Pixel
FIG. 26A
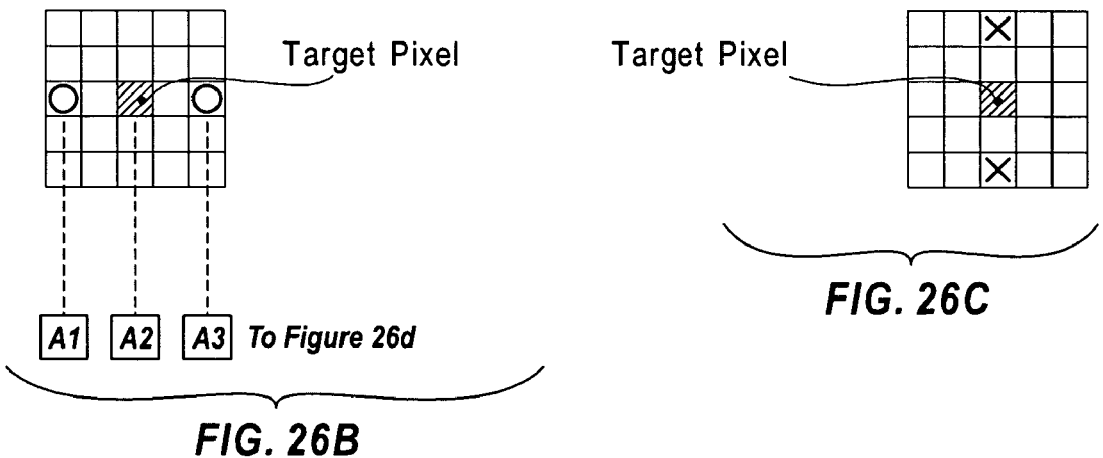
FIG. 26B
FIG. 26C
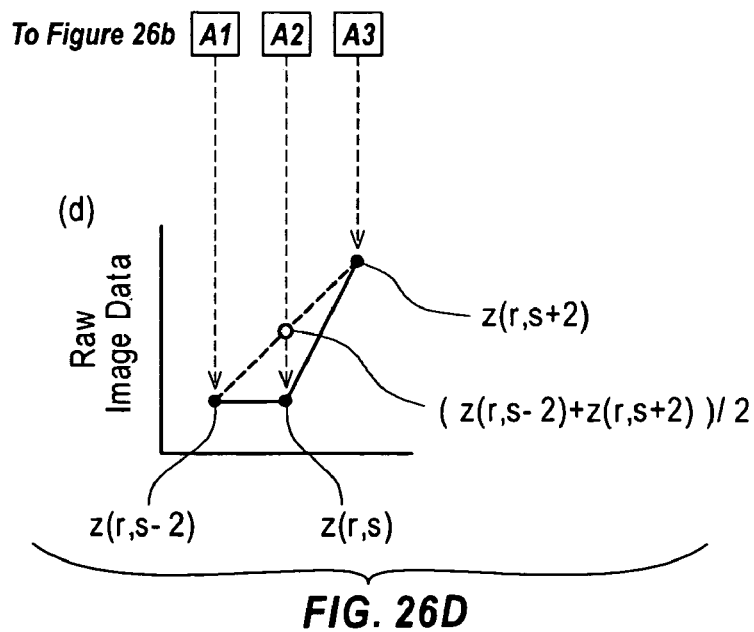
FIG. 26D

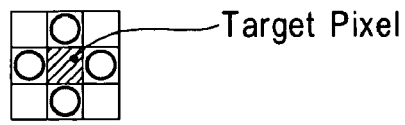
Target Pixel
FIG. 27A
FIG. 27B
$$\begin{cases} (z(r,s-1) - (z(r-1,s)+z(r+1,s))/2)^2 \leqq \alpha \\ \text{and} \\ (z(r-1,s) - (z(r,s-1)+z(r,s+1))/2)^2 \leqq \alpha \\ \text{and} \\ (z(r,s+1) - (z(r-1,s)+z(r+1,s))/2)^2 \leqq \alpha \\ \text{and} \\ (z(r+1,s) - (z(r,s-1)+z(r,s+1))/2)^2 \leqq \alpha \end{cases}$$
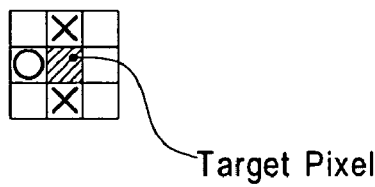
Target Pixel
FIG. 27C
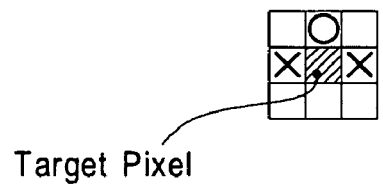
Target Pixel
FIG. 27D
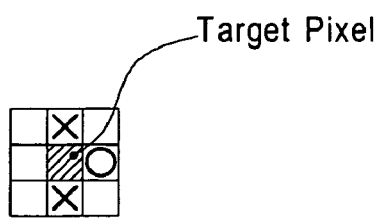
Target Pixel
FIG. 27E
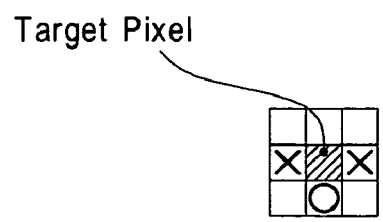
Target Pixel
FIG. 27F
$$\alpha = \max \{((z(r-2,s) + z(r+2,s))/2 - (z(r,s-2) + z(r,s+2))/2)^2 \\ , \min \{(z(r-1,s) - z(r+1,s))^2 , (z(r,s-1) - z(r,s+1))^2 \}\}$$
FIG. 27G

IMAGE PROCESSING PROCEDURE FOR RECEIVING MOSAIC IMAGE DATA AND CALCULATING VERTICAL AND HORIZONTAL-DIRECTION COLOR DIFFERENCE COMPONENTS FOR EACH PIXEL

BACKGROUND

1. Technical Field

Embodiments of the present invention relate to techniques of generating image data with an imaging device, such as a digital camera. More specifically disclosed embodiments pertain to techniques of generating color image data by application of a color filter array having a mosaic arrangement of fine color filters of R (red), G (green), and B (blue) corresponding to three primary colors of light.

2. Related Art

With the advancement of digital techniques, images are increasingly processed as digital data (image data). Imaging devices such as digital cameras enable immediate output of captured images in the form of image data. Imaging devices are typically equipped with an electronic image sensor consisting of small elements for converting light intensities into electric signals. The imaging device focuses a captured image of a subject on the image sensor by means of an optical system and detects the light intensities in the individual elements as electric signals to generate image data. The light entering the optical system may be divided into three color components, R, G, and B, corresponding to three primary colors of light. The respective color lights of the three color components R, G, and B are directed to the image sensor, and the electric signals representing the light intensities of the respective color components acquired by the sensor are output to generate color image data. It is noted that G components are often referred to as "luminance" components whereas R and B components are often referred to as "chrominance" components.

The simplest method of acquiring the respective color lights of the three color components R, G, and B (which are obtained as divisions of the light entering the optical system) by the image sensor uses a spectroscopic prism to divide the incident light into the color lights of the three color components R, G, and B and focuses the respective color lights on image sensors to generate image data with regard to the respective color components R, G, and B. This method undesirably requires the three image sensors. Therefore, an imaging device relying on three image sensors to capture color images is sometimes called a "three image sensor" device.

To reduce the cost of an imaging device, one common technique uses a color filter array to allocate one of the R, G, and B color components to each of the light-sensitive elements constituting the image sensor in order to attain detection of the respective color components R, G, and B by a single image sensor. A typical configuration of this technique provides small color filters allowing transmission of only the R component in front of the photo-elements assigned for detection of the R component, small color filters allowing transmission of only the G component in front of the elements assigned for detection of the G component, and small color filters allowing transmission of only the B component in front of the elements assigned for detection of the B component. Since each element assigned for detection of a predetermined color component (for example, the R component) is unable to detect the other color components (for example, the G component and the B component), the resulting image data accordingly has a mosaic arrangement of pixels of the R component, pixels of the G component, and pixels of the B component. Interpolation of missing color components in each pixel with color components of adjacent pixels enables generation of color image data with the settings of all the color components R, G, and B in all the pixels. The process of interpolating the missing color components in the image data of the mosaic arrangement to generate color image data with the settings of all the color components R, G, and B is sometimes referred to as a "demosaicing process". An imaging device that uses only one image sensor covered by a color filter array is occasionally called a "single image sensor" device.

The single image sensor device requires the interpolation of the missing color components. This naturally consumes the time for interpolation and may cause the occurrence of aliasing colors due to interpolation error. There are diverse proposed techniques with a view to preventing the occurrence of aliasing colors while minimizing an increase of the time required for interpolation. One proposed technique computes color difference components (for example, differences between the G component and the R component) in the respective pixels after computation of the missing color components, removes the pixel with the maximum color difference component and the pixel with the minimum color difference component as noise from a pixel array of a preset number of pixels including a target pixel, and recalculates the respective color components in the target pixel (see Japanese Patent Laid-Open No. 2005-167974). Another proposed technique applies low-pass filters to the color difference components computed in the respective pixels and recalculates the respective color components in the target pixel from the color difference components after removal of noise (see Japanese Patent Laid-Open No. 2005-260908).

SUMMARY

With consumers' increasing demands for higher picture quality from imaging devices, development of demosaicing techniques that prevent the occurrence of aliasing colors has been demanded. Since the number of pixels constituting each image captured by imaging devices is increasing to fulfill consumers' demands for higher picture quality, development of demosaicing techniques that enable high-speed processing has also been demanded.

In order to accomplish at least part of the demands mentioned above, one disclosed embodiment is directed to an image processing apparatus for receiving mosaic image data having settings of only one color component, R, G, or B, in each pixel and subjecting the received mosaic image data to a series of image processing to generate color image data with settings of all the three color components, R, G, and B, in each pixel; wherein the mosaic image data is expressed as a Bayer color filter; and the image processing apparatus comprises:

vertical-direction color difference component computation module configured to obtain the G component in the pixel location of another color component or to obtain another color component in the G component pixel location using vertically neighboring available components in order to compute a vertical-direction color difference component between the G component and the another color component in each pixel included in each of the pixel columns of the mosaic image;

horizontal-direction color difference component computation module configured to obtain the G component in the pixel location of another color component or to obtain another color component in the G component pixel location using horizontally neighboring color components in order to compute a horizontal-direction color difference component between the G component and the another color component in each pixel included in each of the pixel rows of the mosaic image;

edge direction determination module configured to determine an edge direction in a pixel by selecting from among the mosaic image data a pixel in which the R component or the B component is set, and comparing an amount of variation of the vertical color difference component and an amount of variation of the horizontal color change component of the selected pixel;

edge direction map generation module configured to generate an edge direction map in which the edge direction is set in each pixel of the R component and each pixel of the B component, by storing the determined edge direction for each the selected pixel;

edge noise removal module configured to detect edge noise that is an erroneously determined edge direction by comparing the edge direction set in the edge direction map with the edge directions of surrounding pixels, and removing the edge noise; and missing color component interpolation module configured to interpolate a missing color component, which is a color component not set in the pixel for each pixel of the mosaic image data, on the basis of the color component set in the mosaic image data while referencing the edge direction map from which the edge noise has been removed.

In another embodiment, an image processing method corresponds to the image processing apparatus described above and comprises receiving mosaic image data having settings of only one color component, R, G, or B, in each pixel and subjecting the received mosaic image data to a series of image processing to generate color image data with settings of all the three color components R, G, and B in each pixel; wherein the image processing method comprises:

a first step of receiving, as the mosaic image data, image data expressed as a Bayer color filter;

a second step of obtaining the G component and the another color component in each pixel included in each of the pixel columns of the mosaic image data, and computing a vertical-direction color difference component between the G component and the another color component in each pixel included in each of the pixel columns in the vertical direction;

a third step of obtaining the G component and the another color component in each pixel included in each of the pixel rows of the mosaic image data, and computing a horizontal-direction color difference component between the G component and the another color component in each pixel included in each of the pixel rows in the horizontal direction;

a fourth step of determining an edge direction in a pixel by selecting from among the mosaic image data a pixel in which the R component or the B component is set, and comparing an amount of variation of the vertical color difference component and an amount of variation of the horizontal color change component of the selected pixel;

a fifth step of generating an edge direction map in which the edge direction is set in each pixel of the R component and each pixel of the B component, by storing the determined edge direction for each the selected pixel;

a sixth step of detecting edge noise that is an erroneously determined edge direction by comparing the edge direction set in the edge direction map with the edge directions of surrounding pixels, and removing the edge noise; and a seventh step of interpolating a missing color component, which is a color component not set in the pixel for each pixel of the mosaic image data, on the basis of the color component set in the mosaic image data while referencing the edge direction map from which the edge noise has been removed.

In the exemplary image processing apparatus and the corresponding image processing method, the procedure calculates both the vertical-direction color difference component in each of the pixel columns constituting the received mosaic image data and the horizontal-direction color difference component in each of the pixel rows constituting the mosaic image data. The mosaic image data is expressed as the combination of the pixel columns with alternate arrangement of pixels of the G component and pixels of the R component in the vertical direction, the pixel columns with alternate arrangement of pixels of the G component and pixels of the B component in the vertical direction, the pixel rows with alternate arrangement of pixels of the G component and pixels of the R component in the horizontal direction, and the pixel rows with alternate arrangement of pixels of the G component and pixels of the B component in the horizontal direction. Either the color difference component between the G component and the R component or the color difference component between the G component and the B component is obtained as the vertical-direction color difference component in each pixel column. Similarly either the color difference component between the G component and the R component or the color difference component between the G component and the B component is obtained as the horizontal-direction color difference component in each pixel row. The procedure then selects the pixels of the R component and the pixels of the B component from the mosaic image data, and compares the variation of the vertical-direction color difference component with the variation of the horizontal-direction color difference component with regard to each of at least the selected pixels to detect edge directions of the at least selected pixels. As explained above, each of the vertical-direction color difference component and the horizontal-direction color difference component represents either the color difference component between the G component and the R component or the color difference component between the G component and the B component. In the pixels of the R component, both the vertical-direction color difference component and the horizontal-direction color difference component are the color difference components between the G component and the R component. Comparison between the vertical-direction color difference component and the horizontal-direction color difference component accordingly enables accurate detection of the edge direction in each of these pixels of the R component. In the pixels of the B component, both the vertical-direction color difference component and the horizontal-direction color difference component are the color difference components between the G component and the B component. Comparison between the vertical-direction color difference component and the horizontal-direction color difference component accordingly enables accurate detection of the edge direction in each of these pixels of the B component. A pixel in which the R component or the B component is set is then selected from among the mosaic image data, and the amount of variation of the vertical color difference component is compared with the amount of variation of the horizontal color difference component, and the edge direction in the pixel is thereby determined. As described above, since the vertical color difference component and the horizontal color difference component can only be the color difference component between the G component and the R component or the color difference component between the G component and the B component, in a pixel in which the R component is set, the vertical color difference component is the color difference component between the G component and the R component, and the horizontal color difference component is also the color difference component between the G component and the R component. Consequently, the direction of an edge in the pixel can be determined by comparing the vertical and horizontal color difference components. In the same manner, in a pixel in which the B component is set, the vertical color difference component is the color difference component between the G component and the B component, and the horizontal color difference component is also the color difference component between the G component and the B component. Consequently, the direction of the edge can be determined by comparing the vertical and horizontal color difference components. An edge direction map can be generated by determining the edge directions for the R-component pixels and the B-component pixels. The edge direction set in the edge direction map is then compared with the surrounding edge directions, and the edge noise is removed, whereby an accurate edge direction map is generated. The procedure refers to the accurately detected edge directions and adequately interpolates the missing color component in each pixel of the mosaic image data with the settings of one color component in each pixel in the mosaic image data. This arrangement thus enables generation of adequate color image data.

Edge noise may be removed as described below in the image processing apparatus of the present invention. First, a single pixel in which the edge direction is set is selected from the edge direction map, and the pixel is set as a target pixel for determining whether the edge direction is edge noise. A determination is then made as to whether the edge directions are the same in two pixels that are in the position of the second pixel in the vertical direction (upward direction or downward direction) from the target pixel. Alternatively, a determination is made as to whether the edge directions are the same in two pixels that are in the position of the second pixel in the horizontal direction (left direction or right direction) from the target pixel. A determination is made that the edge direction of the target pixel is edge noise when the two edge directions of at least one of the pixels are the same, and the edge directions differ from the edge direction of the target pixel. The edge direction that is determined to be edge noise may also be changed to a different edge direction.

Since natural images exhibit significant spatial correlation, edge directions usually occur as blocks of the same edge direction. Consequently, applying the method described above makes it possible to effectively remove an edge noise included in the edge direction map.

Alternatively, edge noise may be removed in the following manner. First, a single target pixel for determining the presence of edge noise is selected from the edge direction map. Four pixels adjacent to the target pixel in diagonal directions are then selected, and a determination is made as to whether the edge directions set in the four pixels are all the same as each other and different than the edge direction of the target pixel. When such a target pixel (a target pixel for which the edge directions of the four pixels in diagonal directions are all the same as each other but different than the edge direction of the target pixel) is found, insofar as the following condition is not satisfied, a determination is made that the edge direction of the target pixel is edge noise, and the edge direction is changed. Specifically, all the pixels within a prescribed number of pixels in the vertical direction (upward direction and downward direction) are selected, or all the pixels within a prescribed number of pixels in the horizontal direction (right direction and left direction) are selected. A determination is made that the edge direction of the target pixel is edge noise insofar as all of the edge directions set in the selected pixels are not the same as the edge direction of the target pixel.

The target pixel and the pixels adjacent thereto in diagonal directions have different color components in the demosaicing image data. Consequently, when viewed in diagonal directions from the target pixel, even when the target pixel has different edge directions on both sides thereof, the edge direction of the target pixel cannot immediately be determined to be edge noise. However, when the edge directions of the four pixels diagonally adjacent to the target pixel are all the same as each other, and the edge directions are different than the edge direction of the target pixel, it is highly probable that the edge direction of the target pixel is edge noise. Accordingly, in such a case, the edge directions are referenced in pixels having the same color component that are present in the vertical direction or the horizontal direction with the target pixel at the center. Specifically, with the target pixel at the center, all the pixels within a prescribed number of pixels in the vertical direction are selected, or all the pixels within a prescribed number of pixels in the horizontal direction are selected, and the edge directions of the selected pixels are referenced. In either the vertical direction or the horizontal direction, if the same edge direction is continuous including the target pixel, a determination is made that the edge direction of the target pixel is not edge noise, but when the same edge direction is not continuous including the target pixel, a determination is made that the edge direction of the target pixel is edge noise. Edge noise can thereby be appropriately detected and removed.

Edge noise may also be removed in the following manner. First, an area is extracted in which the amount of variation between color components having the same mosaic image data is smaller than a prescribed first threshold value and larger than a second threshold value (which is smaller than the first threshold value). The edge noise may then be removed with respect to the edge directions set in the pixels within the area.

It is not necessarily impossible for a correct edge direction to be mistakenly determined to be edge noise during edge noise removal. When such an erroneous determination occurs, removing the edge noise of the edge direction map may have the effect of introducing new edge noise. Therefore, rather than removing the edge noise for all areas of the edge direction map, edge noise is removed only for areas for which edge noise removal is actually necessary. The risk of introducing new edge noise can thereby be reduced. Specifically, in an area in which aliasing is unlikely to occur, since no problems occur even when edge noise is present, there is little need to remove the edge noise. Experimentation has shown that aliasing is unlikely to occur in areas in which there is significant variation between color components having the same mosaic image data, or in areas in which there is almost no variation. Consequently, adopting a configuration in which an area is extracted in which the amount of variation between color components having the same mosaic image data is smaller than a prescribed first threshold value and larger than a second threshold value (which is smaller than the first threshold value), and in which the edge noise is removed only for the extracted area, makes it possible to reduce the risk of introducing new edge noise into the edge direction map. Since there is no need to remove edge noise for all the areas of the edge direction map, the edge noise can be rapidly removed from the edge direction map.

The edge noise may also be removed a plurality of times with respect to the edge direction map from which edge noise has been removed.

Not all of the edge noise can necessarily be removed by performing the edge noise removal operation only once. For some arrangements of edge noise, it is possible for a small amount of edge noise to remain. For some characteristics of the edge noise, it may also be impossible for the edge noise to be completely removed by a single method. Even in such a case, the edge noise can be more reliably removed by removing the edge noise a plurality of times using the same method or a different method for an edge direction map from which the edge noise has been removed.

In another application, a computer reads a computer-readable medium having a program for actualizing the image processing method described above to attain the respective functions. Another embodiment of the invention is accordingly a computer-readable medium having program for causing a computer to actualize a method for receiving mosaic image data having settings of only one color component, R, G, or B, in each pixel and subjecting the received mosaic image data to a series of image processing to generate color image data with settings of all the three color components R, G, and B in each pixel; the program causing the computer to actualize:

a first function of receiving, as the mosaic image data, image data expressed as a Bayer color filter;

a second function of obtaining the G component and the another color component in each pixel included in each of the pixel columns of the mosaic image data, and computing a vertical-direction color difference component between the G component and the another color component in each pixel included in each of the pixel columns in the vertical direction;

a third function of obtaining the G component and the another color component in each pixel included in each of the pixel rows of the mosaic image data, and computing a horizontal-direction color difference component between the G component and the another color component in each pixel included in each of the pixel rows in the horizontal direction;

a fourth function for determining an edge direction in a pixel by selecting from among the mosaic image data a pixel in which the R component or the B component is set, and comparing an amount of variation of the vertical color difference component and an amount of variation of the horizontal color change component of the selected pixel;

a fifth function for generating an edge direction map in which the edge direction is set in each pixel of the R component and each pixel of the B component, by storing the determined edge direction for each the selected pixel;

a sixth function for detecting edge noise that is an erroneously determined edge direction by comparing the edge direction set in the edge direction map with the edge directions of surrounding pixels, and removing the edge noise; and a seventh function for interpolating a missing color component, which is a color component not set in the pixel for each pixel of the mosaic image data, on the basis of the color component set in the mosaic image data while referencing the edge direction map from which the edge noise has been removed.

The computer reads the program according to this embodiment to attain the respective functions described above and adequately interpolate the missing color components of the mosaic image data. This arrangement thus facilitates the high-speed generation of the color image data while effectively preventing the occurrence of aliasing colors.

BRIEF DESCRIPTION OF THE DRAWINGS

FIGS. 5A and 5B show calculation formulae for calculating color difference components from raw image data;

FIGS. 8A and 8B show calculation of a variation Vv in a vertical direction from color difference components CDv in the vertical direction;

FIGS. 9A and 9B show calculation of a variation Vh in a horizontal direction from color difference components CDh in the horizontal direction;

FIGS. 10A-10D show possible arrangements of adjacent pixels around a target pixel selected for detection of an edge direction;

FIGS. 11A and 11B show one method applicable to detection of edge directions in G pixels;

FIGS. 12A and 12B show an example of another method for computing the amount of variation of a color difference component;

FIGS. 23A-23D show estimation of an edge direction in a G interpolation target pixel from edge directions of adjacent pixels.

FIGS. 26A-26D are diagrams showing an example of the method for determining, based on raw image data, whether a sharp edge is present at the position of the target pixel;

FIGS. 27A-27G are diagrams showing an example of the method for determining, based on raw image data, whether a position of the target pixel is within an adequately uniform area;

DESCRIPTION OF EXAMPLE EMBODIMENTS

Figure 1:
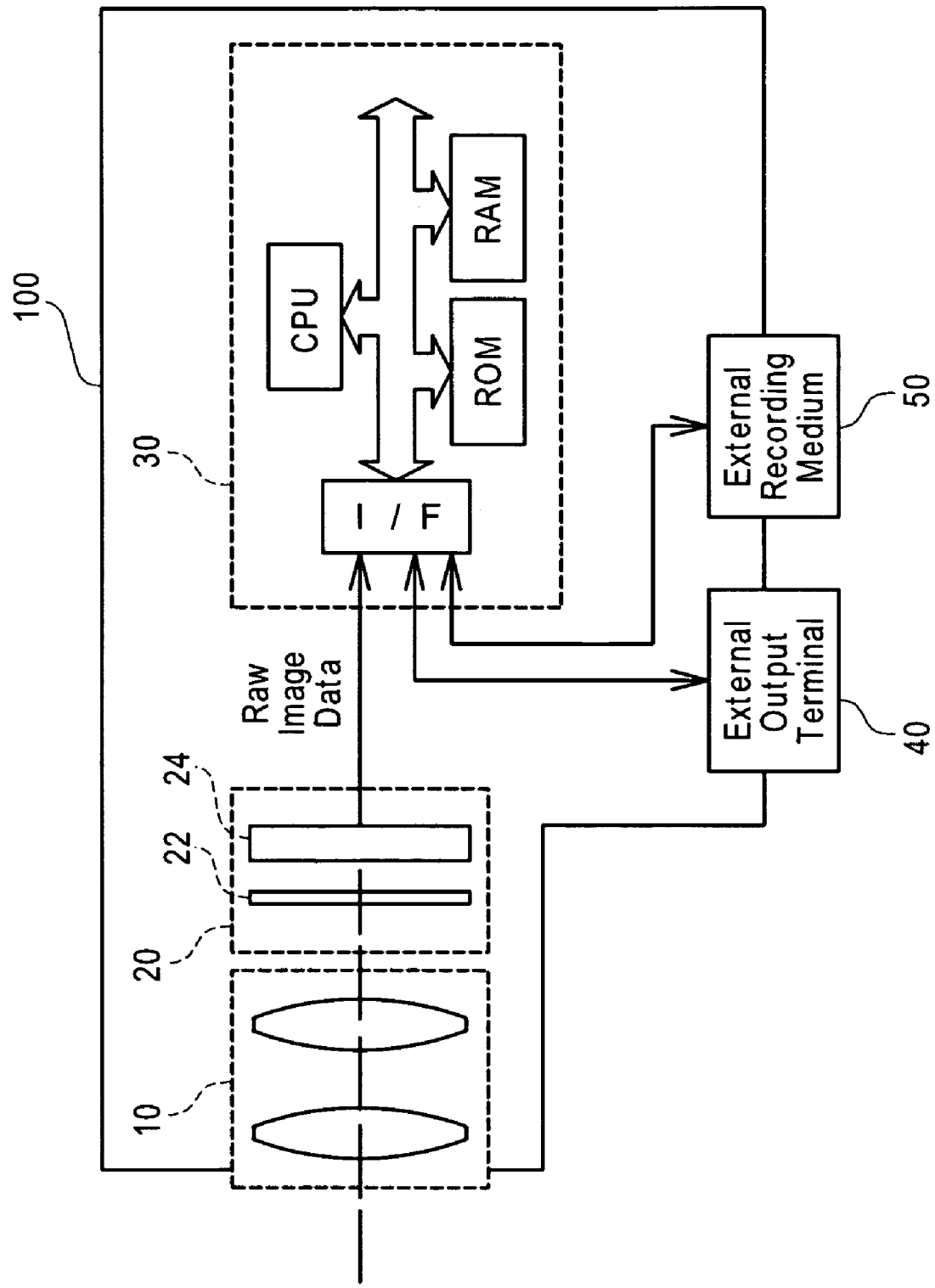
FIG. 1 schematically illustrates the configuration of a digital camera equipped with an image processing apparatus in one embodiment of the invention.

The invention may be understood more fully with reference to a preferred embodiment described below in the following sequence based on the accompanying drawings:
A. System Configuration
B. Outline of Color Image Data Generation Process
C. Edge Direction Map Creation Process
D. Edge Noise Removal Process:
    D-1. Isolated Noise Removal Process
    D-2. Cluster Noise Removal Process
E. G Component Interpolation Process
F. Non-G Pixel Interpolation Process
G. G Pixel Interpolation Process
H. Modifications:
    H-1. Modification 1
    H-2. Modification 2
    H-3. Modification 3
A. System Configuration FIG. 1 schematically illustrates the configuration of a digital camera 100 equipped with an image processing apparatus 30 in one embodiment of the invention. As illustrated, the digital camera 100 includes an optical system 10 that has a group of multiple lenses, an imaging assembly 20 that converts an image of a subject formed by the optical system 10 into electric signals, and the image processing apparatus 30 that receives the electric signals from the imaging assembly 20 and makes the received electric signals subjected to a predetermined series of image processing to generate color image data.

The imaging assembly 20 has an image sensor 24 with a two-dimensional arrangement of multiple fine imaging elements for converting the light intensities into electric signals. A color filter array 22 is provided before the image sensor 24 and has a mosaic arrangement of fine color filters of R (red), G (green), and B (blue). The arrangement of the R, G, and B color filters constituting the color filter array 22 will be described later in detail. The R color filters, the G color filters, and the B color filters are constructed to allow transmission of R color light, transmission of G color light, and transmission of B color light, respectively. The image sensor 24 captures image data having a mosaic arrangement of image parts responsive to the R light intensities, image parts responsive to the G light intensities, and image parts responsive to the B light intensities according to the mosaic arrangement of the R, G, and B color filters in the color filter array 22.

The image processing apparatus 30 mounted on the digital camera 100 receives the image data of the mosaic arrangement from the imaging assembly 20 and generates color image data with settings of the R component, the G component, and the B component in the respective pixels. In the image processing apparatus 30 of the embodiment, a CPU, a ROM, a RAM, and a data input/output interface (I/F) are interconnected via a bus to enable mutual data transmission. The CPU performs a series of processing to generate the color image data according to a program stored in the ROM. Alternatively, the program can be stored on a computer-readable medium. Computer-readable media can include, for example, magnetic media such as hard disks, diskettes, and magnetic tape; optical media such as CD-ROMs and holographic devices; and various hardware devices such as ASICs, PDLS, flash memory devices, and ROM and RAM devices. The resulting color image data thus generated may be output to an external device via an external output terminal 40 or may be output to an external recording medium 50.

The image data with the mosaic arrangement of the R, G, and B components captured by the image sensor 24 is used as source data, which is referred to by the image processing apparatus 30 to generate the color image data with the settings of the R, G, and B components in the respective pixels. The image data of the mosaic arrangement captured by the image sensor 24 may thus be hereafter referred to as "raw image data".

Figure 2:
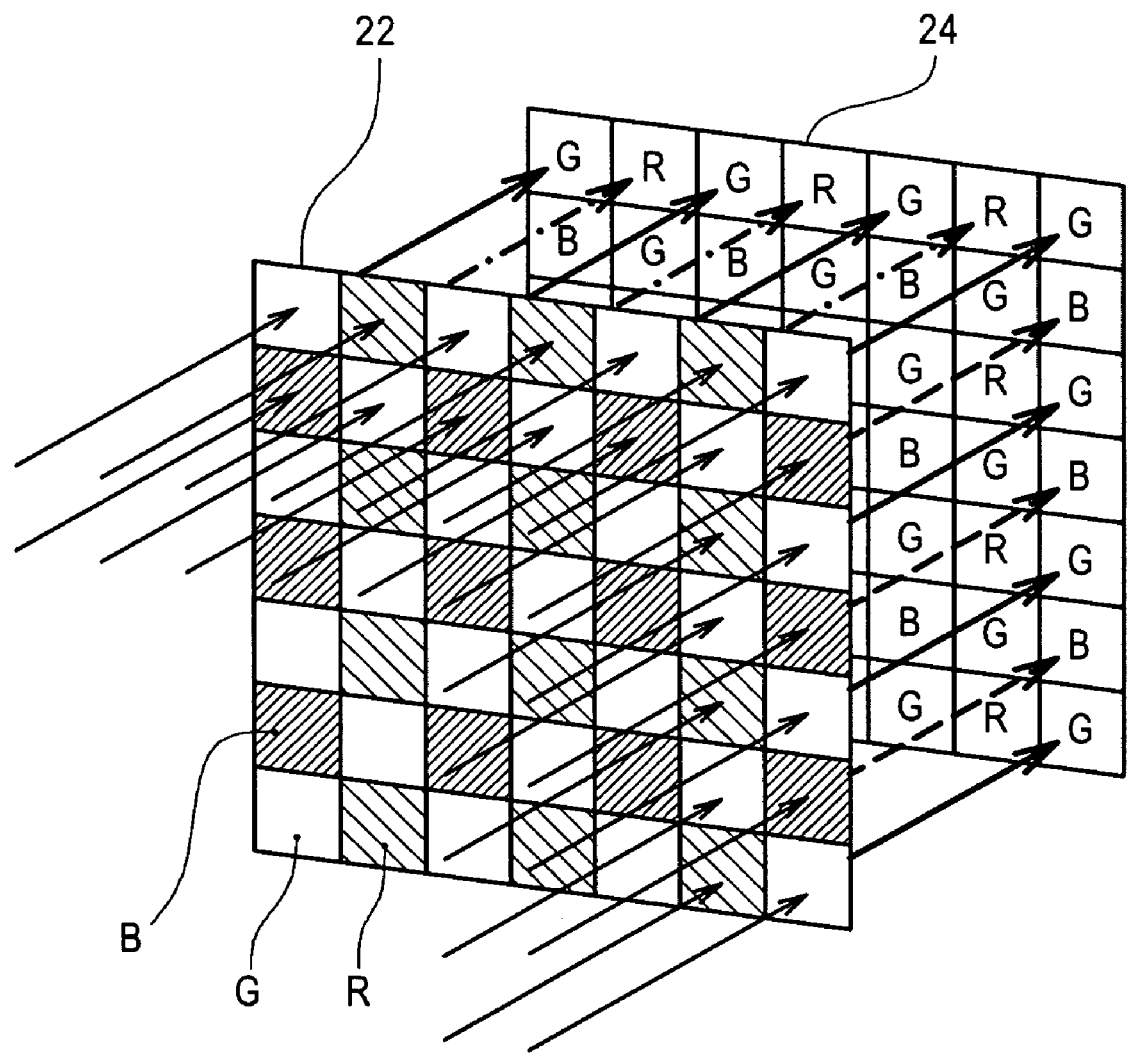
FIG. 2 is a conceptual view showing the structure of a color filter array and an image sensor included in the image processing apparatus of FIG. 1.

FIG. 2 is a conceptual view showing the structure of the color filter array 22 and the image sensor 24. As mentioned above, the image sensor 24 has the two-dimensional arrangement of fine imaging elements that output electric signals corresponding to the light intensities. In the illustrated example of FIG. 2, the fine imaging elements are arranged in a lattice pattern. Each of small rectangles in the lattice pattern of the image sensor 24 conceptually represents one imaging element (or light-sensitive photo element).

The color filter array 22 has one of the R color filter, the G color filter, and the B color filter set corresponding to the position of each of the multiple imaging elements constituting the image sensor 24. In FIG. 2, the sparsely hatched rectangles, the densely hatched rectangles, and the non-hatched open rectangles respectively denote the R color filters, the B color filters, and the G color filters. In the arrangement of the R, G, and B color filters, the G color filters are positioned first to be diagonal to one another and form a checkerboard pattern. Namely the G color filters occupy half the area of the color filter array 22. The same numbers of the R color filters and the B color filters are then evenly arranged in the remaining half area of the color filter array 22. The resulting color filter array 22 of this arrangement shown in FIG. 2 is called the Bayer color filter array.

As mentioned above, the G color filters, the R color filters, and the B color filters are designed to allow transmission of only the G color light, transmission of only the R color light, and transmission of only the B color light, respectively. The image sensor 24 accordingly captures the image data of the mosaic arrangement by the function of the Bayer color filter array 22 located before the image sensor 24 as shown in FIG. 2. The image data of the mosaic arrangement is not processable in the same manner as ordinary image data and cannot directly express an image. The image processing apparatus 30 receives the image data of the mosaic arrangement (raw image data) and generates ordinary color image data having the settings of the R, G, and B components in the respective pixels.

B. Outline of Color Image Data Generation Process

Figure 3:
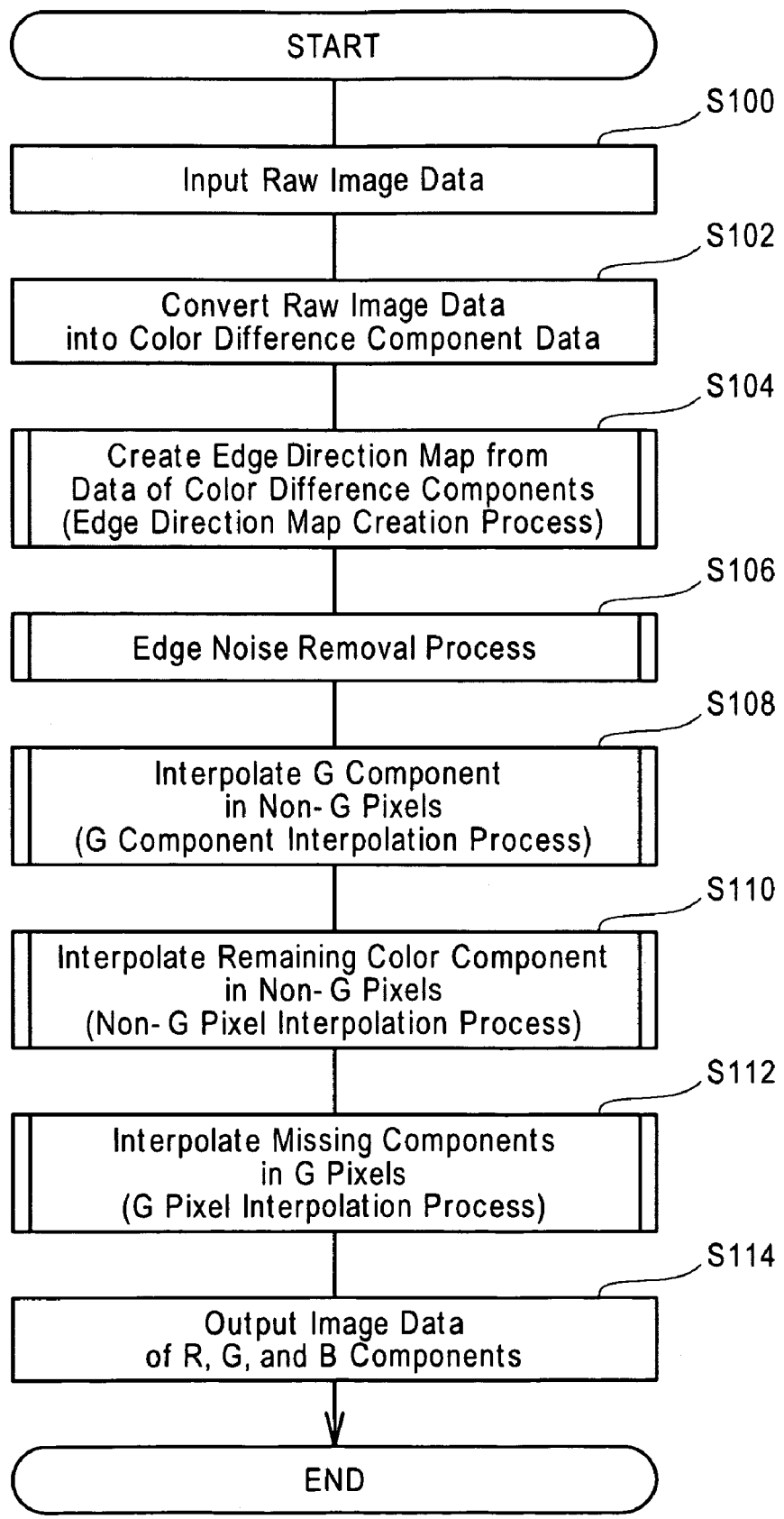
FIG. 3 is a flowchart showing a color image data generation process, which is executed by the image processing apparatus of the embodiment to generate color image data from raw image data.

FIG. 3 is a flowchart showing a color image data generation process, which is executed by the image processing apparatus 30 of the embodiment to generate color image data from the raw image data. In the structure of this embodiment, the CPU included in the image processing apparatus 30 executes this color image data generation by the software configuration. This is, however, not essential, but a specific hardware element, for example, a signal processor, may be used for the same purpose.

On the start of the color image data generation process, the CPU first receives raw image data as source data from the image sensor 24 (step S100) and converts the received raw image data into data of color difference components (step S102) as described below in detail.

Figure 4:
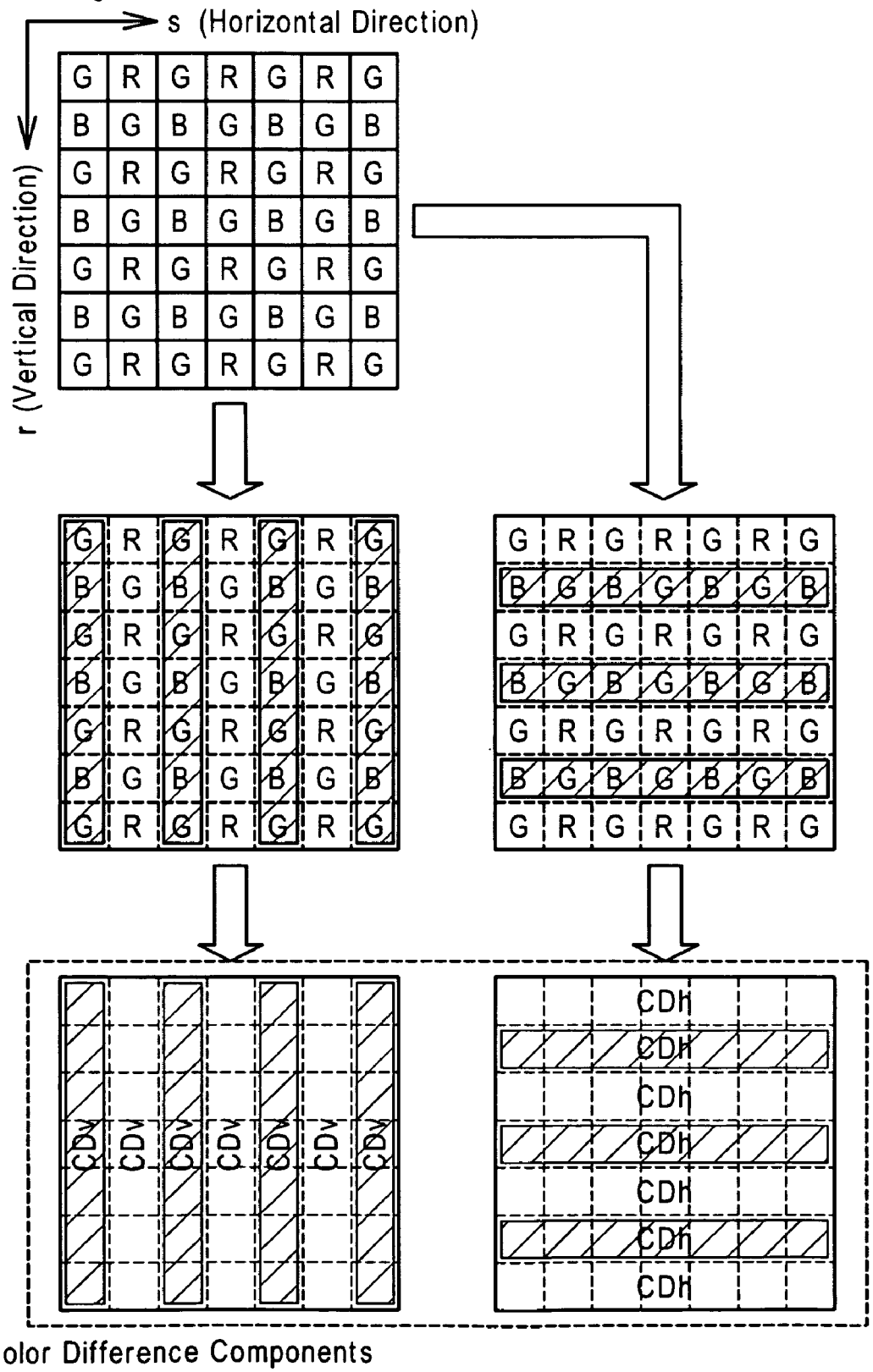
FIG. 4 conceptually shows a process of converting raw image data into data of color difference components.

FIG. 4 conceptually shows a process of converting raw image data into data of color difference components. The top of FIG. 4 shows a conceptual view of the raw image data read from the image sensor 24. The raw image data obtained with the Bayer color filter array has the mosaic arrangement of the R, G, and B components. In a horizontal direction, there are only two types of pixel rows in the raw image data: pixel rows having alternately arranged G pixels (pixels with G component) and R pixels (pixels with R component) and pixel rows having alternately arranged G pixels and B pixels (pixels with B component). In a vertical direction, there are similarly only two types of pixel columns in the raw image data: pixel columns having alternately arranged G pixels and R pixels and pixel columns having alternately arranged G pixels and B pixels. The middle of FIG. 4 conceptually shows that the raw image data consists of only the pixel rows of alternate G pixels and R pixels and the pixel rows of alternate G pixels and B pixels in the horizontal direction while consisting of only the pixel columns of alternate G pixels and R pixels and the pixel columns of alternate G pixels and B pixels.

Based on this result of observation, the color image data generation process of this embodiment converts the raw image data of the R, G, and B components into data representing differences of color components of the pixel rows in the horizontal direction (color difference components in the horizontal direction) and data representing differences of color components of the pixel columns in the vertical direction (color difference components in the vertical direction). For example, the raw image data is converted into data on color difference components between G and R components with regard to the pixel rows or the pixel columns of alternate G pixels and R pixels. Similarly the raw image data is converted into data on color difference components between G and B components with regard to the pixel rows or the pixel columns of alternate G pixels and B pixels. Calculation formulae for calculating the color difference components will be described in detail later.

The bottom of FIG. 4 conceptually shows the color difference components in the horizontal direction and in the vertical direction thus obtained. A left-side view on the bottom shows color difference components CDv in the vertical direction obtained by processing the raw image data in the vertical direction. Each of the hatched pixel columns corresponds to a pixel column of alternate G pixels and B pixels. Each color difference component CDv on this pixel column accordingly represents a color difference component between the G component and the B component. Each of the remaining non-hatched pixel columns corresponds to a pixel column of alternate G pixels and R pixels. Each color difference component CDv on this pixel column accordingly represents a color difference component between the G component and the R component. The raw image data in the horizontal direction is similarly processable. Each of hatched pixel rows gives color difference components CDh between the G pixels and the B pixels. Each of the remaining non-hatched pixel rows gives color difference components CDh between the G pixels and the R pixels.

FIGS. 5A and 5B show calculation formulae for calculating the color difference components from the raw image data. FIG. 5A shows calculation formulae for calculating the color difference components CDv in the vertical direction, and FIG. 5B shows calculation formulae for calculating the color difference components CDh in the horizontal direction. In these calculation formulae, "z" denotes values of the raw image data obtained by the image sensor 24, and z(r,s) shows a value at a specific position defined by an r-th pixel position downward from the position of the origin set in an image and an s-th pixel position rightward from the position of the origin (see the top of FIG. 4).

Referring to FIG. 5A, the description regards the calculation formulae for calculating the color difference components CDv in the vertical direction. When a target pixel as an object of computation of the color difference component CDv is a pixel with the G component (G pixel), the upper calculation formula of FIG. 5A is adopted. The process first calculates an average of values of pixels directly above and below the target pixel (that is, a second term surrounded by the one-dot chain line) and subtracts the calculated average from the G component of the target pixel (that is, a first term surrounded by the broken line) to calculate a color difference component CDv of the target pixel in the vertical direction. Since the target pixel for computation of the color difference component CDv is the G pixel, the tone value z(r,s) of the target pixel naturally represents the G component. The element $z(r-1,s)$ in the second term shows a tone value of the raw image data in the pixel above the target pixel, whereas the element $z(r+1,s)$ in the second term shows a tone value of the raw image data in the pixel below the target pixel. As explained above with reference to FIG. 4, these two pixels above and below the target G pixel may be R pixels or B pixels but are always pixels of an identical color component. The second term surrounded by the one-dot chain line in the upper calculation formula in FIG. 5A accordingly represents either the R component or the B component calculated from the values of the pixels (that is, either the R pixels or the B pixels) neighboring the target pixel in the vertical direction. Application of the upper calculation formula in FIG. 5A determines the color difference component CDv in the vertical direction with regard to the pixel with the G component (G pixel), irrespective of the vertically neighboring pixels as the R pixels or the B pixels.

It should be noted that application of the identical calculation formula to the R pixels and the B pixels as the vertically neighboring pixels gives two different types of the color difference components CDv. When the pixels neighboring the target pixel in the vertical direction are the R pixels, the resulting color difference component CDv in the vertical direction represents the color difference component between the G component and the R component. When these two pixels are the B pixels, on the other hand, the resulting color difference component CDv in the vertical direction represents the color difference component between the G component and the B component.

The color difference components CDv in the vertical direction are similarly computable with regard to pixels other than the G pixels (that is, R pixels and B pixels). For example, when a target pixel as the object of computation of the color difference component CDv is an R pixel, pixels directly above and below the target pixel are G pixels as explained above with reference to FIG. 4. The average of the values of these two pixels is believed to specify the G component in the target pixel as the object of computation of the color difference component CDv. Subtraction of the tone value of the target pixel (in this case, the R component) from the specified G component determines the color difference component CDv. Each B pixel set as the target pixel is subjected to the same series of processing. With regard to the pixels other than the G pixels, as shown in the lower calculation formula of FIG. 5A, subtraction of a second term surrounded by the one-dot chain line from a first term surrounded by the broken line on the right side gives the color difference component CDv in the vertical direction.

The identical calculation formula is applicable to computation of the color difference components CDv in the vertical direction, with regard to both the R pixel and the B pixel set as the target pixel other than the G pixel. It should, however, be noted that the R pixel and the B pixel processed as the target pixel give two different types of the color difference components CDv. When the target pixel is the R pixel, the resulting color difference component CDv represents the color difference component between the G component and the R component. When the target pixel is the B pixel, on the other hand, the resulting color difference component CDv represents the color difference component between the G component and the B component.

The color image data generation process of the embodiment applies the completely identical calculation formulae for the advanced processing with the two different types of the color difference components CDv. Application of the identical calculation formulae desirably attains the simplicity and the high speed of the advanced processing with the two different types of the color difference components CDv, which are comparable to the conventional simple processing. Unlike the conventional simple processing, however, this advanced processing of the embodiment enables adequate demosaicing with prevention of the occurrence of aliasing colors.

The color difference components CDh in the horizontal direction are computable in the same manner as the color difference components CDv in the vertical direction explained above. The computation of the color difference components CDh is explained briefly with reference to FIG. 5B. As shown in the upper calculation formula of FIG. 5B, subtraction of a second term surrounded by the one-dot chain line from a first term surrounded by the broken line on the right side gives the color difference component CDh of the G pixel in the horizontal direction. In the calculation formula, the element z(r,s) represents a tone value (that is, the G component) of the raw image data in a target pixel as the object of computation of the color difference component. The element z(r,s−1) shows a tone value of the raw image data in a pixel on the left of the target pixel, whereas the element z(r,s+1) shows a tone value of the raw image data in a pixel on the right of the target pixel. These two pixels on the left and the right of the target G pixel may be R pixels or B pixels but are always pixels of an identical color component.

In computation of the color difference component CDh in the horizontal direction with regard to a target pixel other than the G pixel (that is, with regard to either an R target pixel or a B target pixel), the pixels on the left and the right of the R or B target pixel are the G pixels. As shown in the lower calculation formula of FIG. 5B, subtraction of a second term surrounded by the one-dot chain line (a tone value of the target pixel) from a first term surrounded by the broken line (an average of values of the left and the right pixels) gives the color difference component CDh in the horizontal direction.

The identical calculation formulae are applicable to computation of the color difference components CDh in the horizontal direction, with regard to the target G pixel having the R pixels or the B pixels as the left and the right pixels and with regard to both the R pixel and the B pixel set as the target pixel other than the G pixel. The computation, however, gives two different types of the color difference components CDh, that is, the color difference component between the G component and the R component and the color difference component between the G component and the B component. Application of the completely identical calculation formulae desirably attains the simplicity and the high speed of the advanced processing with the two different types of the color difference components CDh in the horizontal direction, which are comparable to the conventional simple processing.

As clearly understood from the comparison between FIGS. 5A and 5B, the calculation formulae used for computation of the color difference components CDv in the vertical direction are significantly similar to the calculation formulae used for computation of the color difference components CDh in the horizontal direction. Namely the processing flow can be standardized for computation of both the color difference components CDv and CDh in the two different directions. This further enhances the simplicity and the high speed of the overall processing.

At step S102 in the flowchart of FIG. 3, the raw image data captured by the image sensor 24 is converted into the color difference components CDv in the vertical direction and the color difference components CDh in the horizontal direction. It is preferable, although not essential, to apply low pass filters to the color difference components CDv in the vertical direction and the color difference components CDh in the horizontal direction for the purpose of removal of possible noise from these color difference components. As explained later, the color image data generation process of the embodiment uses the color difference components for detection of the edge directions included in the image. Application of the low pass filters is generally undesirable since the low pass filters have a tendency to blur the edges and lower the detection accuracy of the edges. The procedure of this embodiment, however, enables detection of the edge directions with extremely high accuracy as described later. Some blur of the edges thus does not significantly lower the detection accuracy, but the noise removal enables stable detection of the edge directions.

Figures 6A, 6B:
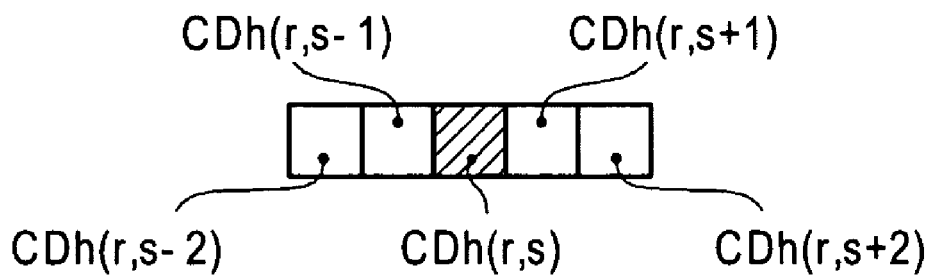
FIGS. 6A and 6B show low pass filters applied for removal of noise included in color difference components.

FIGS. 6A and 6B shows low pass filters applied for removal of noise included in color difference components. FIG. 6A shows low pass filters to be applied to the color difference components CDv in the vertical direction and to be applied to the color difference components CDh in the horizontal direction. For the better understanding, FIG. 6B shows application of the low pass filter to the color difference component CDh in the horizontal direction. A target pixel as an object of application of the low pass filter is represented by a hatched rectangle in FIG. 6B. The low pass filter of this embodiment sums up a color difference component in the target pixel and color difference components in two pixels on the left and two pixels on the right of the target pixel. The color difference component of the target pixel is multiplied by a weight of four pixels, so that the summed color difference components correspond to eight pixels. In this case, simple 3-bit shift of the sum to the lower bit gives a color difference component of one pixel, which is equivalent to a division of the sum by 8. Such weighting enables the high-speed processing with the low pass filter.

Each of the color difference components CDv in the vertical direction and the color difference components CDh in the horizontal direction may represent the color difference component between the G component and the R component or the color difference component between the G component and the B component, as explained previously. The low pass filters are applicable to the color difference components CDv in the vertical direction and the color difference components CDh in the horizontal direction without taking into account such different types of the color difference components. The color image data generation process of the embodiment thus attains the extreme simplicity and the high speed of the advanced processing.

Referring back to the flowchart of FIG. 3, after computation of the color difference components CDv in the vertical direction and the color difference components CDh in the horizontal direction in the above manner, the color image data generation process of the embodiment creates an edge direction map with these data on the color difference components (edge direction map creation process) (step S104). The edge direction map shows the orientation of each edge included in the image as either the vertical direction or the horizontal direction. The direction of an edge may be set in advance in all the pixels, but in the present embodiment, the edge direction is set for pixels (R pixels and B pixels) other than the G pixels in order to speed up processing.

A detailed description will be given hereinafter. In the color image data generation process of the present embodiment, processing is performed for interpolating color components that are missing (e.g., the R component and the B component in the case of a G pixel, the G component and the B component in the case of an R pixel, and the G component and the R component in the case of a B pixel) in the raw image data while the edge direction map is referenced. The inclusion of noise in the edge direction set in the edge direction map makes it impossible to appropriately interpolate the color components missing from the raw image data. Therefore, once the edge direction map is generated, processing (edge noise removal process) is performed for removing noise (edge noise) in the edge direction map prior to interpolation of the missing color components (step S106). The edge noise removal process will be described in detail hereinafter.

Once the edge noise in the edge direction map is removed, the CPU determines the tone value of the G component in each target pixel other than the G pixel (that is, either the R pixel or the B pixel) by interpolation (G component interpolation process) (step S108). The G component interpolation process refers to the edge direction map and performs interpolation with the values of the G component in adjacent pixels to determine the adequate value of the G component in the non-G target pixel. The details of this G component interpolation process will be described later.

The CPU subsequently performs interpolation of the remaining color component in the non-G target pixel other than the G pixel (non-G pixel interpolation process) (step S110). The G component of the non-G target pixel, which may be the R pixel or the B pixel, has already been determined by interpolation at preceding step S108. The processing of step S108 thus interpolates the B component for the R target pixel, while interpolating the R component for the B target pixel. The pixels other than the G pixels accordingly have obtained all the color components R, G, and B. The details of the non-G pixel interpolation process (interpolation of the remaining color component after interpolation of the G component with regard to each non-G target pixel other than the G pixel) will be described later.

On completion of the interpolation in the pixels other than the G pixels, the CPU interpolates the missing color components (the R component and the B component) of the raw image data with regard to each G target pixel (G pixel interpolation process) (step S112). The G pixel interpolation process also refers to the edge direction map and performs interpolation to determine the adequate values of the missing color components in the G target pixel. The details of this G pixel interpolation process will be described later.

On completion of the interpolation of the missing color components in the pixels other than the G pixels (step S108 and step S110) and the interpolation of the missing color components in the G pixels (step S112), all the pixels have obtained all the color components R, G, and B. The CPU subsequently outputs the obtained RGB color components as color image data generated from the raw image data (step S114) and terminates the color image data generation process of FIG. 3.

As described above, the color image data generation process of this embodiment detects the edge directions based on the color difference components CDv in the vertical direction and the color difference components CDh in the horizontal direction to create the edge direction map. More specifically the edge directions are detected according to the two different types (the color difference component between the G component and the R component and the color difference component between the G component and the B component) of the color difference components CDv in the vertical direction and the color difference components CDh in the horizontal direction, whereby the edge direction map is generated with good precision. Furthermore, executing the process for removing noise from the edge direction map generated in this manner makes it possible to generate an even more precise edge direction map. Application of this extremely accurate edge direction map enables adequate interpolation of the missing color components for the raw image data. The edge direction map creation process, the process for removing edge noise in the edge direction map, and the interpolation of the missing color components are rather simple and are executable at the high speed. The above series of processing in the embodiment thus enables high-speed generation of adequate color image data from raw image data with a mosaic arrangement of the R, G, and B color components. The following description sequentially regards the details of the edge direction map creation process, the process (edge noise removal process) for removing edge noise in the edge direction map, the G component interpolation process (interpolation of the G component in the pixels other than the G pixels), the non-G pixel interpolation process (interpolation of the remaining color component in the pixels other than the G pixels), and the G pixel interpolation process (interpolation of the missing color components in the G pixels).

C. Edge Direction Map Creation Process

Figure 7:
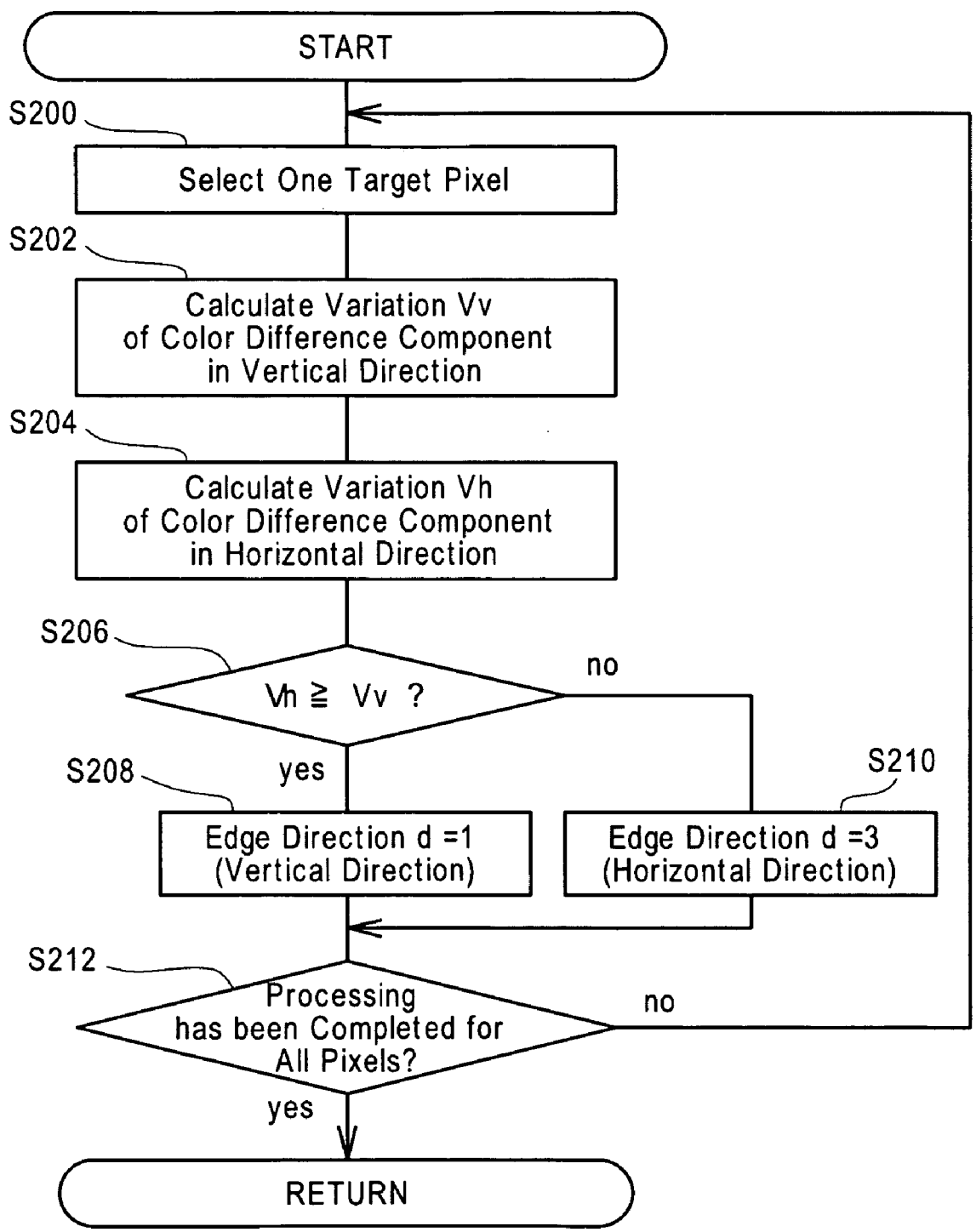
FIG. 7 is a flowchart showing the details of an edge direction map creation process executed in the color image data generation process of FIG. 3 by the image processing apparatus of the embodiment.

FIG. 7 is a flowchart showing the details of the edge direction map creation process executed at step S104 in the color image data generation process of FIG. 3 by the image processing apparatus 30 of the embodiment.

The edge direction map creation process first selects one target pixel as an object of detection of the edge direction (step S200) and calculates a variation Vv of the color difference component in the vertical direction (step S202). The variation Vv in the vertical direction is calculated naturally from the color difference components CDv in the vertical direction.

FIGS. 8A and 8B show calculation of the variation Vv in the vertical direction from the color difference components CDv in the vertical direction. FIG. 8A shows a calculation formula, and FIG. 8B conceptually shows calculation of the variation Vv in the vertical direction according to the calculation formula of FIG. 8A. A hatched rectangle in FIG. 8B represents the position of a target pixel. The computation process of the variation Vv in the vertical direction first calculates the square of a difference between the color difference components CDv in the target pixel and a pixel above the target pixel. Similarly the computation process calculates the square of a difference between the color difference components CDv in the target pixel and a pixel below the target pixel. Open arrows shown between the hatched target pixel and its two vertically neighboring pixels in FIG. 8B represent computation of the squares of the differences between the color difference components CDv of the respective pixels.

After computation of the squares of the respective differences between the color difference components CDv in the target pixel and the upper and the lower pixels, the computation process similarly calculates the squares of respective differences between the color difference components CDv in a pixel on the left of the target pixel and pixels above and below the pixel on the left of the target pixel, as well as the squares of respective differences between the color difference components CDv in a pixel on the right of the target pixel and pixels above and below the pixel on the right of the target pixel. FIG. 8B shows the six squares obtained from the six pairs of pixels arrayed in the vertical direction. The summation of these six squares is specified as the variation Vv in the vertical direction with regard to the target pixel.

Referring back to the flowchart of FIG. 7, after calculation of the variation Vv in the vertical direction, the edge direction map creation process calculates a variation Vh of the color difference component in the horizontal direction (step S204). The variation Vh in the horizontal direction is calculated in the similar manner to the calculation of the variation Vv in the vertical direction except the use of the color difference components CDh in the horizontal direction for the computation.

FIGS. 9A and 9B show calculation of the variation Vh in the horizontal direction from the color difference components CDh in the horizontal direction. FIG. 9A shows a calculation formula, and FIG. 9B conceptually shows calculation of the variation Vh in the horizontal direction according to the calculation formula of FIG. 9A. As shown by open arrows in FIG. 9B, the computation process successively calculates the squares of respective differences between the color difference components CDh in a target pixel and its two horizontally neighboring pixels (that is, pixels on the left and on the right of the target pixel), the squares of respective differences between the color difference components CDh in a pixel above the target pixel and pixels on the left and on the right of the pixel above the target pixel, and the squares of respective differences between the color difference components CDh in a pixel below the target pixel and pixels on the left and on the right of the pixel below the target pixel. The summation of these six squares is specified as the variation Vh in the horizontal direction with regard to the target pixel.

Referring back again to the flowchart of FIG. 7, the variation Vv in the vertical direction and the variation Vh in the horizontal direction calculated as described above are compared each other with regard to the target pixel (step S206). When the variation Vh in the horizontal direction is greater or equal than the variation Vv in the vertical direction (step S206: yes), it is determined that an edge goes through the target pixel in the vertical direction. A value "d" representing the edge direction is then set equal to "1" (step S208). When the variation Vv in the vertical direction is greater than the variation Vh in the horizontal direction (step S206: no), on the contrary, it is determined that an edge goes through the target pixel in the horizontal direction. The value "d" representing the edge direction is then set equal to "3" (step S210). Namely the pixel with the edge direction "d" set to "1" has the edge in the vertical direction, whereas the pixel with the edge direction "d" set to "3" has the edge in the horizontal direction.

The squares of the differences between the color difference components are calculated in determination of the variation Vv in the vertical direction (see FIG. 8) and in determination of the variation Vh in the horizontal direction (see FIG. 9). Such calculation enables detection of the edge directions without taking into account the signs of the differences between the color difference components. One possible modification may thus calculate the absolute values of respective differences between the color difference components, instead of calculation of their squares. The summation of the absolute values with regard to the adjacent pixels gives the variation Vv in the vertical direction or the variation Vh in the horizontal direction. The square, however, enhances the difference between the color difference components, compared with the absolute value and thus increases the detection accuracy of the edge direction. It should be understood that this invention is not limited to the absolute or square differences and that any other difference or similarity measure can be used instead to determine edge directions.

Some attention is required for the comparison between the variation Vv in the vertical direction and the variation Vh in the horizontal direction. There are accordingly some variations in edge direction map creation process shown in FIG. 7 as described below.

FIGS. 10A-10D show possible arrangements of adjacent pixels around a target pixel selected for detection of the edge direction. The adjacent pixels around the selected target pixel satisfy one of the four states shown in FIGS. 10A through 10D. In the state of FIG. 10A, a target pixel column of a target pixel and its two neighbors in the vertical direction gives the squares of respective two color difference components $CD_{GR}$ between the G component and the R component, whereas pixel columns in the vertical direction on the left and on the right of the target pixel column give the squares of respective four color difference components $CD_{GB}$ between the G component and the B component. The variation Vv in the vertical direction is accordingly computed as the sum of the two squares of the color difference components $CD_{GR}$ and the four squares of the color difference components $CD_{GB}$. The variation Vh in the horizontal direction is similarly computed as the sum of the two squares of the color difference components $CD_{GR}$ and the four squares of the color difference components $CD_{GB}$. The simple comparison between the variation Vv in the vertical direction and the variation Vh in the horizontal direction thus enables adequate detection of the edge direction in the target pixel.

In the state of FIG. 10B, each of the variation Vv in the vertical direction and the variation Vh in the horizontal direction is computed as the sum of the two squares of the color difference components $CD_{GB}$ and the four squares of the color difference components $CD_{GR}$. The simple comparison between the variation Vv in the vertical direction and the variation Vh in the horizontal direction thus enables adequate detection of the edge direction in the target pixel.

This is, however, not satisfied in the state of FIG. 10C or in the state of FIG. 10D. For example, in the state of FIG. 10C, the variation Vv in the vertical direction is computed as the sum of the two squares of the color difference components $CD_{GB}$ and the four squares of the color difference components $CD_{GR}$. The variation Vh in the horizontal direction is, however, computed as the sum of the two squares of the color difference components $CD_{GR}$ and the four squares of the color difference components $CD_{GB}$. Namely the variation Vv in the vertical direction is not simply comparable with the variation Vh in the horizontal direction. In the state of FIG.

10D, the variation Vv in the vertical direction is also not simply comparable with the variation Vh in the horizontal direction.

In order to address this problem, the amount of variation of the color difference component may be computed using different weights for the pixel column in which the target pixel is present and the pixel columns in which the target pixel is not present. For example, in FIG. 11A, an example of a calculation formula is shown for calculating the variation amount Vv in the vertical direction, and FIG. 11B shows an example of a calculation formula for calculating the variation amount Vh in the horizontal direction. In these calculation formulas, the weight in the pixel column in which the target pixel is present is set to twice the weight in the pixel columns in which the target pixel is not present. Through the use of such a calculation formula, the variation amount Vv in the vertical direction and the variation amount Vh in the horizontal direction can be compared with each other for the pixels shown in FIG. 10C and the pixels shown in FIG. 10D, and the edge direction can be determined. In the calculation formulas shown in FIG. 11, the weight in the pixel column in which the target pixel is present is set to twice the weight in the pixel columns in which the target pixel is not present, but the weight in the pixel columns in which the target pixel is not present may also be set to half the weight in the pixel column in which the target pixel is present. Alternatively, a calculation formula such as the one shown in FIG. 12A may also be used to calculate the variation amount Vv in the vertical direction and the variation amount Vh in the horizontal direction.

Alternatively and more simply, the edge direction may be determined only for the pixel (R pixel) of FIG. 10A and the pixel (B pixel) of FIG. 10B. As previously described using FIG. 2, G pixels account for half the area of a Bayer color filter, half the remaining area are R pixels, and the other half are B pixels. Consequently, if the edge direction is determined for only the R pixels and the B pixels, the determination is made for half the number of pixels, and the edge direction map can therefore be rapidly generated. It is, of course, impossible to obtain an edge direction by the G pixels using this method. However, since the pixels (that is, the R pixels and the B pixels) for which the edge direction is known are arranged in a checkered flag pattern, even when the edge direction of the G pixels is not known, adverse effects on image quality can be prevented through the use of an interpolation method.

In order to accelerate processing in the present embodiment, the method for determining the edge direction is employed only for the pixels shown in FIGS. 10A and 10B. Consequently, in step S200 of the edge direction map generation process shown in FIG. 7, a pixel other than a G pixel (that is, an R pixel or a B pixel) is selected as the target pixel. The vertical-direction variation amount Vv and the horizontal-direction variation amount Vh of the color difference component are then calculated for the selected target pixel (steps S202, S204), and the edge direction is determined by comparing the variation amount Vv and the variation amount Vh (steps S206 through S210), after which a determination is made as to whether the edge direction has been determined for all the target pixels (that is, the R pixels and the B pixels) (step S212). When there is any unprocessed pixel (step S212: no), the edge direction map creation process returns to step S200 to select another target pixel among unprocessed pixels and executes the subsequent series of processing. On completion of detection of the edge directions with regard to all the pixels (step S212: yes), the edge direction map creation process of FIG. 7 is terminated.

The edge direction map creation process of the embodiment enables detection of the edge directions included in the raw image data to be determined with good precision. The reason that an accurate edge direction map can be generated in the edge direction map generation process of the present embodiment will be described hereinafter.

As shown in FIGS. 2 and 4, the raw image data based on the Bayer color filter array have data of any color component R, G, or B at only discrete pixel positions. The G component has data at the rate of 1 per 2 pixels (G pixels), while the R component and the B component have data at the rate of 1 per 4 pixels (R pixels and B pixels). Because of such discrete appearance of data, it is difficult to detect the edge with high accuracy from a variation in tone value with regard to each of the color components R, G, and B.

The color difference components are accordingly used instead of the R, G, and B color components. With regard to each pixel column or pixel row having an alternate arrangement of the G component and the R component, the raw image data is converted into data of color difference components between the G component and the R component. With regard to each pixel column or pixel row having an alternate arrangement of the G component and the B component, the raw image data is converted into data of color difference components between the G component and the B component. The bottom of FIG. 4 shows conversion of the raw image data into the color difference components CDv in the vertical direction and the color difference components CDh in the horizontal direction. The pixel columns and the pixel rows having the color difference components between the G component and the B component are shown as hatched rectangles in FIG. 4.

Unlike the samples of raw data which constitute the mosaic of color components, the above conversion of raw data to color difference components allows for continuous signals to be obtained in at least the direction of the pixel columns or the direction of the pixel rows. Since color difference components obtained in pixel columns (or pixel rows) that are adjacent to each other differ from each other in meaning, it may not be meaningful to compare the values of color difference components between adjacent pixel columns. Consequently, when color difference components having the same meaning are used to detect an edge (e.g., the color difference components indicating the difference between the G components and the B components indicated by hatched lines in FIG. 4 are used to detect an edge), the adjacent pixel column may be skipped, and the color difference component of every other pixel column may be used.

Significant variations of either or both of the color difference component between the G component and the R component and/or the color difference component between the G component and the B component usually occur in an image area having an abrupt change in lightness and/or color. An edge is thus detectable as changes in color difference components.

The edge direction map creation process of the embodiment detects the edge directions with high accuracy based on the above consideration and accordingly gives a highly accurate edge direction map. The concrete procedure converts the raw image data based on the Bayer color filter array into the color difference components CDv in the vertical direction and the color difference components CDh in the horizontal direction. As shown in the bottom of FIG. 4, the obtained data of the color difference components have an alternate arrangement of pixel columns or pixel rows of the color difference component $CD_{GR}$ between the G component and the R component and pixel columns or pixel rows of the color difference component $CD_{GB}$ between the G component and the B component. The variations of the color difference components are then calculated according to the calculation formulae of FIGS. 11A and 11B or FIGS. 8A and 8B and 9A and 9B. The calculated variations are obtained from the color difference components of adjacent pixel columns or adjacent pixel rows having different types. The variations calculated even from the color difference components having different types are comparable for the edge detection as described above. Such edge detection according to the color difference components of the adjacent pixel columns or the adjacent pixel rows ensures highly accurate detection of even a small-scale edge. The accurate detection of the edge direction in each pixel is thus enabled by the comparison between the variation Vv in the vertical direction and the variation Vh in the horizontal direction.

As clearly understood from this explanation, in the edge direction map creation process of the embodiment, it is important to compute the variation Vv in the vertical direction and the variation Vh in the horizontal direction based on the color difference components of adjacent pixel columns or adjacent pixel rows. In other words, it is not so important what calculation formulae are used for the computation of the variation Vv in the vertical direction and the variation Vh in the horizontal direction. Diverse calculation formulae are thus applicable in place of the calculation formulae in FIGS. 11A and 11B or FIGS. 8A and 8B and 9A and 9B. For example, the variation amount Vv of the vertical direction and the variation amount Vh of the horizontal direction can also be calculated using a calculation formula such as the one shown in FIG. 12.

D. Edge Noise Removal Process:

As described hereinafter, in the color image data generation process of the present embodiment, missing components of the raw image data can be appropriately interpolated by referencing the edge direction map thus generated. However, satisfactory results cannot be obtained by referencing an edge direction map that is contaminated with noise. Therefore, in the color image data generation process of the present embodiment, when the edge direction map is generated (step S104 in FIG. 3), processing (edge noise removal process) is performed for removing the noise (edge noise) included in the edge direction map before the edge direction map is referenced to interpolate missing components of the raw image data.

Figure 13:
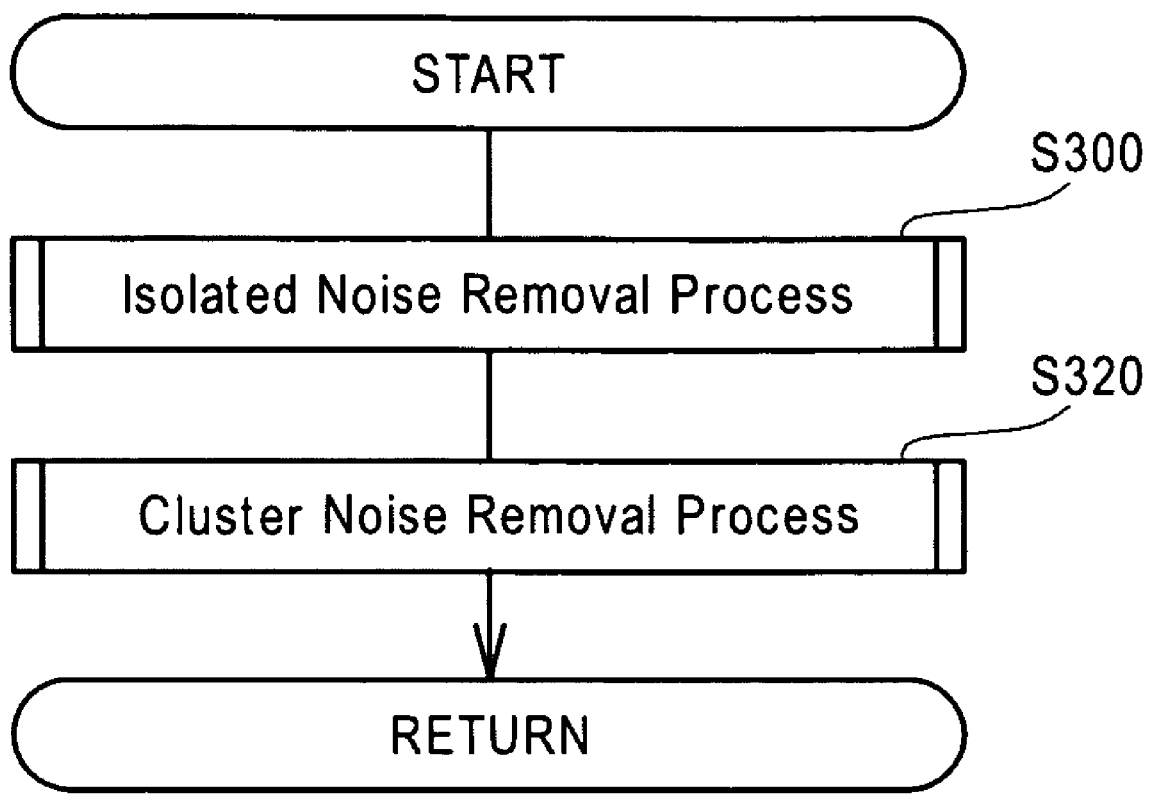
FIG. 13 is a flowchart showing the edge noise removal process.

FIG. 13 is a flowchart showing the edge noise removal process. As shown in FIG. 13, the processing for removing edge noise in the edge direction map is composed of a process (S300) for removing isolated noise and a process (S320) for removing cluster noise. The term "isolated noise" used herein refers to noise that exists in isolation in only a single pixel, or line noise having a width or a height of only a single pixel. The term "cluster noise" refers to noise that occurs in groups among a plurality of pixels, and is not isolated noise. For example, line noise having a width and a height of several pixels or more is classified as cluster noise.

Figure 14:
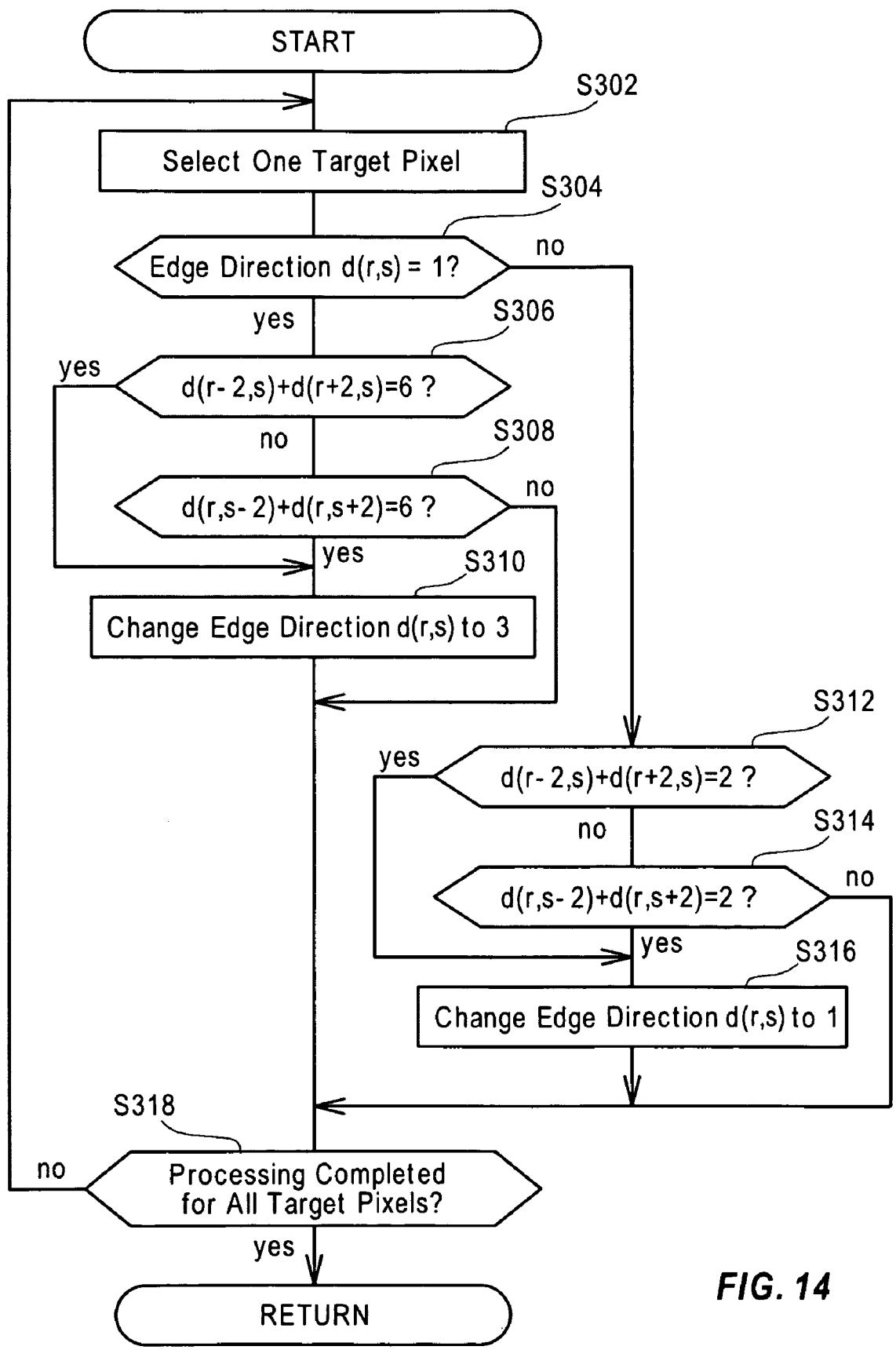
FIG. 14 is a flowchart showing the processes for removing isolated noise in the noise removal process.

D-1. Isolated Noise Removal Process:

FIG. 14 is a flowchart showing the processes for removing isolated noise in the noise removal process. When the isolated noise removal process (step S300) is initiated, a single pixel (target pixel) is first selected as a target for determining the presence of noise (step S302). As previously mentioned, in the edge direction map generation process of the present embodiment, the edge direction is determined only for R pixels and B pixels. Consequently, an R pixel or a B pixel is always selected as the pixel (target pixel) to be the target for determining whether the edge direction is noise.

A determination is then made as to whether the edge direction d(r,s) obtained in the target pixel location (r,s) is equal to "1" (step S304), and when this edge direction is equal to "1" (step S304: yes), a determination such as the following is made. First, the edge directions of the pixels above and below the target pixel are referenced, and a determination is made as to whether the target pixel is a pixel that is surrounded above and below by pixels in which edge direction is equal to "3" (step S306). The expression d(r−2, s) shown in the flowchart indicates the edge direction obtained at the pixel that is two pixels above the target pixel, and d(r+2, s) indicates the edge direction obtained at the pixel that is two pixels below the target pixel. In the present embodiment, due to the fact that the edge direction is determined only for the R pixels and the B pixels, the edge direction is obtained for every other pixel in the vertical direction. Therefore, the edge direction of the second pixel upward or the second pixel downward of the target pixel is referenced. The edge direction also can only be "1" or "3." Consequently, a value of "6" as the sum of d(r−2, s) and d(r+2, s) means that both of these two edge directions are equal to "3." Therefore, when the determination made in step S306 is "yes," the edge direction of the target pixel is changed to "3" (step S310). Specifically, given that the edge direction obtained upward of the target pixel, and the edge direction obtained downward of the target pixel are both equal to "3" and only the edge direction of the target pixel is equal to "1," this edge direction of the target pixel is determined to be edge noise and is changed from "1" to "3."

When a determination of "no" is made in step S306, the edge directions of the pixels to the left and right of the target pixel are referenced at this time, and a determination is made as to whether the left and right edge directions are both equal to "3." The expression d(r, s−2) shown in the flowchart indicates the edge direction obtained at the second pixel to the left of the target pixel, and d(r, s+2) indicates the edge direction obtained at the second pixel to the right of the target pixel. The reason for referencing the edge directions of the pixel two pixels to the right or left of the target pixel is that in this embodiment the edge direction is being determined only for R pixels and B pixels. A determination is then made as to whether the sum of d(r, s−2) and d(r, s+2) is "6" (step S308), and if the sum is "6" (step S308: yes), the edge direction of the target pixel is changed to "3" (step S310). Specifically, given that the edge direction obtained to the left and right of the target pixel is "3" and only the edge direction of the target pixel is "1," this edge direction of the target pixel is determined to be edge noise and is changed from "1" to "3."

The same processing is also performed when the edge direction of the target pixel is determined not to be "1" (step S304: no). Specifically, since the edge direction of the target pixel is "3" in this case, a determination is made as to whether the edge directions d(r, s−2) and d(r, s+2) obtained above and below the target pixel are both "1" (step S312), or whether the edge directions d(r−2, s) and d(r+2, s) obtained to the left and right of the target pixel are both "1" (step S314). When each of the upward and downward edge directions is "1" (step S212: yes), or when each of the left and right edge directions is "1" (step S314: yes), a determination is made that the edge direction of the target pixel is noise and is changed from "3" to "1" (step S316).

When a determination is made as described above as to whether the edge direction of the target pixel is noise, and the edge direction is determined to be noise, once the value of the edge direction of the target pixel is changed (step S310, step S316), a determination is made as to whether this processing has been performed for all of the target pixels (step S318). When target pixels remain that are not yet processed (step S318: no), the process returns to the first step, and a single new target pixel is selected (step S302), after which the continuous sequence of processing is performed for the new target pixel. This processing is repeated, and when a determination is made that the processing has been performed for all the target pixels (step S318: yes), the isolated noise removal process shown in FIG. 14 is completed.

Figure 15:
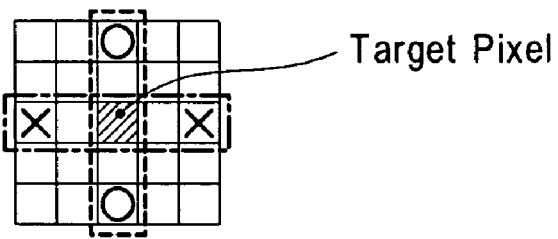
FIG. 15 is a diagram showing the manner in which a determination is made as to whether the edge direction of the target pixel is isolated noise in the isolated noise removal process.

FIG. 15 is a diagram showing the manner in which a determination is made as to whether the edge direction of the target pixel is isolated noise in the isolated noise removal process. In FIG. 15, the target pixel is indicated by diagonal lines. In the isolated noise removal process, the edge direction of the target pixel is first acquired, and then the edge directions obtained above and below (the edge directions of the two pixels indicated by "○" symbols in the drawing), or the edge directions obtained to the left and right (the edge directions of the two pixels indicated by "x" symbols in the drawing) are referenced. A determination is then made as to whether the edge direction of the target pixel is surrounded from above and below or from the left and right by edge directions having different values, and when the edge direction of the target pixel is surrounded by edge directions having different values, the edge direction of the target pixel is determined to be isolated noise.

Figure 16:
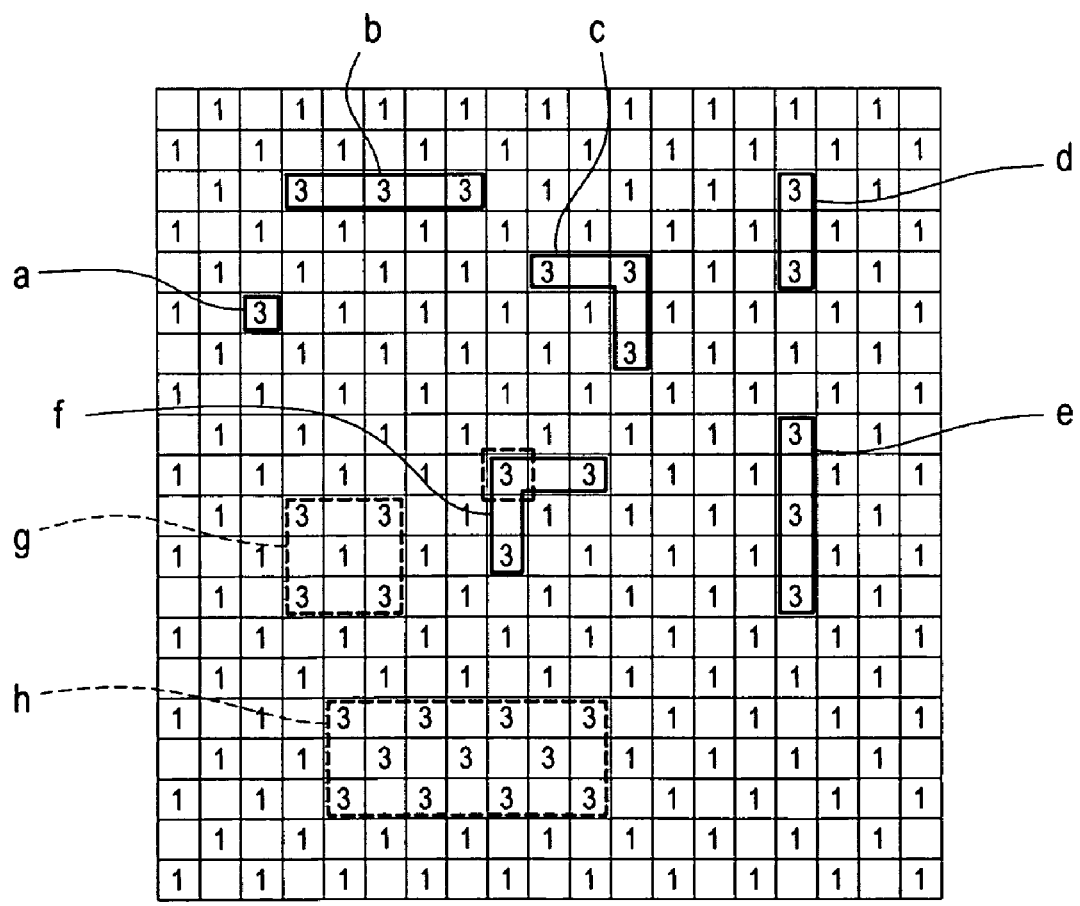
FIG. 16 is a diagram showing an example of the manner in which isolated noise in the edge direction map is removed.

FIG. 16 is a diagram showing an example of the manner in which isolated noise in the edge direction map is removed. FIG. 16 shows an example of a case in which pixels for which the edge direction is "3" are present in several places in an area in which the edge direction is "1." As indicated by "a" in the diagram, locations at which only a single pixel has an edge direction of "3" are determined to be isolated noise, and the edge direction is changed to "1." As in the locations labeled "b" through "f" in the diagram, locations in which pixels having an edge direction of "3" constitute a line having a width of one pixel are determined to be isolated noise, and the edge direction is changed to "1." After these instances of isolated noise are removed, the edge direction of "3" remains only in locations in which the same edge direction continues for at least two or more pixels in both the vertical and horizontal directions, as in the locations labeled "g" and "h" in the diagram. As a result, an edge direction map that is generally free of isolated noise can be obtained.

The edge direction map obtained through the isolated noise removal process is said to be "generally" free of isolated noise for the following reasons. Line-like isolated noise composed of three pixels is present in the location labeled "f" in FIG. 16. The reason for this is that in this isolated noise, when the pixel surrounded by the dashed line is first selected as the target pixel, the selected pixel is the only pixel that cannot be detected as isolated noise, and the edge direction remains as "3." But even in such a case, performing the isolated noise removal process once more makes it possible to completely remove the isolated noise.

As described above, when the isolated noise removal process is performed for the edge direction map, the isolated noise is generally removed, and areas subsequently remain in which the same edge directions are grouped, as indicated by "g" in FIG. 16, for example. Such groups of outlying edge directions will be referred to as "cluster noise."

After the isolated noise removal process shown in FIG. 14 is completed, and the process is returned to the edge noise removal process of FIG. 13, a determination is made as to whether the edge direction at the target pixel is part of cluster noise, and processing (cluster noise removal process) for removing the noise is performed when the edge direction in the target pixel is cluster noise (step S320 in FIG. 13).

Figure 17:
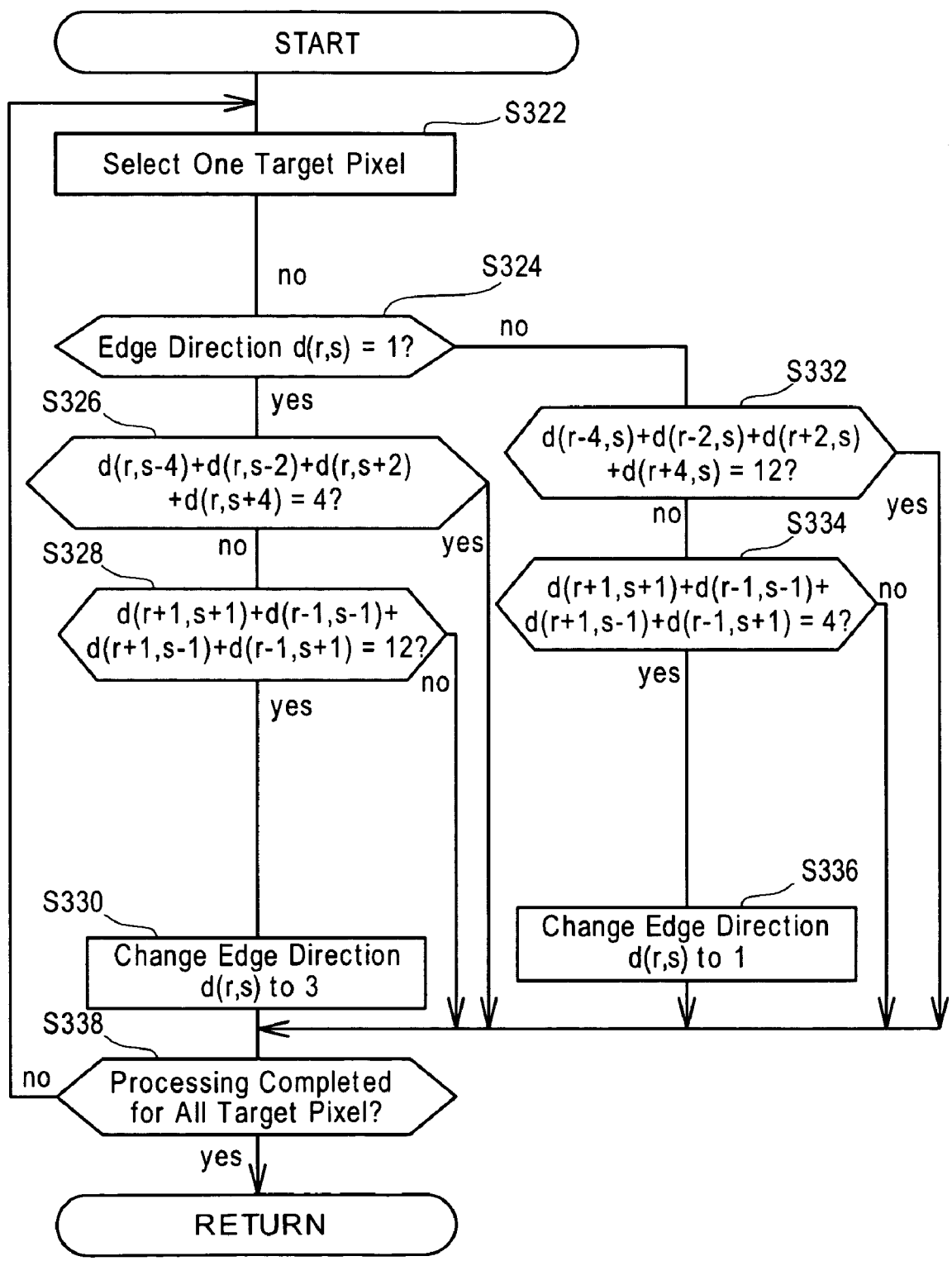
FIG. 17 is a flowchart showing the cluster noise removal process.

D-2. Cluster Noise Removal Process:

FIG. 17 is a flowchart showing the cluster noise removal process. When the cluster noise removal process is initiated, a single target pixel is first selected from the edge direction map (step S322). As previously mentioned, in the edge direction map generation process of the present embodiment, the edge direction is determined only for R pixels and B pixels. Consequently, an R pixel or a B pixel is always selected as the pixel (target pixel) to be the target for determining whether the edge direction is noise.

A determination is then made as to whether the edge direction of the target pixel is "1" (step S324), and when the edge direction of the target pixel is "1" (step S324: yes), a determination such as the following is made. First, the edge directions of two pixels to the left of the target pixel and two pixels to the right of the target pixel are added together. In particular, the edge directions d(r, s−4), d(r, s−2), d(r, s+2), and d(r, s+4) are added together, and a determination is made as to whether this first added value is equal to "4" (step S326) which denotes that these four edge directions and the edge direction of the target pixel have the same value ("1" in this case). When this added value is not equal to "4" (step S326: no); that is, when there is even one edge direction among d(r, s−4), d(r, s−2), d(r, s+2), and d(r, s+4) that is not equal to "1", the edge directions of the pixels at each corner of the target pixel are added together. In particular, the edge directions d(r+1, s+1), d(r−1, s−1), d(r+1, s−1), and d(r−1, s+1) are added together, and a determination is made as to whether this second added value is equal to "12" (step S328) which denotes that these four edge directions have the values different from the edge direction in the target pixel. When the second added value is equal to "12" (step S328: yes); that is, when each of the edge directions d(r+1, s+1), d(r−1, s−1), d(r+1, s−1), and d(r−1, s+1) is equal to "3", the edge direction of the target pixel is determined to be cluster noise, and d(r, s) is changed to "3" (step S330). In contrast, when the first added value is equal to "4" (step S326: yes) or when the second added value is not equal to "12" (step S328: no), the edge direction of the target pixel is determined to actually be "1" (that is, not cluster noise).

Returning to step S324, when the edge direction of the target pixel is not equal to "1" (step S324: no), a determination such as the following is made. First, the edge directions of two pixels above the target pixel and two pixels below the target pixel are added together. In particular, the edge directions d(r−4, s), d(r−2, s), d(r+2, s), and d(r+4, s) are added together, and a determination is made as to whether this third added value is equal to "12" (step S332) which denotes that these four edge directions and the edge direction of the target pixel have the same value ("3" in this case). When the third added value is not equal to "12" (step S332: no); that is, when there is even one edge direction among d(r−4, s), d(r−2, s), d(r+2, s), and d(r+4, s) that is not equal to "3", the edge directions of the pixels at each corner of the target pixel are added together. In particular, the edge directions d(r+1, s+1), d(r−1, s−1), d(r+1, s−1), and d(r−1, s+1) are added together, and a determination is made as to whether this fourth added value is equal to "4" (step S334) which denotes that these four edge directions have the values different from the edge direction in the target pixel. When the fourth added value is equal to "4" (step S334: yes); that is, when each of the edge directions d(r+1, s+1), d(r−1, s−1), d(r+1, s−1), and d(r−1, s+1) is equal to "1", the edge direction of the target pixel is determined to be cluster noise, and the edge direction is changed to "1" (step S336). In contrast, when the third added value is equal to "12" (step S332: yes) or when the fourth added value is not equal to "4" (step S334: no), the edge direction of the target pixel is determined to actually be "3" (that is, not cluster noise).

Figure 18A:
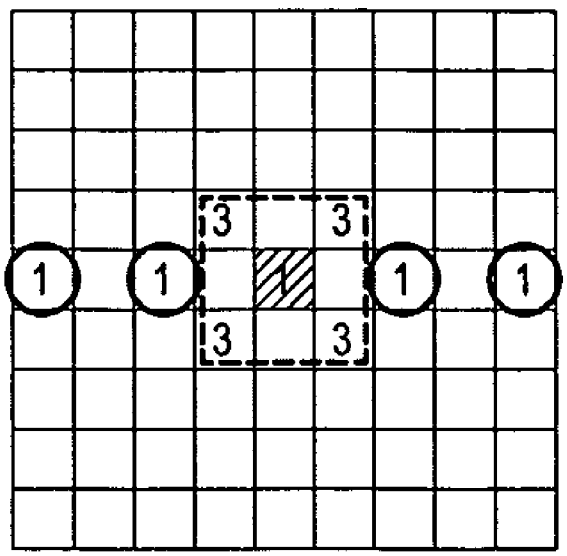
FIGS. 18A and 18B are diagrams showing the manner in which a determination is made as to whether the target pixel is cluster noise.
Figure 18B:
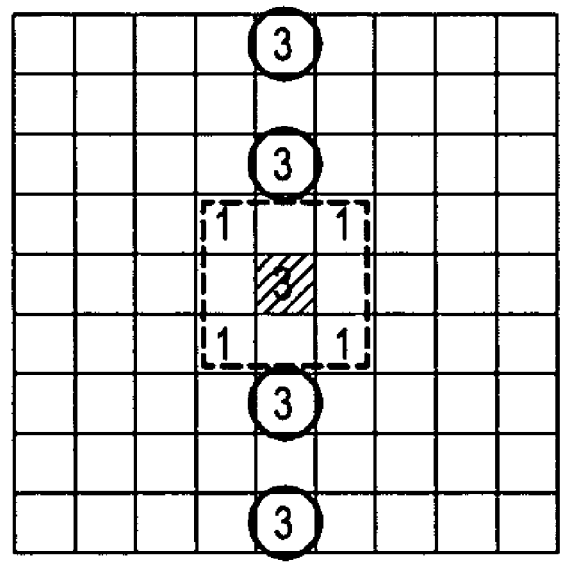

FIGS. 18A and 18B are diagrams showing a conceptual view of the manner in which the determination is made as to whether the target pixel is cluster noise. The pixel indicated by diagonal lines in the diagram represents the target pixel. FIG. 18A shows a case in which the edge direction of the target pixel is "1," and FIG. 18B shows a case in which the edge direction of the target pixel is "3." As shown in the diagram, even though the edge directions of the four corner pixels diagonally adjacent to the target pixel are all the same, the edge direction of the target pixel in the center is different. In such a case, it is possible for the edge direction of the target pixel to be cluster noise. Therefore, a determination is made as to whether the edge direction of the target pixel is cluster noise. The case shown in FIG. 18A will be described hereinafter. Since the edge direction of the target pixel is "1," even if this edge direction is not cluster noise, edges are expected to be present in the left and right directions thereof, and the edge directions d are expected to be "1" even in the pixels to the left and right. Therefore, the edge directions are referenced for the four pixels indicated by the ○ symbols in FIG. 18A. As shown in FIG. 18A, the edge direction of the target pixel is determined to be the correct edge direction only when the edge directions of the abovementioned four pixels are all "1." In all other cases, the edge direction of the target pixel is determined to be cluster noise, and the edge direction of the target pixel is changed to "3."

With reference again to FIG. 17, once the processing described above is completed for the target pixel selected at the start of the processing, a determination is made as to whether the processing described above is completed for all the target pixels (step S338). As a result, when yet unprocessed target pixels are determined to remain (step S338: no), the process returns to the beginning, and a new target pixel is selected (step S322), after which the sequence of processes described above is performed. This operation is repeated, and when processing of all the target pixels is eventually determined to have been completed (step S338: yes), the cluster noise removal process shown in FIG. 17 is completed. The process then returns to the color image data generation process shown in FIG. 3 via the edge noise removal process shown in FIG. 13.

As previously described using FIG. 7, the amount of variation in color difference components is emphasized in the color image data generation process of the present embodiment to enable even fine edges to be precisely detected by comparing the variation amount Vv in the vertical direction and the variation amount Vh in the horizontal direction. On the other hand, even when there is only a slight difference between the vertical-direction variation amount Vv and the horizontal-direction variation amount Vh, the edge direction is determined based on this slight difference. In areas in which no definite edges exist, the size relationship between the vertical-direction variation amount Vv and the horizontal-direction variation amount Vh may be reversed by a slight difference in color difference components between pixels. Therefore, isolated noise or cluster noise may easily occur in such areas. However, since definite edges are not present in the first place in such areas, image quality is not adversely affected to a significant degree even when an edge direction is erroneously determined. Specifically, even when some edge noise is included in the edge direction map, there are no significant adverse effects on image quality. However, it is preferred that a noise-free edge direction map be used as reference in order to appropriately interpolate missing color components in the raw image data. Therefore, in the color image data generation process of the present embodiment shown in FIG. 3, the edge noise removal process (step S106) described above is performed to remove edge noise from the edge direction map when the edge noise map is generated (step S104). Once an edge direction map that is free of edge noise is obtained, processing is performed as described hereinafter to interpolate color components missing from the raw image data while referencing the edge direction map.

E. G Component Interpolation Process

As shown in FIG. 3, in the color image data generation process of the present embodiment, when the edge noise removal process is completed (step S106), processing for interpolating the G component using non-G pixels (R pixels and B pixels) is initiated (step S108).

Figure 19:
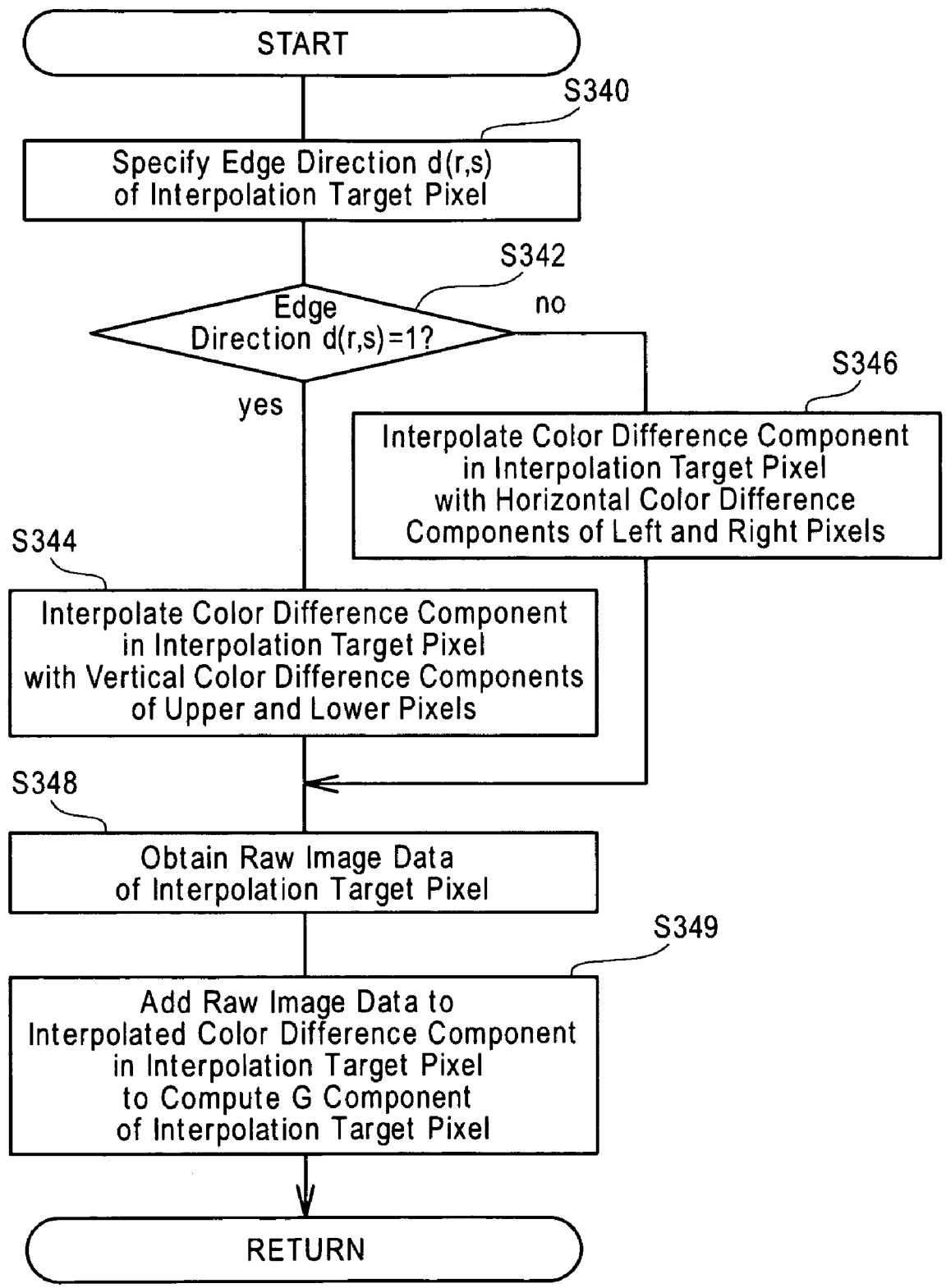
FIG. 19 is a flowchart showing the details of a G component interpolation process executed in the color image data generation process of FIG. 3 by the image processing apparatus of the embodiment.

FIG. 19 is a flowchart showing the details of the G component interpolation process to interpolate the G component in the R pixels and the B pixels. The G component interpolation process first refers to the created edge direction map to specify the edge direction in each interpolation target pixel as an object of interpolation (step S340). Specifically, in the pixel location (r, s), the edge direction refers to the value of d(r, s). As previously mentioned, the edge direction is determined only for R pixels and B pixels in the present embodiment, and an edge direction is not obtained for all of the pixels. However, since the pixels being interpolated herein are non-G pixels (R pixels and B pixels), an edge direction can always be acquired by referencing the edge direction map.

The G component interpolation process subsequently determines whether the specified edge direction is equal to "1" (step S342). When the specified edge direction is equal to "1" (step S342: yes), a color difference component of the interpolation target pixel is interpolated with the color difference components of pixels neighboring above and below the interpolation target pixel (step S344). When the specified edge direction is equal to "3" (step S342: no), on the other hand, the color difference component of the interpolation target pixel is interpolated with the color difference components of pixels neighboring on the left and on the right of the interpolation target pixel (step S346). The G component interpolation process then obtains the raw image data of the interpolation target pixel (step S348) and adds the raw image data to the interpolated color difference component of the interpolation target pixel to compute the G component of the interpolation target pixel (step S349). This series of processing is described more in detail.

Figures 20A, 20B, 20C:
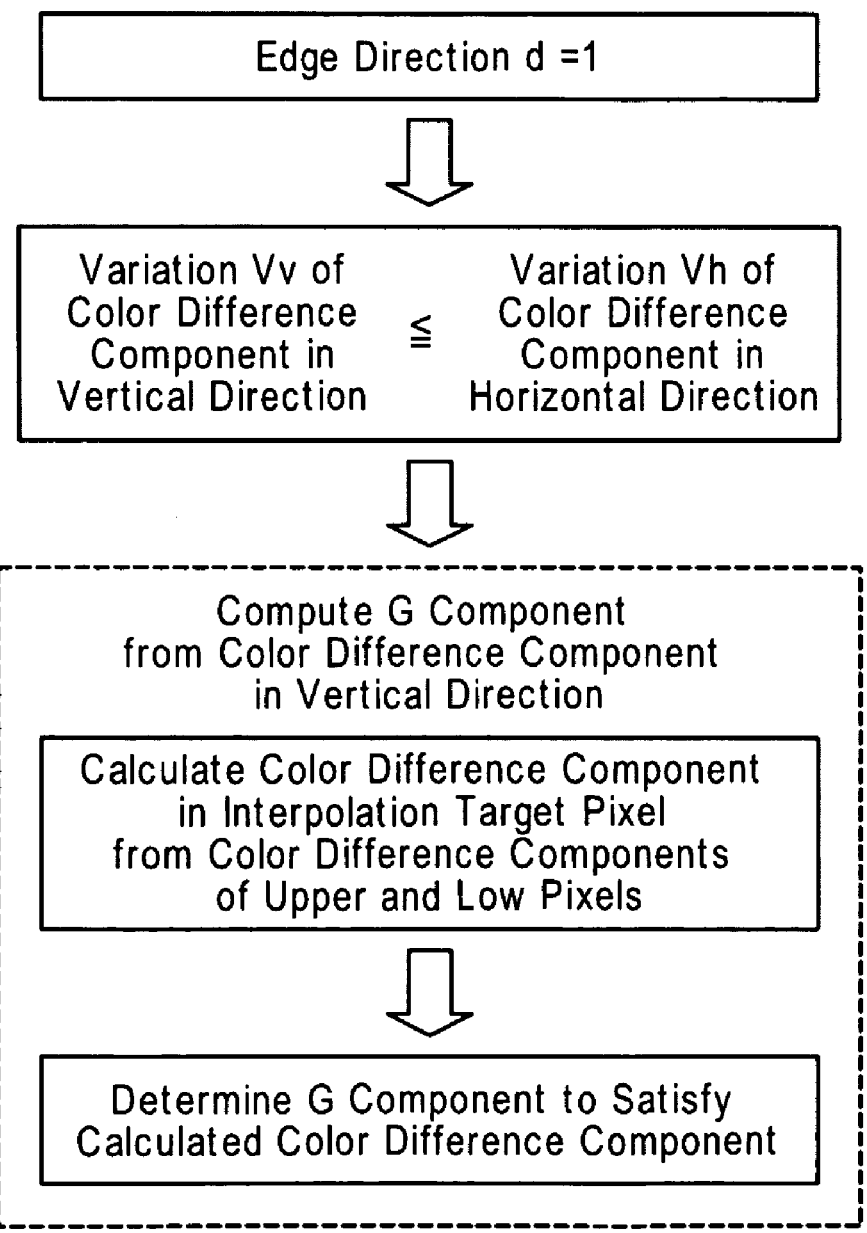
FIGS. 20A-20C show a processing flow of computing the missing G component in non-G pixels.

FIGS. 20A-20C show a processing flow of computing the missing G component in non-G pixels. The interpolation target pixel is a non-G pixel, that is, either an R pixel or a B pixel. When the interpolation target pixel is the R pixel, the adjacent pixels are arranged as shown in FIG. 20A. When the interpolation target pixel is the B pixel, on the other hand, the adjacent pixels are arranged as shown in FIG. 20B. It is here assumed that the interpolation target pixel as the object of interpolation of the G component is the R pixel and that the specified edge direction is equal to "1".

At the edge direction equal to "1", the variation Vh of the color difference component in the horizontal direction is greater than the variation Vv of the color difference component in the vertical direction. In general, interpolation in the state of a less variation (closer to the steady state) is expected to have the better interpolation result than interpolation in the state of a greater variation. The color difference component in the vertical direction having a less variation is thus used for the computation of the G component. As clearly understood from FIG. 20A, in the R interpolation target pixel, both the color difference component in the vertical direction and the color difference component in the horizontal direction are obtained by subtraction of the R component from the G component. Namely the G component of the interpolation target pixel is computable from either the color difference component in the vertical direction or the color difference component in the horizontal direction. For the enhanced interpolation accuracy, the G component of the interpolation target pixel is computed from the color difference component in the vertical direction having a less variation, as already indicated by the value "1" of the corresponding edge-direction indicator in the interpolation target pixel.

The color difference component in the vertical direction is subtraction of the R component from the G component, and the raw image data obtained in the interpolation target pixel is the R component. Addition of the raw image data to the color difference component thus immediately determines the G component in the interpolation target pixel. The color difference component used for computation of the G component may be the color difference component in the interpolation target pixel calculated according to the calculation formula of FIG. 5. Preferably the color difference component used for computation of the G component may be the color difference component after removal of noise with the low pass filter shown in FIG. 6.

The color difference component of the interpolation target pixel may be calculated from the color difference components of adjacent pixels, instead of being directly read. This modified procedure may read the color difference components of the pixels neighboring above and below the interpolation target pixel in the vertical direction and calculate the color difference component in the interpolation target pixel from the read-out color difference components. The G component interpolation process of FIG. 19 calculates the color difference component of the interpolation target pixel from the color difference components of the adjacent pixels at step S344 or at step S346. Another modified procedure may read the color difference components of the pixels in a larger neighborhood of the interpolation target pixel in order to calculate the color difference component in the interpolation target pixel from the read-out color difference components.

After computation of the G component in all the interpolation target pixels as described above, the CPU terminates the G component interpolation process of FIG. 19 and goes back to the color image data generation process of FIG. 3. Once the G component is interpolated, the color image data generation process subsequently starts the non-G pixel interpolation process to interpolate the remaining color component in the pixels other than the G pixels.

F. Non-G Pixel Interpolation Process

Figure 21:
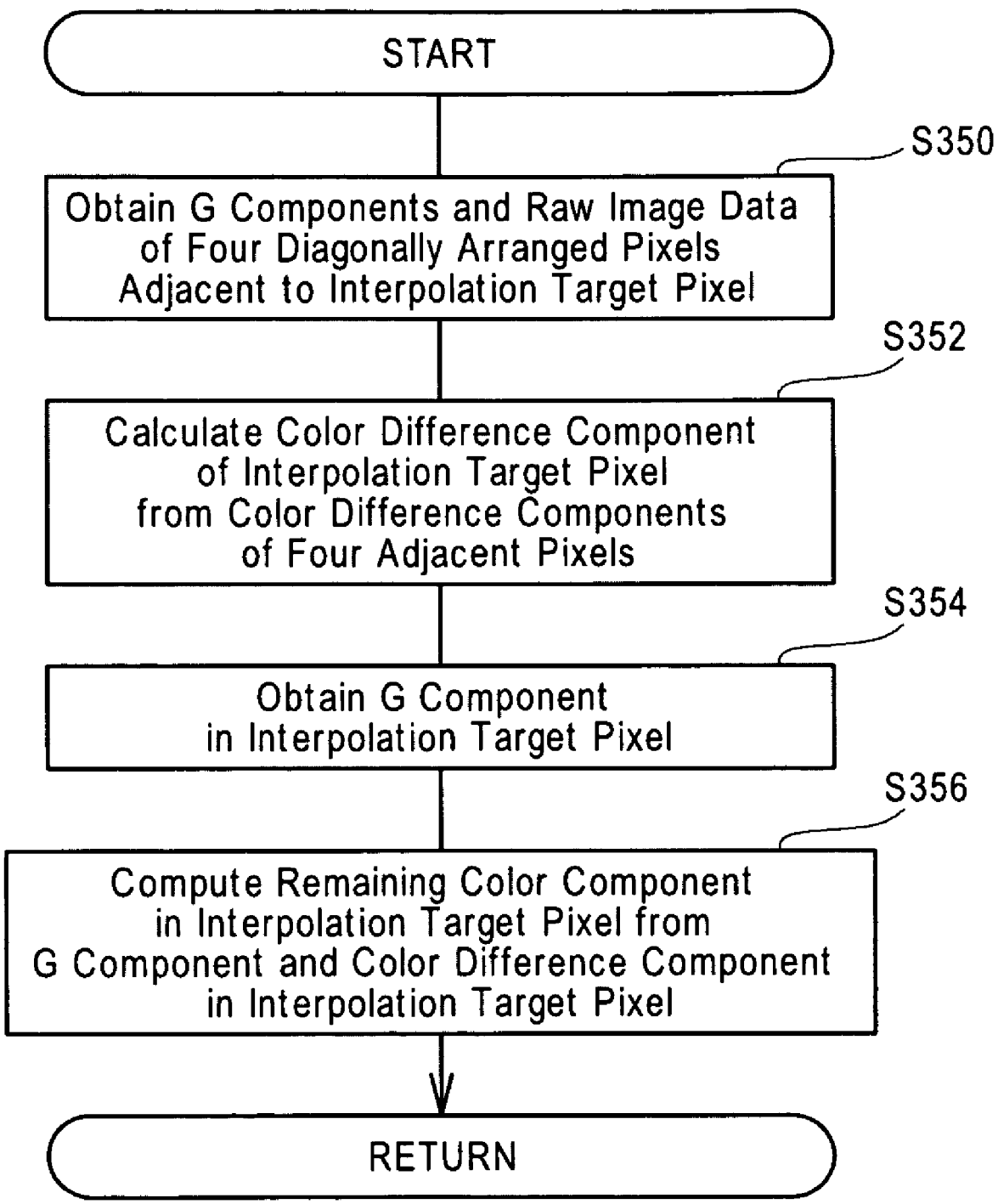
FIG. 21 is a flowchart showing the details of a non-G pixel interpolation process executed in the color image data generation process of FIG. 3 by the image processing apparatus of the embodiment.

FIG. 21 is a flowchart showing the details of the non-G pixel interpolation process. As explained previously, the non-G pixel interpolation process interpolates the remaining color component in each non-G pixel, that is, the B component in the R pixel or the R component in the B pixel, after interpolation of the G component in the non-G pixel. The basic concept of the non-G pixel interpolation process is briefly described, prior to the processing details.

The non-G pixel interpolation process interpolates the B component in the R pixel, while interpolating the R component in the B pixel. When the interpolation target pixel is the R pixel, four diagonally arranged pixels adjacent to the interpolation target pixel are all B pixels as shown in FIG. 20A. The B component is obtained as the raw image data of these four adjacent pixels. When the interpolation target pixel is the B pixel, on the other hand, four diagonally arranged pixels adjacent to the interpolation target pixel are all R pixels as shown in FIG. 20B. The R component is obtained as the raw image data of these four adjacent pixels. The simplest procedure performs interpolation with the raw image data of the four diagonally arranged pixels adjacent to the interpolation target pixel to determine the tone value of the remaining color component in the interpolation target pixel. For example, the R component in the interpolation target pixel can be obtained as average of four raw R components available in diagonally surrounding pixels. Similarly, the B component in the interpolation target pixel can be obtained as average of four raw B components available in diagonally surrounding pixels.

The direct interpolation of the remaining color component with the raw image data of the adjacent pixels may cause the occurrence of aliasing colors due to some deviation in difference from the other color component. In natural color images, the RGB data is significantly correlated both in the intra- and inter-channel senses. This means that the pixels in local image areas usually have similar color difference characteristics. It is accordingly preferable to interpolate the color difference component in the interpolation target pixel with the color difference components of the adjacent pixels and determine the tone value of the remaining color component in the interpolation target pixel based on the interpolated color difference component. Thus, instead of the direct interpolation with the raw image data of the four diagonally arranged pixels adjacent to the interpolation target pixel, another available procedure calculates the color difference component of the interpolation target pixel from the color difference components of the four adjacent pixels and determines the tone value of the remaining color component in the interpolation target pixel based on the calculated color difference component of the interpolation target pixel. For example, the interpolation object is the B component for the R interpolation target pixel in the state of FIG. 20A. The preferable procedure obtains the color difference components between the G component and the B component in the four diagonally arranged B pixels adjacent to the R interpolation target pixel and uses these four color difference components to calculate the corresponding color difference component in the R interpolation target pixel. For example, the color difference component in the interpolation target location can be calculated as average of available color difference components. The procedure then calculates the tone value of the remaining color component from the calculated color difference component and the interpolated G component in the R interpolation target pixel.

The diagonally arranged pixels adjacent to the R interpolation target pixel are all B pixels. Both the color difference components CDv in the vertical direction and the color difference components CDh in the horizontal direction computed with regard to these adjacent pixels according to the calculation formulae of FIGS. 5A and 5B are the color difference components between the G component and the B component. The corresponding color difference component of the interpolation target pixel may be calculated from the total eight color difference components. One typical procedure may calculate the average of the color difference component CDv in the vertical direction and the color difference component CDh in the horizontal direction in each of the four diagonally arranged pixels adjacent to the interpolation target pixel as a representative color difference component in the pixel and determine the corresponding color difference component of the interpolation target pixel from the representative color difference components of the four adjacent pixels. Another typical procedure may detect the edge direction in the interpolation target pixel and calculate the color difference component of the interpolation target pixel from only the color difference components (obtained according to the calculation formulae of FIG. 5) of the adjacent pixels satisfying the detected edge direction. This method of determining the color difference component of the interpolation target pixel by taking into account both the color difference components CDv in the vertical direction and the color difference components CDh in the horizontal direction with regard to the adjacent pixels requires the rather complicated series of processing. The calculation based on the G component and the B component in the four diagonally arranged pixels adjacent to the interpolation target pixel, on the other hand, enables the higher-speed determination of the color difference component $CD_{GB}$ in the interpolation target pixel.

Based on this basic concept, the non-G pixel interpolation process of the embodiment shown in the flowchart of FIG. 21 interpolates the remaining color component in each non-G pixel, after interpolation of its G component. The concrete procedure of the non-G pixel interpolation process is explained with reference to the flowchart of FIG. 21.

The non-G pixel interpolation process first obtains the G components and the raw image data of the four diagonally arranged pixels adjacent to the interpolation target pixel (step S350). When the interpolation target pixel is the R pixel, the four diagonally arranged adjacent pixels are all B pixels as shown in FIG. 20A. The raw image data of these adjacent pixels obtained here accordingly regards the B component. When the interpolation target pixel is the B pixel, on the other hand, the four diagonally arranged adjacent pixels are all R pixels as shown in FIG. 20B. The raw image data of these adjacent pixels obtained here accordingly regards the R component.

The non-G pixel interpolation process subsequently calculates the color difference components of these four adjacent pixels by subtraction of the G component from the raw image data and computes the average of the four color difference components as the color difference component of the interpolation target pixel (step S352). In the application hereof, the color difference component generally represents subtraction of the R component or the B component from the G component as shown in FIG. 5. The calculation of step S352, however, changes the sign of the color difference component by subtraction of the G component from the raw image data (the R component or the B component). This saves changing the sign in the later computation.

After computation of the color difference component in the interpolation target pixel, the non-G pixel interpolation process obtains the G component of the interpolation target pixel (step S354). The interpolation target pixel is the non-G pixel, so that the raw image data of the interpolation target pixel does not regard the G component. The G component of the interpolation target pixel has, however, been already determined by the G component interpolation process of FIG. 19 executed prior to this non-G pixel interpolation process.

Summation of the color difference component of the interpolation target pixel computed at step S352 and the G component obtained at step S354 determines the remaining color component in the interpolation target pixel (step S356).

After computation of the remaining color component in all the non-G interpolation target pixels as described above, the CPU terminates the non-G pixel interpolation process of FIG. 21 and goes back to the color image data generation process of FIG. 3. The color image data generation process subsequently starts the G pixel interpolation process to interpolate the missing color components in the G pixels (step S112).

G. G Pixel Interpolation Process

Figure 22:
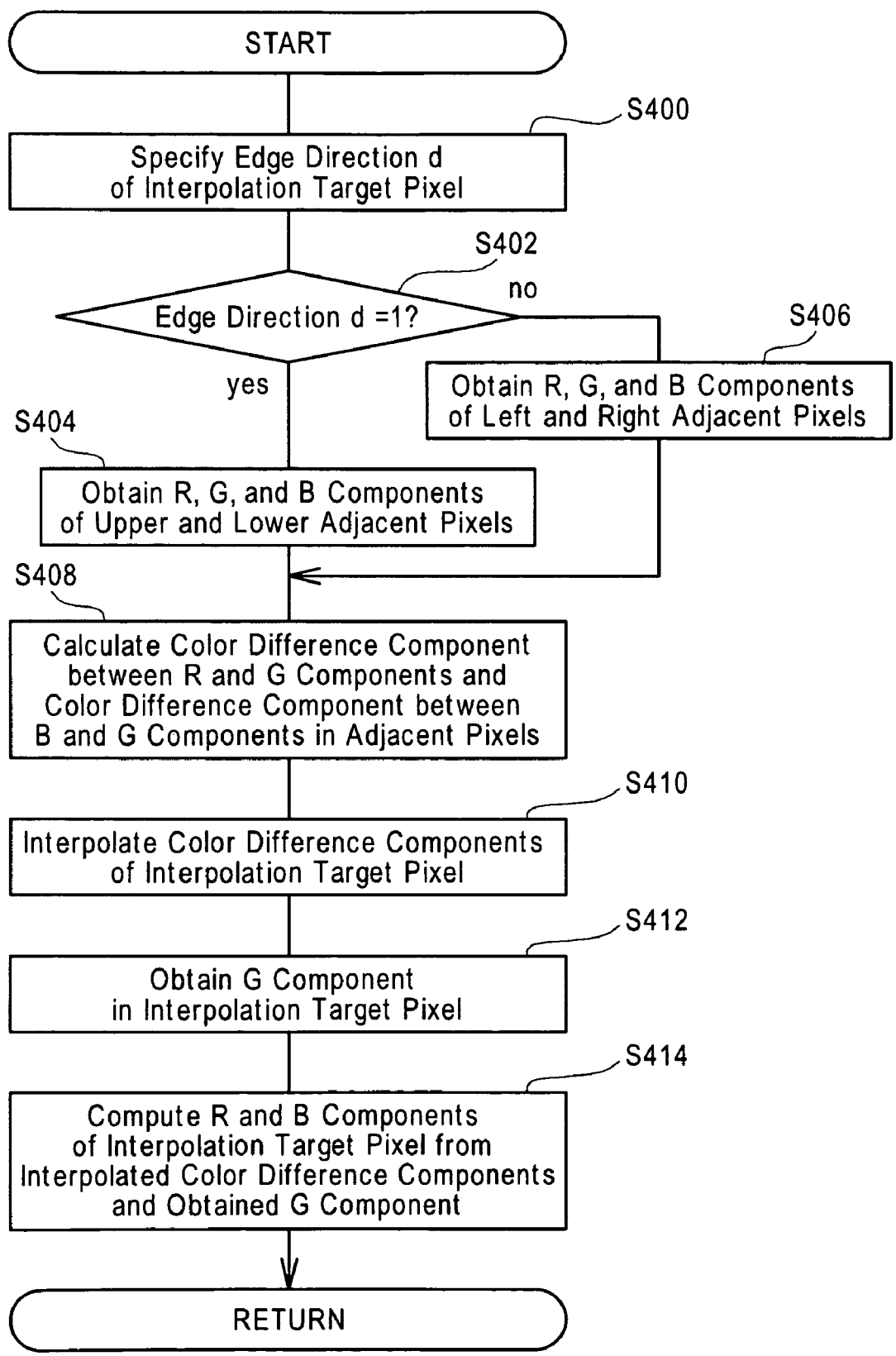
FIG. 22 is a flowchart showing the details of a G pixel interpolation process executed in the color image data generation process of FIG. 3 by the image processing apparatus of the embodiment.

FIG. 22 is a flowchart showing the details of the G pixel interpolation process. The G pixel interpolation process first specifies the edge direction in each interpolation target pixel as an object of interpolation (step S400). The edge directions have been detected in advance and set in the edge creation map by the edge direction map creation process of FIG. 7. As previously mentioned, the edge direction may be determined for all of the pixels, but to accelerate processing in the present embodiment, the edge direction is determined only for non-G pixels (R pixels and B pixels), and edge directions are not determined for the G pixels. However, as shown in FIG. 2, since the G pixels are surrounded by non-G pixels on the periphery thereof, and edge directions in the non-G pixels are calculated, the edge directions in the G pixels that are to be interpolated can be estimated from the edge directions of the peripheral pixels.

FIGS. 23A-23D shows estimation of the edge direction in the interpolation target pixel from the edge directions of the adjacent pixels. The G pixel interpolation process interpolates the missing (that is, R and B) color components in the G pixels. The original pixels of raw data surrounding the interpolation target pixel satisfy either of an arrangement of FIG. 23A or an arrangement of FIG. 23B. In FIGS. 23A and 23B, a hatched rectangle represents the interpolation target pixel. This estimation is performed on the assumption that the edge directions have been detected for only the non-G pixels. The edge directions have accordingly been set in four adjacent pixels above, below, on the left, and on the right of the interpolation target pixel.

FIGS. 23C and 23D show arrangements of the edge directions "d" in the four adjacent pixels of the interpolation target pixel. In the arrangement of the edge directions "d" of the four adjacent pixels shown in FIG. 23C, the number of the adjacent pixels having the edge direction "d" set to "1" is greater than the number of the adjacent pixels having the edge direction "d" set to "3". It is accordingly adequate to estimate the edge direction "d" of the interpolation target pixel as "1". In the arrangement of the edge directions "d" of the four adjacent pixels shown in FIG. 23D, on the other hand, the number of the adjacent pixels having the edge direction "d" set to "3" is greater than the number of the adjacent pixels having the edge direction "d" set to "1". It is accordingly adequate to estimate the edge direction "d" of the interpolation target pixel as "3".

In this manner, the estimation procedure counts the number of the adjacent pixels having the edge direction "d" set to "1" and the number of the adjacent pixels having the edge direction "d" set to "3" and specifies the edge direction "d" of the greater count as the edge direction "d" of the interpolation target pixel. Instead of counting the respective numbers of the adjacent pixels, another estimation procedure may calculate the sum of the edge directions "d" set in the four adjacent pixels above, below, on the left, and on the right of the interpolation target pixel. When there are the same numbers of the adjacent pixels having the edge direction "d" set to "1" and the adjacent pixels having the edge direction "d" set to "3", the sum of the edge directions "d" is equal to "8". When the sum of the edge directions "d" is less than "8", it is expected that the greater number of the adjacent pixels have the edge direction "d" set to "1". The edge direction "d" of the interpolation target pixel is thus specified as "1". When the sum of the edge directions "d" is greater than "8", on the other hand, it is expected that the greater number of the adjacent pixels have the edge direction "d" set to "3". The edge direction "d" of the interpolation target pixel is thus specified as "3". When the sum of the edge directions "d" is equal to "8" (when there are the same numbers of the adjacent pixels having the edge direction "d" set to "1" and the adjacent pixels having the edge direction "d" set to "3"), the edge direction "d" of the interpolation target pixel may be specified as either "1" or "3".

As described above, when the edge directions "d" have been set for all the pixels, the G pixel interpolation process of FIG. 22 simply reads the edge direction "d" of the interpolation target pixel from the edge direction map at step S500. When the edge directions "d" have been set for only the non-G pixels, on the other hand, the G pixel interpolation process reads the edge directions of adjacent pixels adjoining to the interpolation target pixel from the edge direction map and estimates the edge direction "d" of the interpolation target pixel at step S400.

After specification of the edge direction "d" in the interpolation target pixel, the G pixel interpolation process determines whether the specified edge direction "d" is equal to "1" (step S402). When the specified edge direction "d" is equal to "1" (step S402: yes), it is determined that the edge goes through the interpolation target pixel in the vertical direction. The G pixel interpolation process accordingly obtains the R component, the G component, and the B component of the upper and the lower adjacent pixels above and below the interpolation target pixel (step S404). As shown in the arrangements of FIGS. 23A and 23B, the upper and the lower adjacent pixels above and below the interpolation target pixel are always the non-G pixels. The missing color components of the non-G pixels have already been computed by the G component interpolation process of FIG. 19 and the non-G pixel interpolation process of FIG. 21. The R, G, and B components of these upper and the lower adjacent pixels are thus immediately obtainable.

When the specified edge direction "d" is not equal to "1" (step S402: no), on the other hand, it is determined that the edge goes through the interpolation target pixel in the horizontal direction. The G pixel interpolation process accordingly obtains the R component, the G component, and the B component of the left and the right adjacent pixels on the left and on the right of the interpolation target pixel (step S406). Since the left and the right adjacent pixels on the left and on the right of the interpolation target pixel are always the non-G pixels, the R, G, and B components of these left and right adjacent pixels are immediately obtainable.

The G pixel interpolation process then calculates the color difference components in the adjacent pixels as the objects of acquisition of the R, G, and B components (step S408). When the edge direction "d" of the interpolation target pixel is equal to "1" (step S402: yes), the G pixel interpolation process calculates the color difference components in the upper and the lower adjacent pixels. When the edge direction "d" of the interpolation target pixel is not equal to "1" (step S406: no), on the other hand, the G pixel interpolation process calculates the color difference components in the left and the right adjacent pixels. As in the non-G pixel interpolation process of FIG. 21, the sign-changed color difference components are obtained at step S408 by subtraction of the G component from the R component and by subtraction of the G component from the B component. This saves changing the sign in the later computation of the R component and the B component in the interpolation target pixel.

After calculation of the color difference components in the upper and the lower adjacent pixels or in the left and the right adjacent pixels (step S408), the G pixel interpolation process performs interpolation with the calculated color difference components of the adjacent pixels to compute the color difference components of the interpolation target pixel (step S410). As mentioned above, the color difference components calculated in the upper and the lower adjacent pixels or in the left and the right adjacent pixels are the sign-changed color difference components (that is, the color difference components by subtraction of the G component from the R component and the color difference components by subtraction of the G component from the B component). The interpolated color difference components are thus the sign-changed color difference components.

The G pixel interpolation process then obtains the G component of the interpolation target pixel (step S412). Since the interpolation target pixel is the G pixel, the raw image data directly regards the G component. The G pixel interpolation process subsequently computes the R component and the B component in the interpolation target pixel from the interpolated color difference components and the obtained G component of the interpolation target pixel (step S414). Since the interpolated color difference components are the sign-changed (that is, the green component subtracted from the red component, and the green component subtracted from the blue component) color difference components, simple addition of the G component to the interpolated color difference components determines the R component and the B component of the interpolation target pixel.

After computation of the missing color components (the R component and the B component) in all the G pixels as described above, the CPU terminates the G pixel interpolation process of FIG. 22 and goes back to the color image data generation process of FIG. 3.

On completion of the G pixel interpolation process (step S112), the demosaicing process, that is, interpolation of the missing color components has been concluded for all the pixels. The CPU then outputs the R, G, and B components of the respective pixels as the color image data generated from the raw image data (step S114) and terminates the color image data generation process of FIG. 3.

The digital camera 100 of the embodiment performs demosaicing of the raw image data to generate the color image data according to the series of processing described below in detail. The color image data generation process creates the edge direction map, prior to the demosaicing process. By taking into account the variations of the color difference components CDv in the vertical direction and the color difference components CDh in the horizontal direction, the edge directions of the respective pixels are detectable from the color difference components of the two different types (that is, the color difference components between the G component and the R component and the color difference components between the G component and the B component). This ensures highly accurate detection of even small-scale edges and accordingly enables creation of the accurate edge direction map. The subsequent demosaicing process refers to this accurate edge direction map to adequately interpolate the missing color components in the respective pixels.

Both the edge direction map creation process and the interpolation of the missing color components are rather simple and are executable at the high speed. The series of processing in the embodiment thus enables high-speed generation of adequate color image data from raw image data with a mosaic arrangement of the R, G, and B color components.

Since the edge direction map referenced by the demosaicing processing is subjected to an edge noise removal process to produce an edge-noise-free edge direction map, the demosaicing can be performed more adequately.

H. Modifications

Various modifications may be made to the color image data generation process of the present embodiment described above. These modifications will be briefly described hereinafter.

H-1. Modification 1:

In the edge noise removal process of the present embodiment described previously using FIG. 13, the isolated noise removal process shown in FIG. 14 and the cluster noise removal process shown in FIG. 17 were described as being performed for all of the edge directions d stored in the edge direction map. However, it is not necessarily impossible for even a correct edge direction to be erroneously determined to be edge noise by the isolated noise removal process or the cluster noise removal process. In the event of an erroneous determination, a correct edge direction is changed to an incorrect edge direction. The object of removing edge noise is to appropriately interpolate missing color components in the raw image data so that aliasing does not occur even in areas in which aliasing easily occurs. For this reason, a configuration may be adopted in which edge noise is removed only for areas in which aliasing easily occurs.

Figure 24:
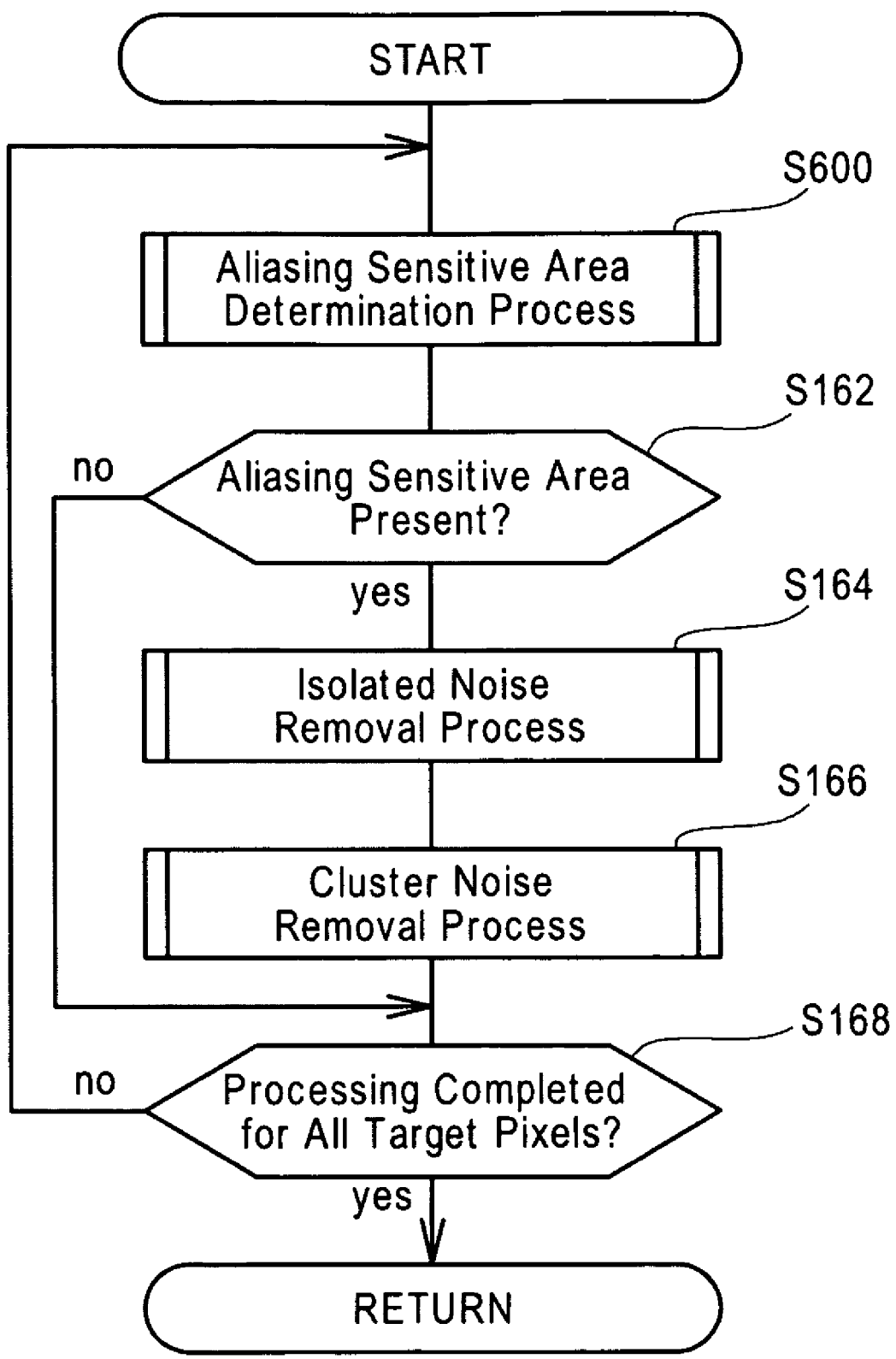
FIG. 24 is a flowchart showing the edge noise removal process according to Modification 1.

FIG. 24 is a flowchart showing the edge noise removal process of Modification 1. The edge noise removal process of Modification 1 is executed instead of the edge noise removal process (step S106) in the color image data generation process shown in FIG. 3. As shown in FIG. 24, in the edge noise removal process of Modification 1, before the previously described isolated noise removal process (step S300) and cluster noise removal process (step S320) are performed, a determination is made as to whether an area is an aliasing-sensitive area (step S600). Substantially the same processing (step S164, step S166) as the aforementioned isolated noise removal process and cluster noise removal process is performed only for the aliasing sensitive area (step S162: yes). For non-aliasing sensitive areas, isolated noise removal and cluster noise removal processes are not performed (step S162: no).

Figure 25:
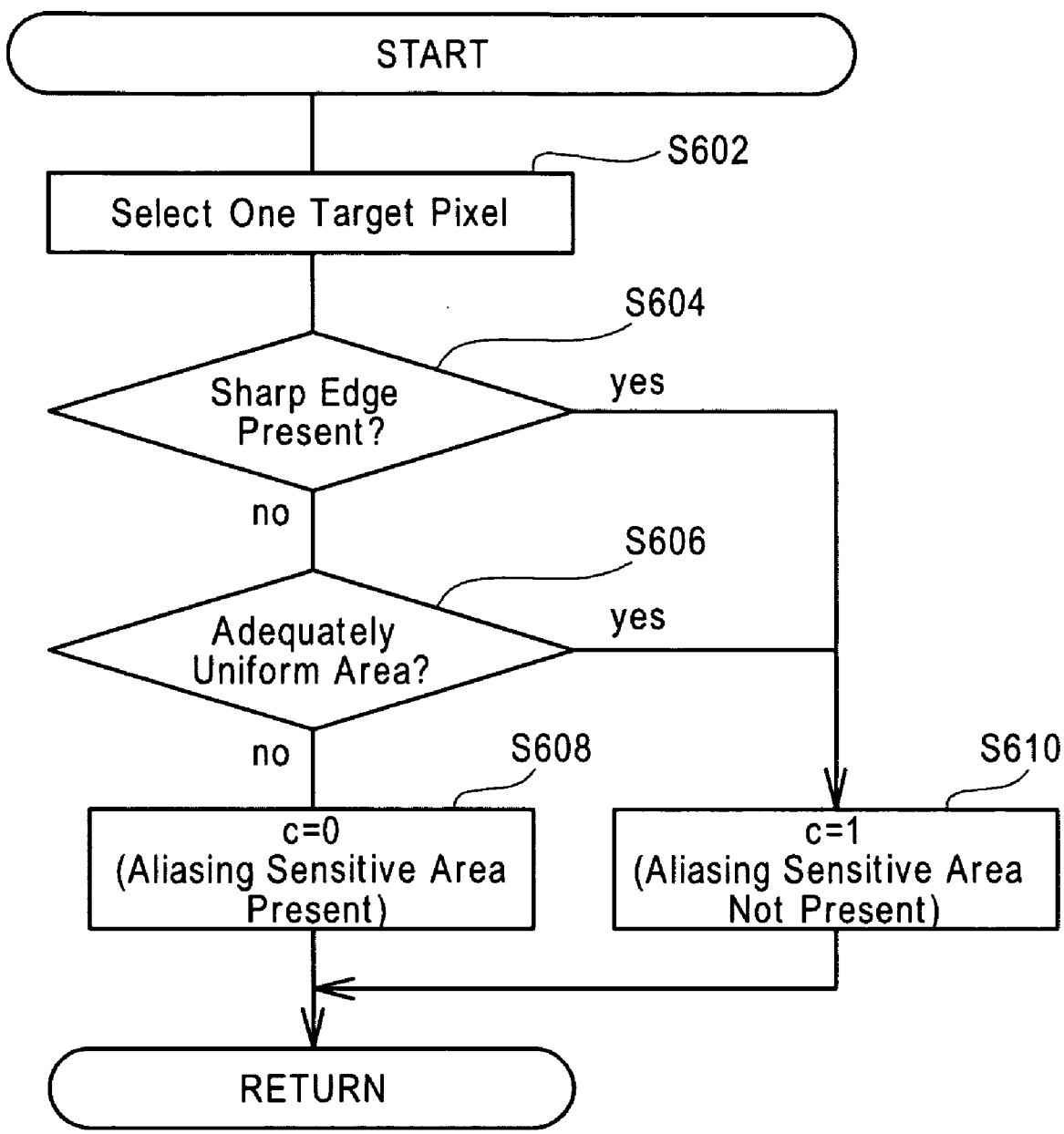
FIG. 25 is a flowchart showing the process for determining the presence of an aliasing-sensitive area in Modification 1.

FIG. 25 is a flowchart showing the process for determining the presence of an aliasing-sensitive area in Modification 1. As shown in FIG. 25, when the aliasing-sensitive area determination process is initiated, a single target pixel is first selected (step S602). The target pixel in this instance is a pixel used as a target for determining the presence of an aliasing-sensitive area, and is selected from among pixels in which an edge direction is set in the edge direction map.

A determination is then made as to whether a sharp edge is present at the position of the selected target pixel (step S604). Various methods can be used to determine the presence of a sharp edge, and the determination in this case is made directly from the raw image data.

FIGS. 26A-26D are diagrams showing an example of the method for determining, based on the raw image data, whether a sharp edge is present at the position of the target pixel. FIG. 26A shows the determination formulas used in the determination, and a sharp edge is determined to be present when the raw image data of the target pixel satisfy any of the determination formulas shown in FIG. 26A. The determination formula shown at the top of FIG. 26A will first be described. The expression $z(r, s)$ shown in FIG. 26A indicates the raw image data obtained at the target pixel. The expression $z(r, s-2)$ indicates the raw image data obtained at the pixel two pixels to the left of the target pixel, and $z(r, s+2)$ indicates the raw image data obtained at the pixel two pixels to the right of the target pixel. FIG. 26B shows the positional relationship between these three pixels; that is, the target pixel and the pixels to the left and right of the target pixel.

Since the raw image data in this instance are image data obtained through the use of a Bayer color filter such as the one shown in FIG. 2, the raw image data $z(r, s)$ of the target pixel indicated by diagonal lines in FIG. 26B, the raw image data $z(r, s-2)$ of the left pixel indicated by the ○ symbol in FIG. 26B, and the raw image data $z(r, s+2)$ of the right pixel are all image data of the same color component. Consequently, when there is no significant change in the raw image data in at least the left-right direction in the position of the target pixel, no significant difference is expected to exist between the raw image data of the target pixel and the average value of the raw image data to the left and right of the target pixel. This principle will be described with reference to FIG. 26D.

FIG. 26D shows an example of the size relationship between the raw image data of the target pixel, the raw image data of the pixels to the left and right of the target pixel, and the average value of the raw image data of the left and right pixels. In the example shown, there is a significant change in the raw image data between the target pixel and the pixel on the right, but when such a large change is present, there is a large deviation between the raw image data of the target pixel and the average value of the raw image data of the pixels to the left and right of the target pixel. Conversely, this deviation is small when the raw image data are substantially constant, or when the raw image data increase or decrease monotonically. Therefore, a threshold value is determined in advance, and when the deviation between the raw image data of the target pixel and the average value of the raw image data of the pixels to the left and right of the target pixel is larger than the threshold value, the raw image data can be considered to have a significant variation in the horizontal direction.

The determination formula shown at the top of FIG. 26A is for determining whether the raw image data varies significantly in the horizontal direction as described above. The square of the deviation and a prescribed threshold value T are compared in the determination formula so that the determination can be made without distinguishing between positive and negative variation amounts. When the square of the deviation is larger than the threshold value T, the raw image data is considered to significantly change in the horizontal direction, and a sharp edge is therefore determined to be present at the target pixel.

The determination formula shown at the bottom of FIG. 26A is for determining whether the raw image data varies significantly in the vertical direction. Specifically, $z(r-2, s)$ in the lower determination formula indicates the raw image data obtained at the pixel two pixels upward from the target pixel, and $z(r+2, s)$ indicates the raw image data obtained at the pixel two pixels downward from the target pixel. FIG. 26C shows the positional relationship between the target pixel and the pixels above and below the target pixel. Among these three pixels, since raw image data of the same color component is obtained, no significant difference is expected between the raw image data of the target pixel and the average value of the image data of the pixels indicated by the x symbols in FIG. 26C if there is no significant change in the raw image data in at least the vertical direction at the position of the target pixel. Consequently, when the lower determination formula shown in FIG. 26A holds true, the raw image data is considered to significantly change in the vertical direction, and a sharp edge is therefore determined to be present at the target pixel.

In step S604 of the aliasing-sensitive area determination process shown in FIG. 25, a determination is made directly from the raw image data through the use of the determination formulas shown in FIG. 26A as to whether a sharp edge is present at the target pixel. Experimentation has shown that aliasing is unlikely to occur in locations at which a sharp edge is present. Therefore, when a sharp edge is determined to be present (step S604: yes), since the target pixel is not considered to be an aliasing-sensitive area, the value "1" indicating the absence of an aliasing-sensitive area is set as an aliasing indicator c for indicating whether an aliasing-sensitive area is present (step S610). The method for determining whether a sharp edge is present at the target pixel is not limited to the method shown in FIG. 26, and various methods may be used.

When a sharp edge is determined to not be present in the target pixel (step S604: no), a determination is then made as to whether the target pixel is positioned within an adequately uniform area (step S606). The determination as to whether the target pixel is positioned within an adequately uniform area can also be performed using various methods, the same as the determination described above regarding the presence or a large edge, but the determination is made directly from the raw image data in this instance as well.

FIGS. 27A-27G are diagrams showing an example of the method for determining, based on the raw image data, whether the position of the target pixel is within an adequately uniform area. The basic principle underlying this determination will first be described with reference to FIG. 27A. The pixel indicated by diagonal lines in the drawing is the target pixel. As previously mentioned, since the target pixel is selected from pixels for which the edge direction is being calculated, and this edge direction is calculated only for the R pixels and B pixels, the target pixel is an R pixel or a B pixel. As shown in FIG. 2, the raw image data are image data obtained through the use of a Bayer color filter. Consequently, the raw image data obtained at the four pixels adjacent to the target pixel above and below and to the left and right are all G-component image data. Since the target pixel is in an adequately uniform area, the raw image data at the four pixels adjacent above and below and to the left and right are expected to have substantially the same value. Therefore, a determination is made as to whether the values of the raw image data at the pixels indicated by the ○ symbols in FIG. 27A are similar to each other, and when the values are similar, the target pixel can be determined to be present in an adequately uniform area.

Various methods can be used to determine whether the four pixels indicated by the ○ symbols in FIG. 27A have similar raw image data. For example, according to the simplest method, the difference between the maximum value and the minimum value of the raw image data of the four pixels is found, and the four sets of raw image data can be determined to have similar values if the difference is adequately small. However, the determination in the present example is made using a method such as the one described below.

FIG. 27B shows the determination formulas used in Modification 1 to determine whether the position of the target pixel is within an adequately uniform area. Four determination formulas are shown in FIG. 27B, but when all of these determination formulas are satisfied, the target pixel is determined to be in a uniform area. The topmost determination formula in FIG. 27B will first be described.

The expression $z(r, s-1)$ in the determination formula at the top of FIG. 27B indicates the raw image data of the pixel adjacent to the left of the target pixel, $z(r-1, s)$ indicates the raw image data of the pixel adjacent above the target pixel, and $z(r+1, s)$ indicates the raw image data of the pixel adjacent below the target pixel. FIG. 27C shows the positional relationship between these three pixels and the target pixel. The raw image data of the pixel indicated by the ○ symbol, and the average value of the raw image data of the upper and lower pixels indicated by the x symbols in FIG. 27C are expected to have substantially the same value. Therefore, the square of the difference thereof is calculated, and when the square value is smaller than a prescribed threshold value $\alpha$, the possibility is high that the raw image data of the pixel indicated by the ○ symbol, and the two pixels indicated by the x symbols in FIG. 27C have substantially the same value. However, it is possible that although the raw image data of the pixels indicated by x in the drawing may have substantially the same value, the average value thereof may happen to be substantially the same as that of the raw image data of the ○ pixels. Therefore, in order to eliminate such a possibility the determination is made in the same manner in a different orientation.

The second determination formula from the top in FIG. 27B is used to make the same determination as the top determination formula in a different orientation. FIG. 27D is a diagram showing the pixel positions referenced by the determination formula listed second from the top. In this determination as well, the difference is calculated between the average value of the raw image data at the pixels indicated by x symbols in FIG. 27D, and the raw image data at the pixel indicated by ○, and the square of the difference is compared with the prescribed threshold value $\alpha$. When the square of the difference is smaller than the threshold value $\alpha$, the raw image data of the three pixels shown in FIG. 27D are considered to have substantially the same value. Confirmation is performed in the same manner for the determination formula listed third from the top, and the determination formula listed at the bottom in FIG. 27B. FIG. 27E shows the pixel positions referenced by the determination formula listed third from the top, and FIG. 27F shows the pixel positions referenced by the determination formula listed at the bottom. In the case of FIG. 27E or FIG. 27F as well, the difference is calculated between the average value of the raw image data at the pixels indicated by x symbols, and the raw image data at the pixel indicated by ○, and the square of the difference is compared with the prescribed threshold value $\alpha$. As a result, when the four determination formulas shown in FIG. 27B are all satisfied, the raw image data of the four pixels indicated by ○ in FIG. 27A are all considered to have substantially the same value, and the target pixel can therefore be determined to be in an adequately uniform area.

The threshold value $\alpha$ was described as a constant value in the description given above, but an appropriate threshold value $\alpha$ may also be computed and used according to the raw image data of the pixels surrounding the target pixel. FIG. 27G shows an example of a typical formula for calculating the threshold value $\alpha$.

In step S606 of the aliasing-sensitive area determination process shown in FIG. 25, a determination is made in the manner described above as to whether the target pixel is present in an adequately uniform area. Experimentation has shown that aliasing is unlikely to occur in an adequately uniform area. Consequently, when the target pixel has been determined to be in an adequately uniform area (step S606: yes), since the target pixel is considered to not be in an aliasing-sensitive area, the value "1" indicating the absence of an aliasing-sensitive area is set as the aliasing indicator c (specifically, c(r, s) in the (r,s) target pixel location) for indicating whether an aliasing-sensitive area is present (step S610).

In contrast, when the position of the target pixel is determined to not be in an adequately uniform area (step S606: no), the value "0" indicating the presence of an aliasing-sensitive area is set as the aliasing indicator c for indicating whether an aliasing-sensitive area is present (step S608). Specifically, as previously mentioned, experimentation has shown that aliasing is unlikely to occur in areas in which there are sharp edges, or areas that are adequately uniform. Therefore, the occurrence of aliasing is determined to be possible for other areas, and the value "0" indicating the presence of an aliasing-sensitive area is set as the aliasing indicator c for indicating whether an aliasing-sensitive area is present.

Once the presence or absence of an aliasing-sensitive area is determined as described above for the target pixel selected in step S602, the aliasing-sensitive area determination process shown in FIG. 25 is completed, and the process returns to the edge noise removal process of Modification 1 shown in FIG. 24. As shown in FIG. 24, in the edge noise removal process of Modification 1, when the process returns from the aliasing-sensitive area determination process, a determination is made as to whether the target pixel is within an aliasing-sensitive area (step S162). The target pixel in this instance is the pixel selected in step S602 of FIG. 25. As previously described using FIG. 25, the aliasing indicator c is set to "0" (corresponding to step S162: yes) when the target pixel is within an aliasing-sensitive area, and the aliasing indicator c is set to "1" (corresponding to step S162: no) when the target pixel is not within an aliasing-sensitive area. Consequently, in step S162 of FIG. 24, the determination as to whether the target pixel is within an aliasing-sensitive area can immediately be made by referencing the value of the aliasing indicator c.

When the target pixel is determined not to be within an aliasing-sensitive area (step S162: no), the process skips ahead to a determination as to whether the processing has been completed for all the pixels (target pixels) for which edge directions are set in the edge direction map (step S168 of FIG. 24). In the aliasing-sensitive area determination process, a new target pixel is selected (step S602 of FIG. 25), a determination is made as to whether the target pixel is in an aliasing-sensitive area, the aliasing indicator c is set to the determination result, and the process then returns again to the edge noise removal process of FIG. 24. In the edge noise removal process, a determination is made as to whether the target pixel is within an aliasing-sensitive area (step S162 of FIG. 24). This operation is repeated, and when a target pixel that is in an aliasing-sensitive area is found (step S162: yes), the isolated noise removal process (step S164) and the cluster noise removal process (step S166) are performed.

The isolated noise removal process (step S164) and cluster noise removal process (step S166) performed in the edge noise removal process of Modification 1 are substantially the same as the isolated noise removal process (step S300) previously described using FIG. 14 and as the cluster noise removal process (step S320) previously described using FIG. 17, respectively, and differ only in the following aspect. Specifically, in the isolated noise removal process (S300) shown in FIG. 14 or the cluster noise removal process (S320) shown in FIG. 17, a target pixel is selected at the beginning of each process, and at the end of each process, a determination is made as to whether processing has been completed for all the target pixels. In contrast, the isolated noise removal process (step S164) and the cluster noise removal process (step S166) of Modification 1 differ from the abovementioned processes only in that the abovementioned selection and determination are not performed.

An overview of the isolated noise removal process (step S164) of Modification 1 will be given hereinafter with reference to the flowchart of FIG. 14. A target pixel is selected first (step S302) in the flowchart of FIG. 14, but such a process is not performed in the isolated noise removal process (step S164) of Modification 1. The reason for this is that the isolated noise removal process (step S164) of Modification 1 is executed for the target pixel when the target pixel selected in the aliasing-sensitive area determination process is determined to be within an aliasing-sensitive area (step S162: yes), as shown in FIG. 24.

When the isolated noise removal process (step S164) of Modification 1 is initiated, a determination is made as to whether the edge direction of the target pixel is "1" or "3". When the edge direction is "1" (corresponding to step S304 of FIG. 14), determination is made as to whether both the upward and downward edge directions are "3" (corresponding to step S306 of FIG. 14), or both the left and right edge directions are "3" (corresponding to step S308 of FIG. 14). When any one of these alternatives holds true, isolated noise is determined to be present, and the edge direction of the target pixel is changed to "3" (corresponding to step S310 of FIG. 14).

In the same manner when the edge direction of the target pixel is "3," a determination is made as to whether both the upward and downward edge directions are "1" (corresponding to step S312 of FIG. 14), or both the left and right edge directions are "1" (corresponding to step S314 of FIG. 14). When any one of these alternatives holds true, isolated noise is determined to be present, and the edge direction of the target pixel is changed to "1" (corresponding to step S316 of FIG. 14).

In the isolated noise removal process (step S164) of Modification 1 shown in FIG. 24, once a determination such as the one described above is made, the process is immediately ended, and the process returns to the edge noise removal process shown in FIG. 24. The cluster noise removal process (step S166) is then initiated. An overview of the cluster noise removal process (step S166) of Modification 1 will be given hereinafter with reference to the flowchart of FIG. 17.

A target pixel is selected at the beginning (step S322) in the flowchart of FIG. 17 as well, but such a process is not performed in the cluster noise removal process (step S166) of Modification 1. The reason for this is that the cluster noise removal process (step S166) of Modification 1 is a process subsequently executed for the target pixel selected in the isolated noise removal process (step S164) of Modification 1 described above.

When the cluster noise removal process (step S166) of Modification 1 is initiated, a determination is first made as to whether it is possible that the edge direction of the target pixel is the aforementioned cluster noise. When cluster noise is determined to be potentially present, a determination is made according to the edge direction of the target pixel as to whether cluster noise is present by referencing the edge directions of pixels in the vertical direction or the horizontal direction, and when cluster noise is determined to be present, the edge direction of the target pixel is changed. These steps are performed as discussed above in connection with FIG. 17.

In the cluster noise removal process (step S166) of Modification 1 shown in FIG. 24, once such operations as described above are performed, the process is immediately ended, and the process returns to the edge noise removal process shown in FIG. 24. A determination is then made as to whether the sequence of processes described above has been completed for all the pixels (target pixels) for which edge directions are set in the edge direction map (step S168 of FIG. 24). As a result, when unprocessed target pixels remain (step S168: no), the process again returns to the beginning of the edge noise removal process (step S106 of FIG. 3) of Modification 1, and the aliasing-sensitive area determination process previously described using FIG. 25 is restarted (step S600). In the aliasing-sensitive area determination process, a new target pixel is selected, and the sequence of processes described above is performed for the selected target pixel. This operation is repeated, and once the processes are finally completed for all the target pixels (step S168 of FIG. 24: yes), the edge noise removal process of Modification 1 is completed.

In the edge noise removal process of Modification 1 described above, an aliasing-sensitive area (area in which aliasing easily occurs) is detected, and the isolated noise removal process and cluster noise removal process are performed only for the detected area. It is therefore possible to prevent the isolated noise removal process and the cluster noise removal process from being unnecessarily performed for areas in which aliasing is unlikely to occur, and correct edge directions can be prevented from being erroneously determined to be edge noise. As a result, the edge noise removal process of Modification 1 makes it possible to obtain a more accurate edge direction map, and missing color components in the raw image data can interpolated while such an edge direction map is referenced, thereby making it possible to execute demosaicing more appropriately.

H-2. Modification 2:

In Modification 1 described above, a determination is made as to whether the target pixel is in an aliasing-sensitive area, and when the target pixel is in an aliasing-sensitive area, the isolated noise removal process (step S164 of FIG. 24) and the cluster noise removal process (step S166) are performed. However, there is potential for error in the determination as to whether the target pixel is in an aliasing-sensitive area. Therefore, a configuration may be adopted in which the aliasing indicator c for indicating the result of determining whether the target pixel is in an aliasing-sensitive area is stored in advance in a map, and processing is performed for removing noise (an erroneously determined aliasing indicator) from the map (aliasing-sensitive area map).

Figure 28:
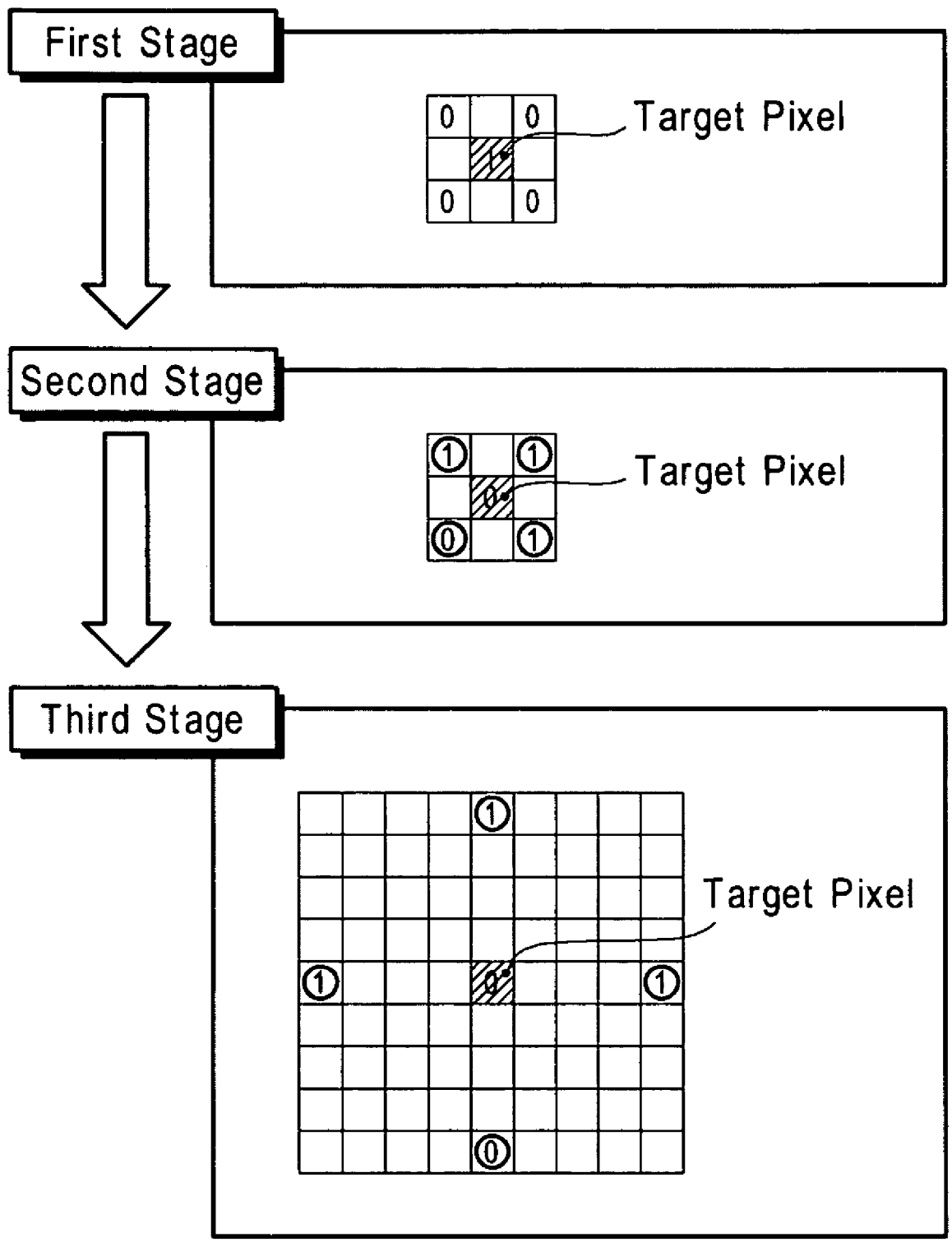
FIG. 28 is a diagram showing an example of the manner in which noise of the aliasing-sensitive area map is removed in Modification 2.

FIG. 28 is a diagram showing an example of the manner in which noise in the aliasing-sensitive area map is removed in Modification 2. In the example shown, the processing for removing noise in the aliasing-sensitive area map is divided into a first stage, a second stage, and a third stage. The diagram shows the manner in which noise is detected in each stage.

In the first stage, a location is detected in which the aliasing indicator is erroneously determined to be "1" (aliasing-sensitive area not present), and processing is performed for changing the aliasing indicator c to "0" (aliasing-sensitive area present). The location at which the aliasing indicator is erroneously determined to be "1" is detected as follows. First, a single pixel is selected in which the aliasing indicator c is set to the value of "1" in the aliasing-sensitive area map. As previously described using FIG. 25, since the determination as to whether an aliasing-sensitive area is present is performed for a pixel for which the edge direction is calculated, the aliasing indicators are set in a checkered flag pattern in the aliasing-sensitive area map. Therefore, a single pixel in which the value of "1" is set is selected from among the aliasing indicators set in the aliasing-sensitive area map, and the selected pixel is used as the determination object (target pixel).

The aliasing indicators c that are set on the periphery of the selected target pixel are then referenced. As described above, since the aliasing indicators c are set in a checkered flag pattern in the aliasing-sensitive area map, the aliasing indicators are set in four corner positions adjacent in diagonal directions on the periphery of the target pixel. When the values of the aliasing indicators set in the four corners are all "0," a determination is made that the aliasing indicator c of the target pixel has been erroneously set to "1." The portion labeled "First Stage" in FIG. 28 shows a case in which the aliasing indicator of the target pixel is determined to have been erroneously set to "1" (that is, the target pixel is noise). As shown in the drawing, the aliasing indicator of the target pixel is "1," but the aliasing indicators of the four adjacent corner pixels are all "0." In such a case, since the aliasing indicator of the target pixel is considered to have been erroneously set to "1," the value of the aliasing indicator of the target pixel is changed to "0." In the first stage, the operation described above is performed for all pixels in the aliasing-sensitive area map for which the value of the aliasing indicator c is set to "1."

A pixel for which the value of the aliasing indicator is erroneously set to "1 (aliasing-sensitive area not present) is detected in the first stage as described above, but in the second and third stages, processing is performed for detecting a pixel for which the aliasing indicator is erroneously set to "0 (aliasing-sensitive area present)," and the aliasing indicator is changed to "1 (aliasing-sensitive area present)."

In the second stage, a pixel for which the value of the aliasing indicator c is set to "0" in the aliasing-sensitive area map is selected as the target pixel. The aliasing indicators at the pixels adjacent at the four corners of the target pixel are read, and a determination is made as to whether three or more aliasing indicators among these four aliasing indicators are set to "1." As a result, when three or more aliasing indicators are "1," the aliasing indicator of the target pixel is determined to have been erroneously set to "0," and the value of the aliasing indicator of the target pixel is changed to "1." In the portion labeled "Second Stage" in FIG. 28, an example is shown of a case in which the aliasing indicator of the target pixel is determined to have been erroneously set to "0" (that is, the target pixel is determined to be noise). As shown in the diagram, the aliasing indicator of the target pixel is "0," but a larger number of values has been set to "1" in the adjacent four corner pixels. In such a case, the aliasing indicator c of the target pixel is determined to have been erroneously set to "0," and the value of the aliasing indicator is changed to "1." In the second stage, the operation described above is performed for all pixels for which the value of the aliasing indicator in the aliasing-sensitive area map is set to "0."

A pixel for which the value of the aliasing indicator c is set to "0" in the aliasing-sensitive area map is selected as the target pixel in the third stage as well. However, acquired in the third stage are four aliasing indicators c that are set in pixels located four pixels away from the target pixel in the vertical and horizontal directions. FIG. 28 shows the manner in which the aliasing indicators c set in these four pixels are acquired in the portion labeled "Third Stage." The pixel indicated by diagonal lines in the drawing is the target pixel, and the pixels located four pixels away from the target pixel in the vertical and horizontal directions are indicated by ○ symbols. A determination is made as to whether three or more aliasing indicators are set to "1" among the four aliasing indicators set in the pixels indicated by ○ symbols. As a result, when three or more aliasing indicators are "1," the aliasing indicator of the target pixel is determined to have been erroneously set to "0," and the value of the aliasing indicator is changed to "1." In the example shown, the aliasing indicator of the target pixel is determined to have been erroneously set to "0," and the value of the aliasing indicator of the target pixel is changed to "1." In the third stage, the operation described above is performed for all pixels for which the value of the aliasing indicator in the aliasing-sensitive area map is set to "0."

In Modification 2 as described above, pixels that are present in an aliasing-sensitive area are detected, an aliasing-sensitive area map is generated, and noise in the map is removed by performing the three stages of processing described above for the aliasing-sensitive area map. As a result, an aliasing-sensitive area map can be obtained in which the presence or absence of aliasing-sensitive areas is correctly determined. Such an aliasing-sensitive area map is then referenced, and the previously described isolated noise removal process (step S300 or step S164) and the previously described cluster noise removal process (step S320 or step S166) are performed only for the edge directions of pixels that are determined to be in an aliasing-sensitive area. It is therefore possible to prevent the isolated noise removal process and the cluster noise removal process from being performed for areas in which aliasing is unlikely to occur, and correct edge directions can be prevented from being erroneously determined to be edge noise. As a result, a more correct edge direction map can be obtained. Missing color components in the raw image data can be interpolated while such an edge direction map is referenced, thereby making it possible to execute demosaicing more appropriately.

H-3. Modification 3:

The isolated noise removal process (step S300 or step S164) and the cluster noise removal process (step S320 or step S166) described above reference relatively narrow areas and remove edge noise. Consequently, in a case in which edge noise appears to be present insofar as narrow areas are observed individually, but in which blocks of edge noise are apparent when a wider range is observed (an example of which is shown in FIG. 16(h)), it may be impossible to effectively remove such blocks (large blocks) of edge noise. The term "block noise" will be used hereinafter to refer to individual units of edge noise that constitute such large blocks of edge noise. Such a problem can be overcome by the operations described below.

Figure 29:
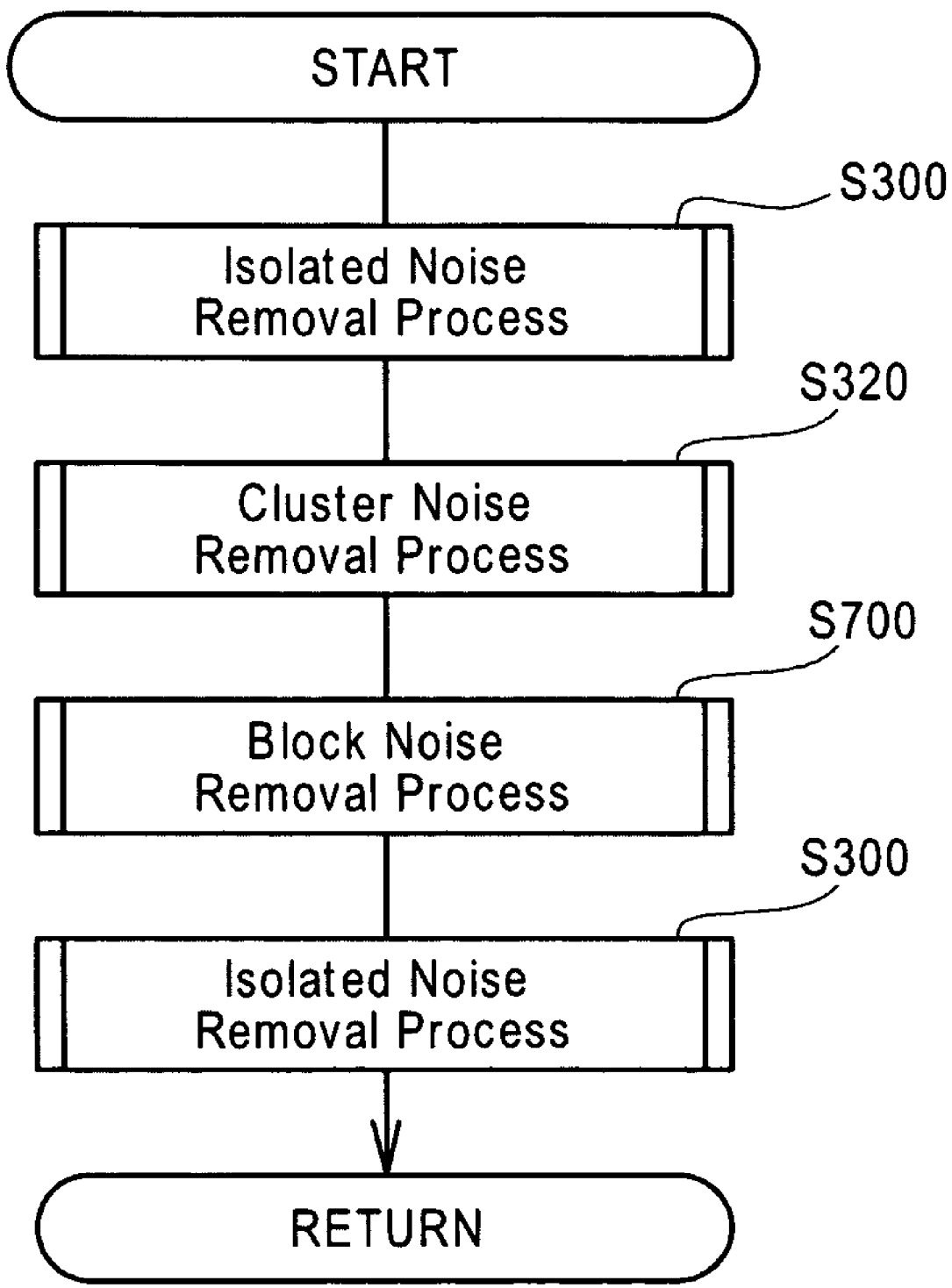
FIG. 29 is a flowchart showing the edge noise removal process according to Modification 3.

FIG. 29 is a flowchart showing the edge noise removal process of Modification 3. The edge noise removal process of Modification 3 shown in the diagram differs from the edge noise removal process previously described using FIG. 13 in that after the isolated noise removal process (step S300) and cluster noise removal process (step S320), a block noise removal process (step S700) is performed, and then the isolated noise removal process (step S300) is performed again. Since the isolated noise removal process (step S300) and the cluster noise removal process (step S320) are exactly the same as the processes previously described, no description thereof will be given, and the description will be of the block noise removal process.

In FIG. 29, the isolated noise removal process (step S300) is performed only once after the block noise removal process (step S700), but this configuration is not limiting, and the isolated noise removal process may be performed a plurality of times. Alternatively, the edge noise removal process may be ended without performing the isolated noise removal process (step S300) after the block noise removal process (step S700). A supplementary description of this aspect will be given after the block noise removal process (step S700) is described.

Figure 30:
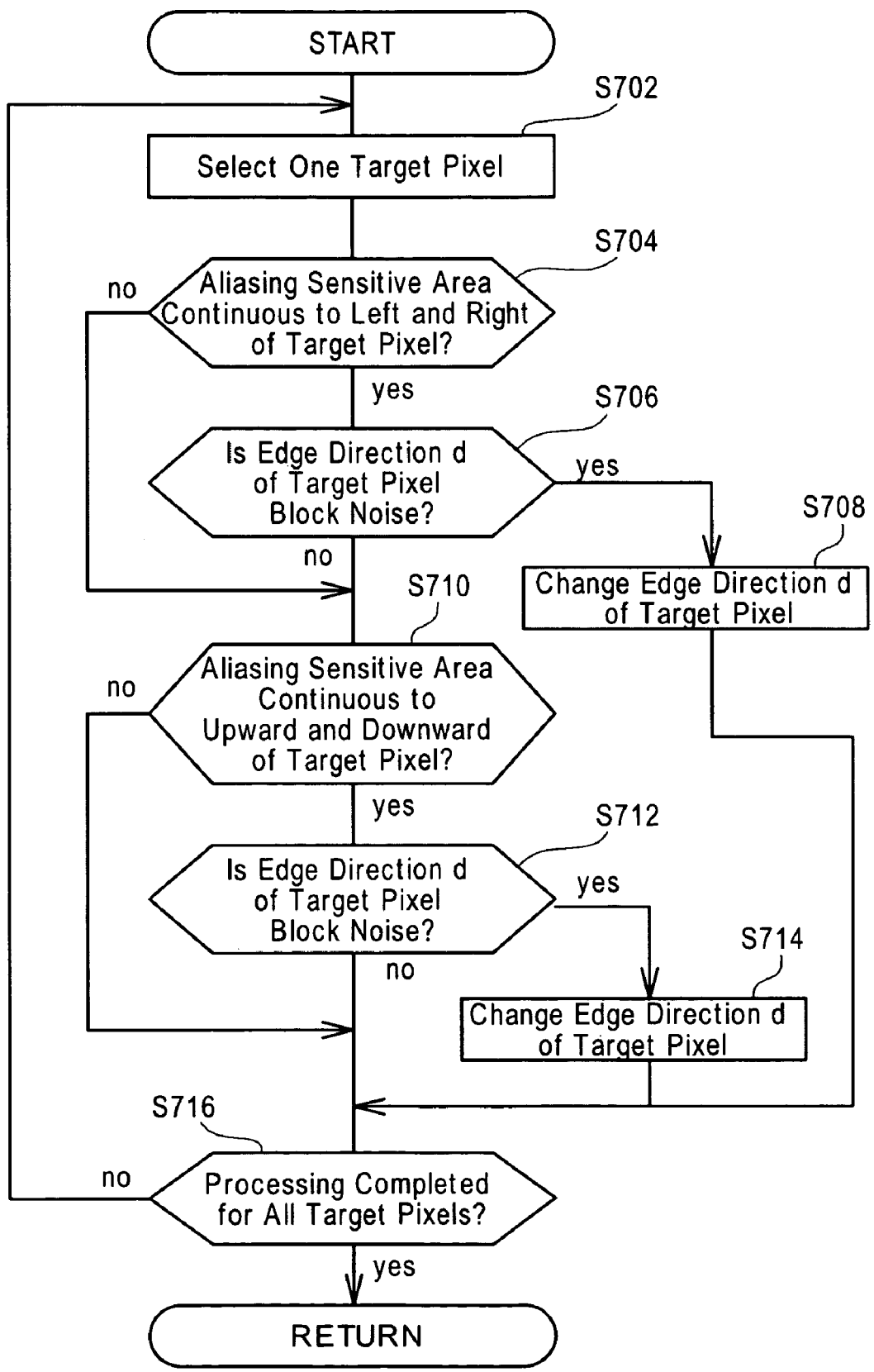
FIG. 30 is a flowchart showing the block noise removal process.

FIG. 30 is a flowchart showing the block noise removal process. As previously mentioned, this process is performed for the edge direction map for which the isolated noise removal process (step S300) and cluster noise removal process (step S320) have been performed in the edge noise removal process of Modification 3.

When the block noise removal process (step S700) is initiated, a single target pixel in which the edge direction is set is first selected from the edge direction map (step S702). A determination is then made as to whether an aliasing-sensitive area is continuous to the left or the right of the selected target pixel (step S704). This determination is made by referencing an aliasing-sensitive area map generated in advance.

Figure 31:
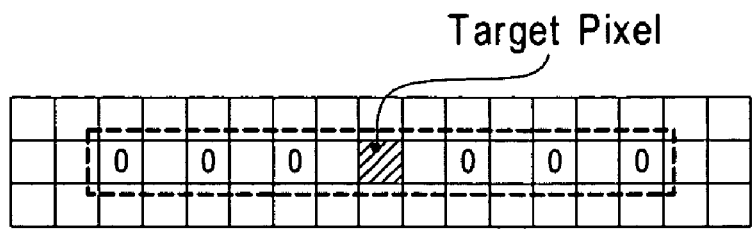
FIG. 31 is a diagram showing the manner in which the aliasing-sensitive area map is referenced to determine whether aliasing-sensitive areas continue in the left and right directions of the target pixel.

FIG. 31 is a diagram showing the manner in which the aliasing-sensitive area map is referenced to determine whether an aliasing-sensitive area is continuous in the left and right directions of the target pixel. The pixel indicated by diagonal lines in the diagram is the target pixel, and a determination is made as to whether the pixels in the area enclosed by the dashed line rectangle are all an aliasing-sensitive area, that is, whether a "0" is set for all of these pixels in the aliasing-sensitive area map. In FIG. 31, the presence or absence of an aliasing-sensitive area is determined for the areas made up of six pixels in the left direction and six pixels in the right direction, but it is possible to change the size of the area. When the pixels within these areas all constitute an aliasing-sensitive area, an aliasing-sensitive area is determined to be continuous in the left and right directions of the target pixel (step S704: yes). In contrast, when there is even one pixel that is not an aliasing-sensitive area, the aliasing-sensitive area is determined not to be continuous (step S704: no).

The aliasing-sensitive area map is referenced, and when an aliasing-sensitive area is determined to be continuous in the left and right directions of the target pixel (step S704: yes), a determination is then made as to whether the edge direction of the target pixel is block noise by referencing the edge direction map (step S706). This determination is made as described below.

Figure 32A:
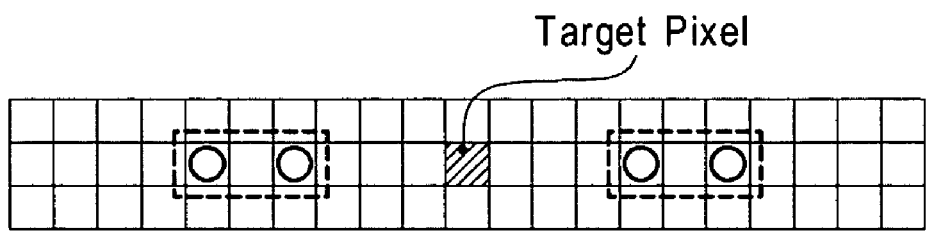
FIGS. 32A-32C are diagrams showing an example of a standard for determining whether the edge direction of the target pixel is block noise.
Figure 32B:
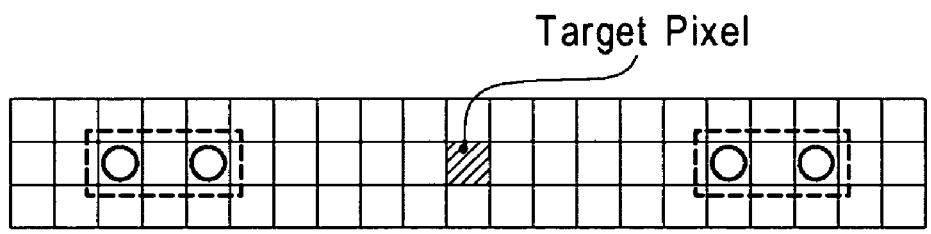
Figure 32C:
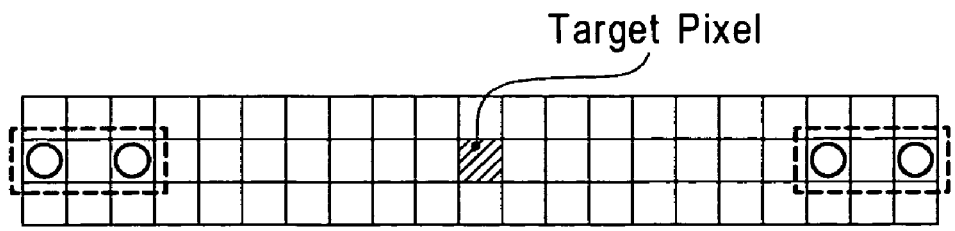

FIGS. 32A-32C are diagrams showing an example of a standard for determining whether the edge direction of the target pixel is block noise. The presence or absence of block noise is determined by confirming whether edge directions that are different than the edge direction of the target pixel are set in the pixels to the left and right of the center target pixel. In FIG. 32, the target pixel is indicated by diagonal lines, and the pixels for confirming the edge directions are indicated by ○ symbols. The edge directions of the pixels to the left and right of the center target pixel are confirmed because the fact that an aliasing-sensitive area is continuous to the left and right of the target pixel was already confirmed in step S704 of FIG. 30.

For example, in the example shown in FIG. 32A, the edge directions of the fourth and sixth pixels to the left of the target pixel, and the edge directions of the fourth and sixth pixels to the right of the target pixel are referenced. When all of the edge directions set in these four pixels differ from the edge direction set in the target pixel, the edge direction of the target pixel is determined to be block noise. In the example shown in FIG. 32B, the edge directions of the sixth and eighth pixels to the left of the target pixel, and the edge directions of the sixth and eighth pixels to the right of the target pixel are referenced. When all of these edge directions differ from the edge direction of the target pixel, the edge direction of the target pixel is determined to be block noise. In the same manner in the example shown in FIG. 32C, the edge directions of the eighth and tenth pixels to the left and right of the target pixel are referenced, and when all of these edge directions differ from the edge direction of the target pixel, the edge direction of the target pixel is determined to be block noise.

In step S706 of the block noise removal process shown in FIG. 30, where there is a correspondence to even one of the three determination standards shown in FIG. 32, the edge direction of the target pixel is determined to be block noise (step S706: yes). In the determination of the presence or absence of block noise, determination standards such as those used to reference the edge directions farther to the left and right of the target pixel, for example, may also be used besides the determination standards shown in FIG. 32. Alternatively, it is also possible to use determination standards whereby three edge directions each to the left and right of the target pixel are referenced. When the edge direction of the target pixel is determined to be block noise (step S706: yes), the value of the edge direction is changed (step S708). Specifically, an edge direction of "1" for the target pixel is changed to "3," and an edge direction of "3" for the target pixel is changed to "1."

In contrast, when the edge direction of the target pixel is determined not to be block noise (step S706: no), or when the determination is inherently made that an aliasing-sensitive area is not continuous to the left and right of the target pixel (step S704: no), the same operation is then performed for the vertical direction. Specifically, a determination is first made as to whether an aliasing-sensitive area is continuous upward and downward from the target pixel (step S710). In step S704 described previously with reference to FIG. 31, a determination is made as to whether all of the pixels in the area (the area indicated by the dashed line rectangle in FIG. 31) that extends six pixels to the left and right of the target pixel are in an aliasing-sensitive area. However, in step S710, a determination is made as to whether all of the pixels in the area that extends six pixels above and below the target pixel are in an aliasing-sensitive area.

When all of the pixels are determined to be in an aliasing-sensitive area (step S710: yes), the presence or absence of a correspondence to the same determination standards as those shown in FIGS. 32A-32C is determined while the edge directions set in the pixels above and below the target pixel are referenced. Specifically, according to the determination standards corresponding to FIG. 32A, the edge directions set in the four pixels that are the sum of the fourth and sixth pixels in each of the upward and downward directions from the target pixel are referenced, and when all of the edge directions differ from the edge direction of the target pixel, the edge direction of the target pixel is determined to be block noise. In the same manner for FIGS. 32B and 32C, a determination is made as to whether the edge direction of the target pixel is block noise on the basis of the corresponding determination standards. When there is a correspondence to any of these determination standards, the edge direction of the target pixel is determined to be block noise (step S712: yes), and the value of the edge direction is changed (step S714).

In contrast, when the edge direction of the target pixel is determined to not be block noise (step S712: no), or when it is determined that an aliasing-sensitive area is not continuous in the upward and downward directions from the target pixel (step S710: no), a determination is made as to whether the processing described above has been completed for all the target pixels (step S716). When pixels remain that have not been processed (step S716: no), the process returns to the beginning, a single new target pixel is selected (step S702), and the sequence of processes described above is performed for the selected target pixel. Since the determination is eventually made during the repetition of this processing that processing has been completed for all the target pixels (step S716: yes), the block noise removal process shown in FIG. 30 is completed, and the process returns to the edge noise removal process of Modification 3 shown in FIG. 29.

When block noise is removed in the block noise removal process (step S700) described above, the block noise is removed only in a sufficiently inward area by determining whether the target pixel is located sufficiently inward from the vicinity of the boundary of the aliasing-sensitive area. It is therefore possible to reduce the danger of creating new edge noise in the edge direction map when attempting to remove block noise.

After block noise is removed, it is particularly effective to perform the isolated noise removal process (step S300) again. The reason is that even if there is edge noise that could not be removed by a single execution of the isolated noise removal process, removing the block noise increases the possibility that the edge noise will become removable. Performing the isolated noise removal process (step S300) again therefore makes it possible to remove almost all of the remaining edge noise.

It is for this reason that the isolated noise removal process (step S300) is performed again after the block noise removal process (step S700) in the edge noise removal process (step S170) of Modification 3 shown in FIG. 29. The isolated noise removal process is also not necessarily performed only once, and may be performed a plurality of times, or the cluster noise removal process may also be performed after the isolated noise removal process.

After the edge noise removal process (step S170) of Modification 3 shown in FIG. 29 is completed as described above, the process returns to the color image data generation process shown in FIG. 3, and then processing is performed to interpolate missing color components in the raw image data (steps S108 through S112 in FIG. 3). Since the edge direction map referenced at this time is an accurate edge direction map from which edge noise has been removed, the color components missing from the raw image data can be appropriately interpolated to generate suitable color image data.

The digital camera 100 of the embodiment generates the color image data from the raw image data according to the procedure described above. The present invention is not restricted to any of this embodiment and its modifications described above but may be attained in various applications and aspects without departing from the scope or spirit of the main characteristics of the present invention.

What is claimed is:

1. An image processing apparatus for receiving mosaic image data having settings of only one color component, R, G, or B, in each pixel and subjects the received mosaic image data to a series of image processing to generate color image data with settings of all the three color components R, G, and B in each pixel; wherein the mosaic image data is expressed as a Bayer color filter; and the image processing apparatus comprises:

a processing unit comprising:

a vertical-direction color difference component computation module configured to obtain the G component in the pixel location of another color component or to obtain another color component in the G component pixel location using vertically neighboring available components in order to compute a vertical-direction color difference component between the G component and the another color component in each pixel included in each of the pixel columns of the mosaic image;

a horizontal-direction color difference component computation module configured to obtain the G component in the pixel location of another color component or to obtain another color component in the G component pixel location using horizontally neighboring color components in order to compute a horizontal-direction color difference component between the G component and the another color component in each pixel included in each of the pixel rows of the mosaic image;

an edge direction determination module configured to determine an edge direction in a pixel by selecting from among said mosaic image data a pixel in which said R component or said B component is set, and comparing an amount of variation of said vertical color difference component and an amount of variation of said horizontal color change component of the selected pixel;

an edge direction map generation module configured to generate an edge direction map in which the edge direction is set in each pixel of said R component and each pixel of said B component, by storing said determined edge direction for each said selected pixel;

an edge noise removal module configured to detect edge noise that is an erroneously determined edge direction by comparing said edge direction set in said edge direction map with the edge directions of surrounding pixels, and removing the edge noise; and a missing color component interpolation module configured to interpolate a missing color component, which is a color component not set in the pixel for each pixel of said mosaic image data, on the basis of said color component set in the mosaic image data while referencing said edge direction map from which said edge noise has been removed: and wherein said edge noise removal module comprises:

target pixel setting module configured to select from among said edge direction map a single pixel in which said edge direction is set, and setting the pixel as a target pixel for determining whether the edge direction is said edge noise;

an edge noise detection module configured to select two pixels in a position of a second pixel in said vertical direction from said target pixel, or two pixels in a position of a second pixel in said horizontal direction from the target pixel, and detecting the edge direction of the target pixel as said edge noise when said two edge directions set in the two pixels selected from any one of the vertical direction and the horizontal direction are the same as each other and different than the edge direction set in the target pixel; and an edge direction changing module configured to change said edge direction detected as said edge noise to a different edge direction.

2. The image processing apparatus according to claim 1, wherein said edge noise removal module comprises:

a target pixel setting module configured to select from among said edge direction map a single pixel in which said edge direction is set, and setting the pixel as a target pixel for determining whether the edge direction is said edge noise;

a precondition determination module configured to select four pixels adjacent in a direction diagonal to said target pixel, and determining whether the pixels satisfy a prescribed precondition when said edge directions set in the selected four pixels are all the same as each other and different than the edge direction set in the target pixel;

an edge noise detection module configured to select all pixels within the prescribed number of pixels in said horizontal direction from said target pixel that satisfies said precondition, or selecting all pixels within a prescribed number of pixels in said vertical direction, and detecting the edge direction of the target pixel as said edge noise only when all of said edge directions set in the selected pixels are not the same as said edge direction of the target pixel; and an edge direction changing module configured to change said edge direction detected as said edge noise to a different edge direction.

3. The image processing apparatus according to claim 1, comprising:

a target area extraction module configured to extract as a target area for removing said edge noise an area in which an amount of variation between color components having the same said mosaic image data is smaller than a prescribed first threshold value and larger than a prescribed second threshold value that is smaller than the first threshold value; wherein said edge noise removal module is a module configured to remove said edge noise with respect to said edge direction set in a pixel within said target area.

4. The image processing apparatus according to claim 1, comprising:

an edge noise re-removal module configured to re-remove the edge noise with respect to said edge direction map from which said edge noise has been removed.

5. An image processing method comprising receiving mosaic image data having settings of only one color component, R, G, or B, in each pixel and subjecting the received mosaic image data to a series of image processing to generate color image data with settings of all the three color components R, G, and B in each pixel; wherein the image processing method comprises using a processing unit to perform:

a first step of receiving, as the mosaic image data, image data expressed as a Bayer color filter;

a second step of obtaining the G component and the another color component in each pixel included in each of the pixel columns of the mosaic image data, and computing a vertical-direction color difference component between the G component and the another color component in each pixel included in each of the pixel columns in the vertical direction;

a third step of obtaining the G component and the another color component in each pixel included in each of the pixel rows of the mosaic image data, and computing a horizontal-direction color difference component between the G component and the another color component in each pixel included in each of the pixel rows in the horizontal direction;

a fourth step of determining an edge direction in a pixel by selecting from among said mosaic image data a pixel in which said R component or said B component is set, and comparing an amount of variation of said vertical color difference component and an amount of variation of said horizontal color change component of the selected pixel;

a fifth step of generating an edge direction map in which the edge direction is set in each pixel of said R component and each pixel of said B component, by storing said determined edge direction for each said selected pixel;

a sixth step of detecting edge noise that is an erroneously determined edge direction by comparing said edge direction set in said edge direction map with the edge directions of surrounding pixels, and removing the edge noise; and a seventh step of interpolating a missing color component, which is a color component not set in the pixel for each pixel of said mosaic image data, on the basis of said color component set in the mosaic image data while referencing said edge direction map from which said edge noise has been removed; and wherein said sixth step of detecting edge noise comprises:

selecting from among said edge direction map a single pixel in which said edge direction is set, and setting the pixel as a target pixel for determining whether the edge direction is said edge noise;

selecting two pixels in a position of a second pixel in said vertical direction from said target pixel, or two pixels in a position of a second pixel in said horizontal direction from the target pixel, and detecting the edge direction of the target pixel as said edge noise when said two edge directions set in the two pixels selected from any one of the vertical direction and the horizontal direction are the same as each other and different than the edge direction set in the target pixel; and changing said edge direction detected as said edge noise to a different edge direction.

6. A non-transitory computer-readable medium having a program for causing a computer to perform a method for receiving mosaic image data having settings of only one color component, R, G, or B, in each pixel and subjecting the received mosaic image data to a series of image processing to generate color image data with settings of all the three color components R, G, and B in each pixel, the program causing the computer to perform:
- a first function of receiving, as the mosaic image data, image data expressed as a Bayer color filter;
- a second function of obtaining the G component and the another color component in each pixel included in each of the pixel columns of the mosaic image data, and computing a vertical-direction color difference component between the G component and the another color component in each pixel included in each of the pixel columns in the vertical direction;
- a third function of obtaining the G component and the another color component in each pixel included in each of the pixel rows of the mosaic image data, and computing a horizontal-direction color difference component between the G component and the another color component in each pixel included in each of the pixel rows in the horizontal direction;
- a fourth function for determining an edge direction in a pixel by selecting from among said mosaic image data a pixel in which said R component or said B component is set, and comparing an amount of variation of said vertical color difference component and an amount of variation of said horizontal color change component of the selected pixel;
- a fifth function for generating an edge direction map in which the edge direction is set in each pixel of said R component and each pixel of said B component, by storing said determined edge direction for each said selected pixel;
- a sixth function for detecting edge noise that is an erroneously determined edge direction by comparing said edge direction set in said edge direction map with the edge directions of surrounding pixels, and removing the edge noise; and
- a seventh function for interpolating a missing color component, which is a color component not set in the pixel for each pixel of said mosaic image data, on the basis of said color component set in the mosaic image data while referencing said edge direction map from which said edge noise has been removed; and wherein said sixth function for detecting edge noise comprises:
- selecting from among said edge direction map a single pixel in which said edge direction is set, and setting the pixel as a target pixel for determining whether the edge direction is said edge noise;
- selecting two pixels in a position of a second pixel in said vertical direction from said target pixel, or two pixels in a position of a second pixel in said horizontal direction from the target pixel, and detecting the edge direction of the target pixel as said edge noise when said two edge directions set in the two pixels selected from any one of the vertical direction and the horizontal direction are the same as each other and different than the edge direction set in the target pixel; and
- changing said edge direction detected as said edge noise to a different edge direction.

* * * * *